(12) United States Patent  (10) Patent No.: US 8,595,333 B2
Kikuta et al.  (45) Date of Patent: Nov. 26, 2013

(54) COMMUNICATION APPARATUS, COMMUNICATION SYSTEM, COMMUNICATION PROGRAM, AND CONTROL METHOD

(75) Inventors: Kazutaka Kikuta, Kawasaki (JP); Ko Takatori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 12/704,602

(22) Filed: Feb. 12, 2010

(65) Prior Publication Data

US 2010/0208580 A1  Aug. 19, 2010

(30) Foreign Application Priority Data

Feb. 18, 2009  (JP) ................................. 2009-034758

(51) Int. Cl.
*G06F 15/177* (2006.01)
(52) U.S. Cl.
USPC ........... 709/220; 370/242; 370/216; 370/217; 370/225; 370/223
(58) Field of Classification Search
USPC ................. 370/242, 216, 217, 223, 222, 225, 370/241.1; 709/220
See application file for complete search history.

(56) References Cited

U.S. PATENT DOCUMENTS 7,961,596 B2 * 6/2011 Maruyoshi et al. ........... 370/217
8,089,865 B2 * 1/2012 Mizutani et al. .............. 370/223

FOREIGN PATENT DOCUMENTS

JP  2004-032633 A  1/2004

* cited by examiner

*Primary Examiner* — Kyung H Shin
(74) *Attorney, Agent, or Firm* — Fujitsu Patent Center

(57) ABSTRACT

In a communication device for monitoring a network system where a frame is transferred, with a maintenance frame for maintenance and management, an input-output section inputs or outputs a frame. A failure detection section detects occurrence of a failure in the network system on the basis of the inputted frame. A setting section sets the communication device according to the detection of the failure so as to terminate or transfer a data frame inputted from the input-output section. A data frame control section controls whether to terminate or transfer the data frame, according to the setting of the data frame by the setting section. A maintenance frame control section controls whether to terminate or transfer the maintenance frame inputted from the input-output section, according to the setting of the data frame by the setting section.

19 Claims, 32 Drawing Sheets

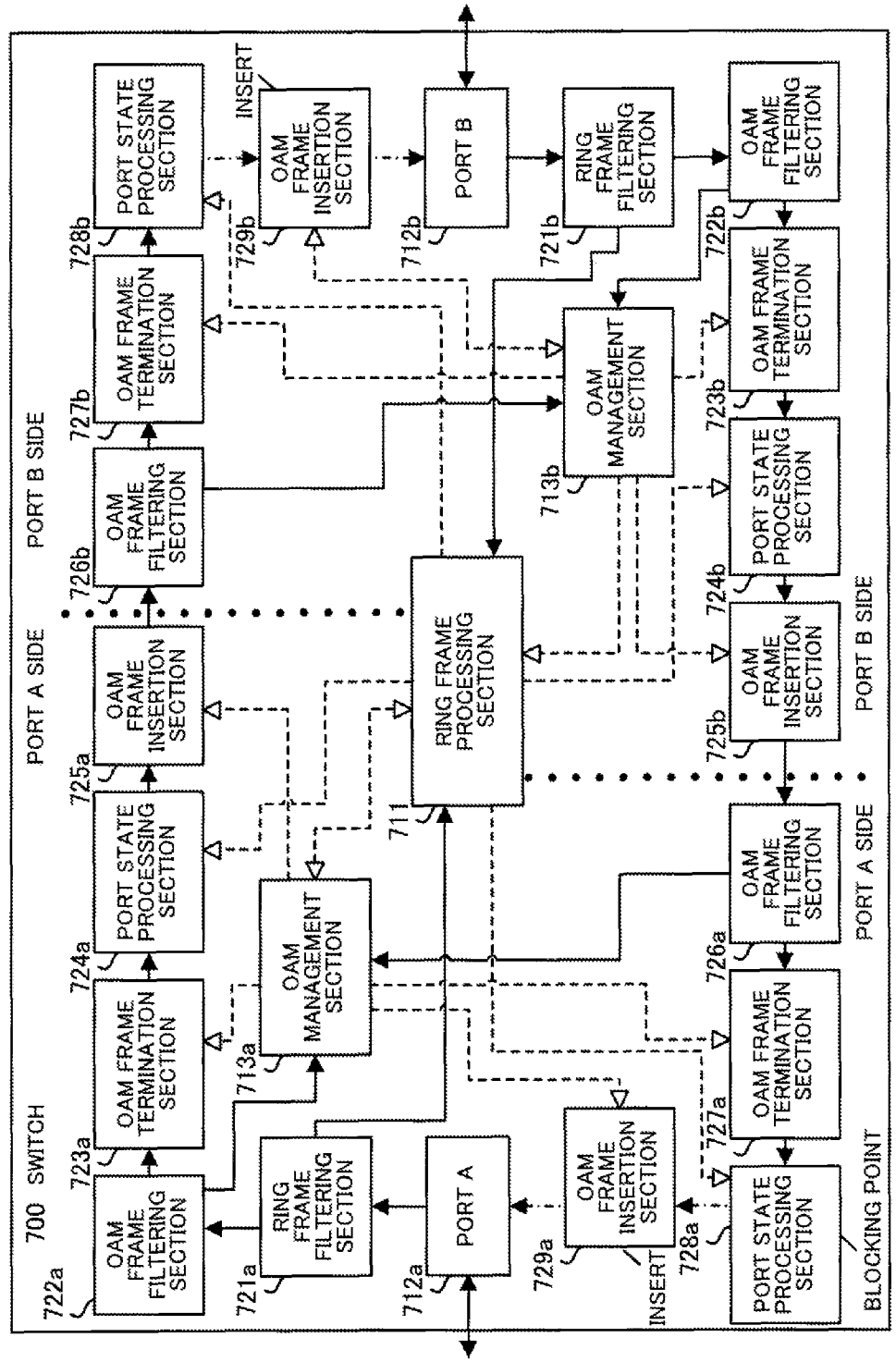

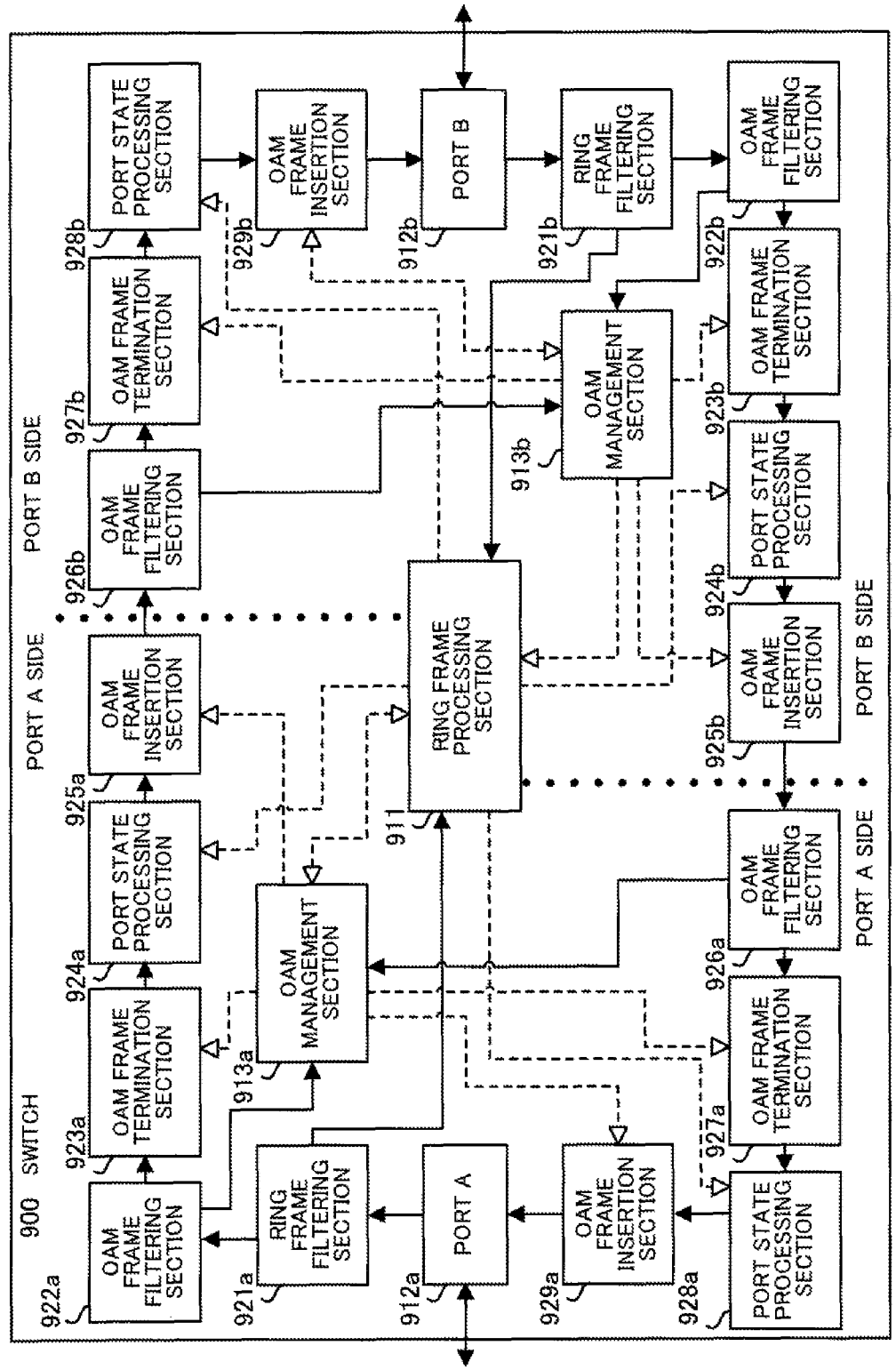

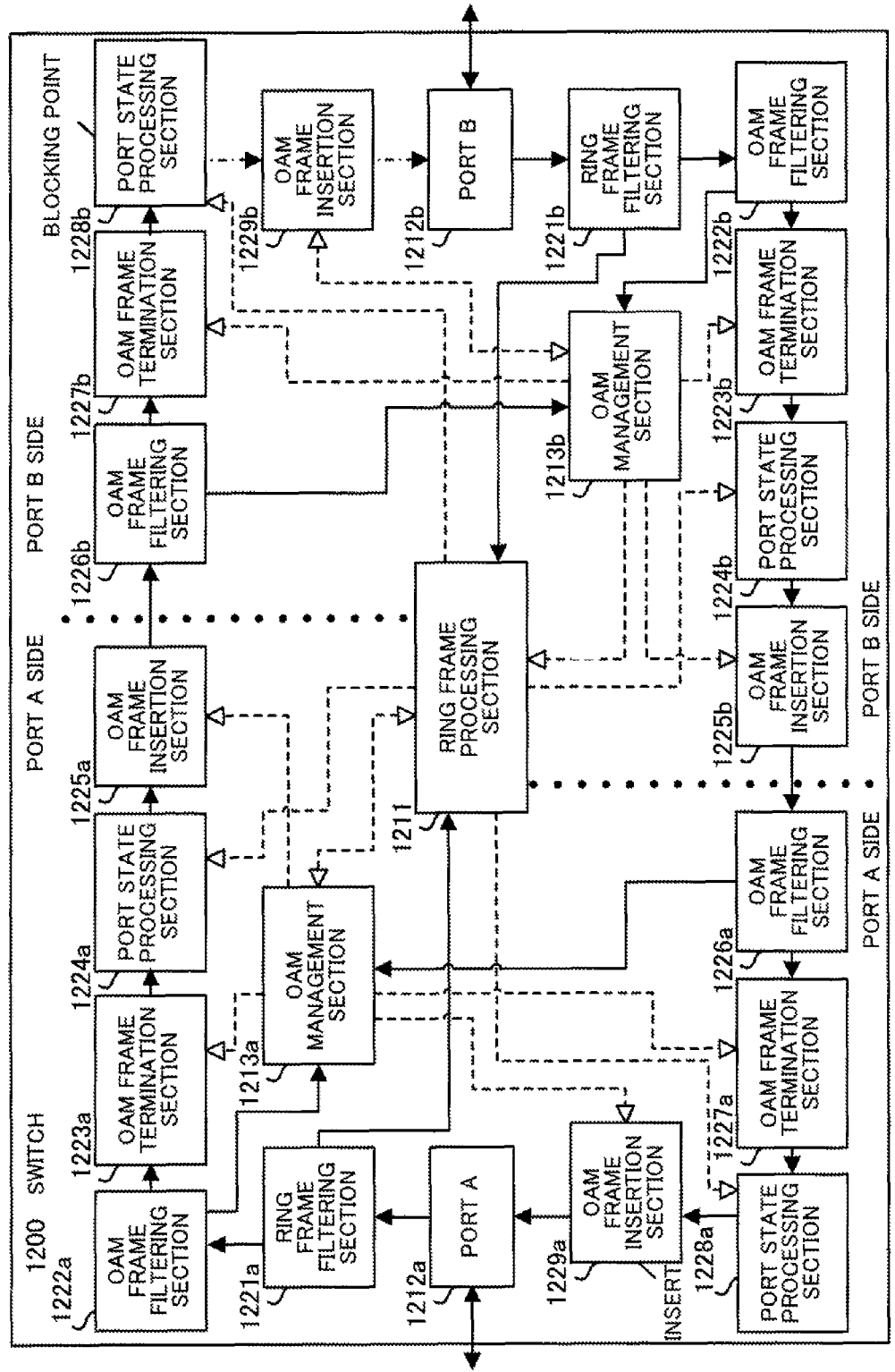

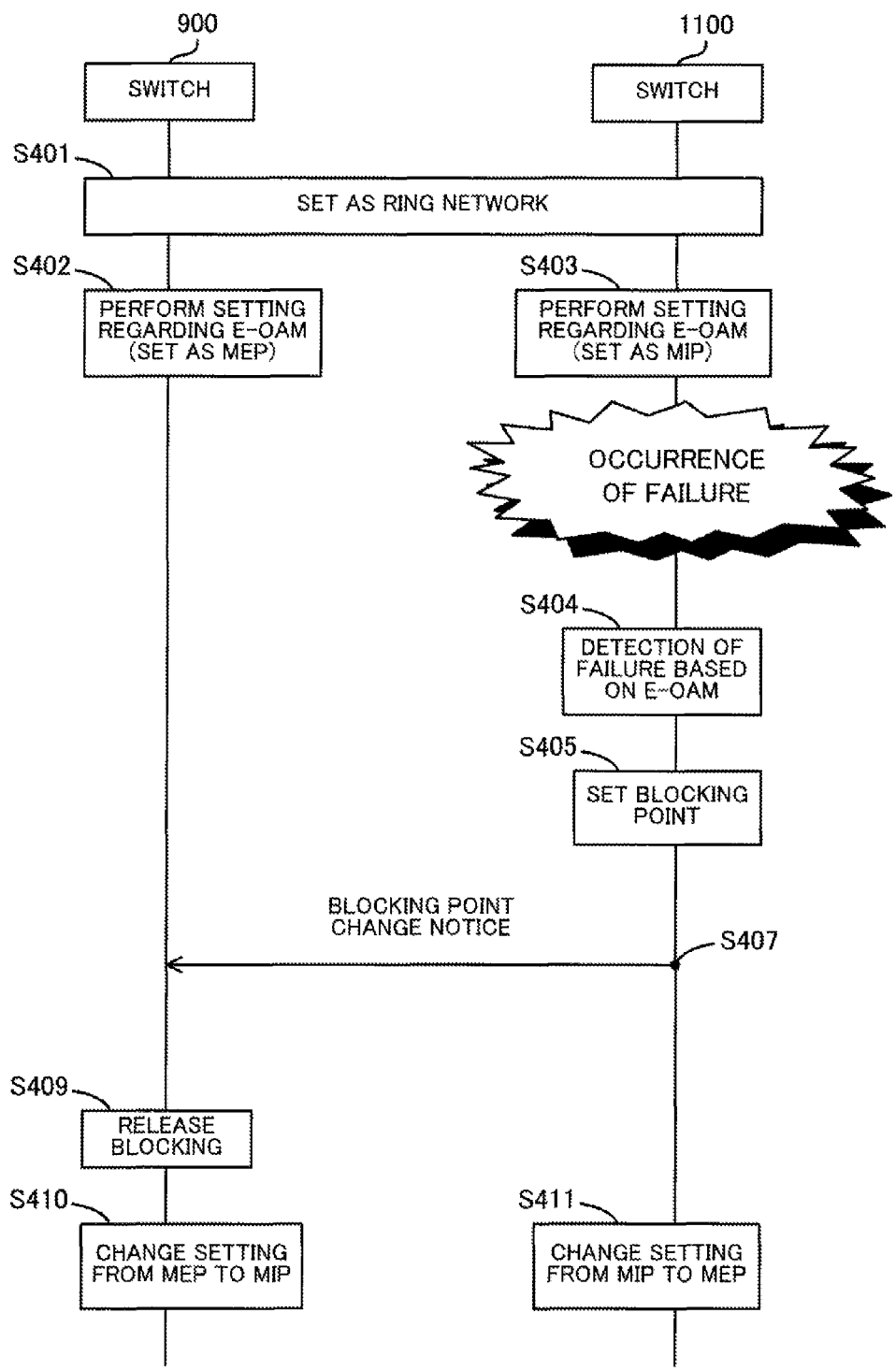

COMMUNICATION APPARATUS, COMMUNICATION SYSTEM, COMMUNICATION PROGRAM, AND CONTROL METHOD

CROSS-REFERENCE TO RELATED APPLICATIONS

This application is based upon and claims the benefit of priority of the prior Japanese Patent Application No. 2009-034758, filed on Feb. 18, 2009, the entire contents of which are incorporated herein by reference.

FIELD

The embodiments discussed herein are related to a communication apparatus, a communication system, a communication program, and a control method.

BACKGROUND

When data is sent via a network such as a LAN (Local Area Network), the data to be sent is divided into frames at the data link layer, is relayed by a communication device, and is delivered to a destination. A layer 2 switch, for example, is known as a communication device for relaying a frame in a network in this way.

In addition, a technique for improving the reliability of a network in which ATM (Asynchronous Transfer Mode) or SDH/SONET (Synchronous Digital Hierarchy/Synchronous Optical NETwork) is used by monitoring a communication device by the use of OAM (Operations Administration Maintenance) is known (see, for example, Japanese Laid-open Patent Publication No. 2004-32633).

Furthermore, E-OAM is created by applying OAM to Ethernet (registered trademark) which is widely used in LANs, and is provided in IEEE 802.1ag or ITU-T Y.1731. With E-OAM (Ethernet-OAM), in order to monitor the connectivity of a network, a MEP (Maintenance Entry Point) is set as a monitoring termination point, which is a termination node for maintenance and management, and a MIP (Maintenance Intermediate Point) is set as a monitoring intermediate point, which is a relay node for maintenance and management. A monitor group which is called a MEG (Maintenance Entity Group) and which is made up of these points is formed. An OAM frame is sent periodically and its arrival is checked. By doing so, the occurrence of a failure in the MEG can be detected.

Furthermore, with ring topology, for example, a technique for forming a physical redundant route between any communication devices in a communication network is known as a method for improving the reliability of the network. In this case, it is necessary to prevent a data frame from looping. Accordingly, STP (Spanning Tree Protocol) or the like is used for forming a spanning tree and a frame transfer control protocol is used for blocking a data frame relay via a specific port. By doing so, a communication channel between any network devices for relaying a frame is determined uniquely. When a failure has occurred, a blocking point is changed dynamically to another point. By doing so, communication can be resumed by the use of a communication channel in which a failure has not occurred.

With E-OAM, for example, it is necessary to set a MEG and MEPs and MIPs which make up the MEG. For example, however, a blocking point of data frame forwarding (transfer) in a ring network changes dynamically due to the occurrence of a failure of frame forwarding. Therefore, after the blocking point changes, the network cannot be monitored by the MEPs and the MIPs which are fixedly allocated in E-OAM. That is to say, there are cases where a blocking point is changed dynamically due to, for example, the occurrence of a failure in a network and where a termination node for data frame transfer changes. In such cases, a user or the like needs to change a termination node (MEP based on E-OAM, for example) set for monitoring according to the change in blocking point.

SUMMARY

According to an aspect of the invention, a communication apparatus for monitoring a network system in which a frame is transferred by a maintenance frame for maintenance and management including an input-output section which inputs or outputs a frame, a failure detection section which detects occurrence of a failure in the network system on the basis of the frame inputted from the input-output section, a setting section which sets the communication apparatus on the basis of detection of the occurrence of the failure by the failure detection section so as to terminate or transfer a data frame, a data frame control section which exercises control on the basis of setting regarding the data frame of the communication apparatus by the setting section so as to terminate or transfer the data frame inputted from the input-output section, and a maintenance frame control section which exercises control on the basis of the setting regarding the data frame by the setting section so as to terminate or transfer the maintenance frame inputted from the input-output section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

Figure 7A:
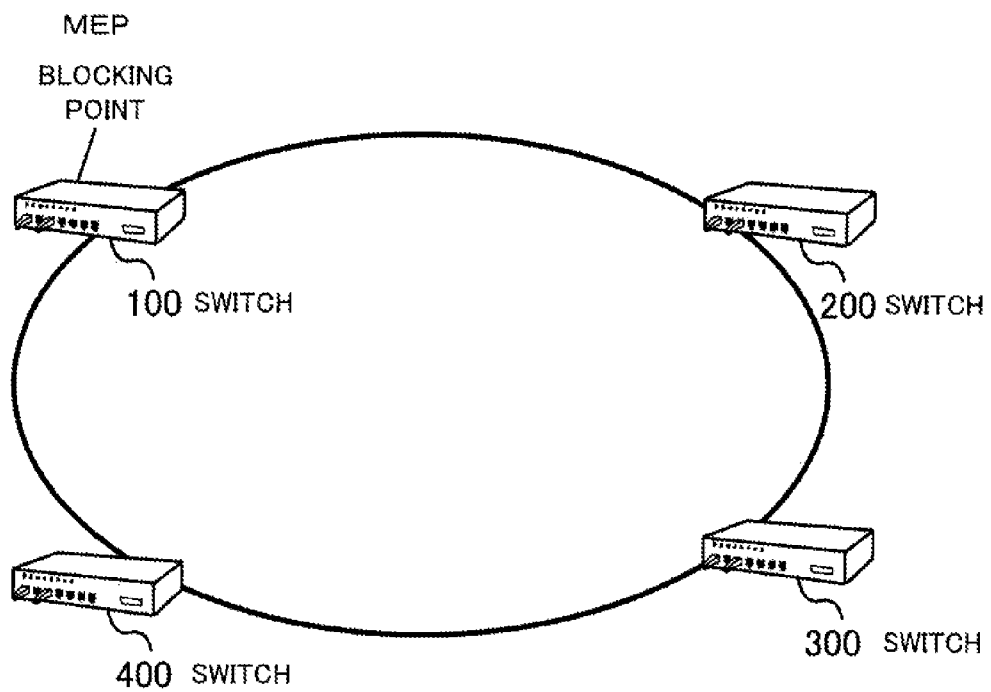
Figure 7B:
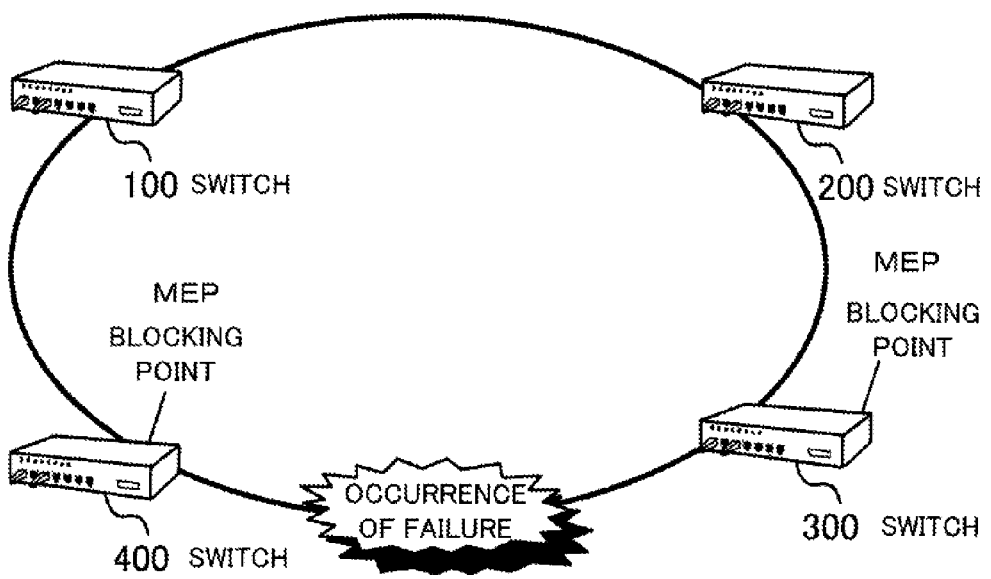
Figure 8:
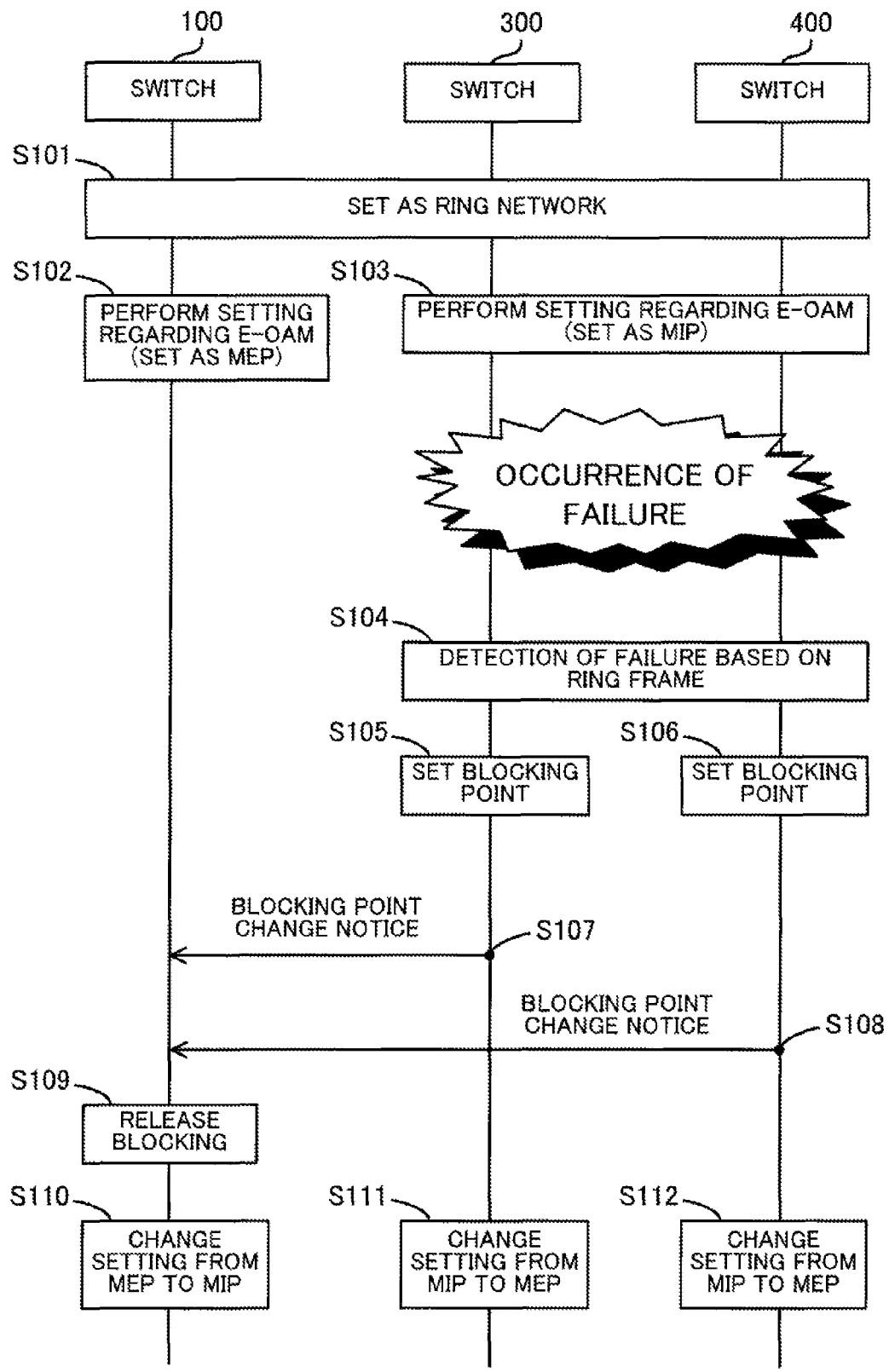
Figure 9:
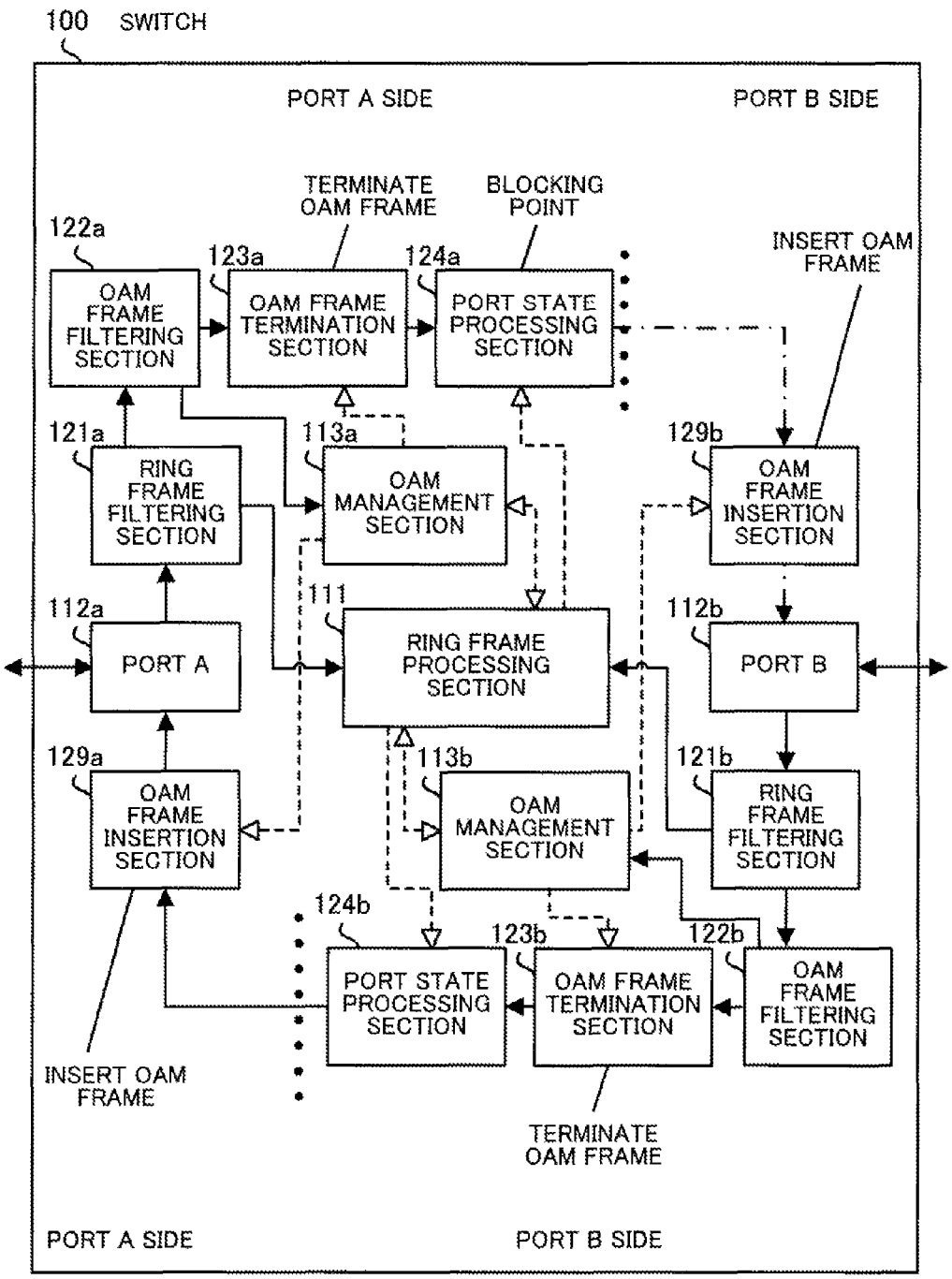
Figure 10:
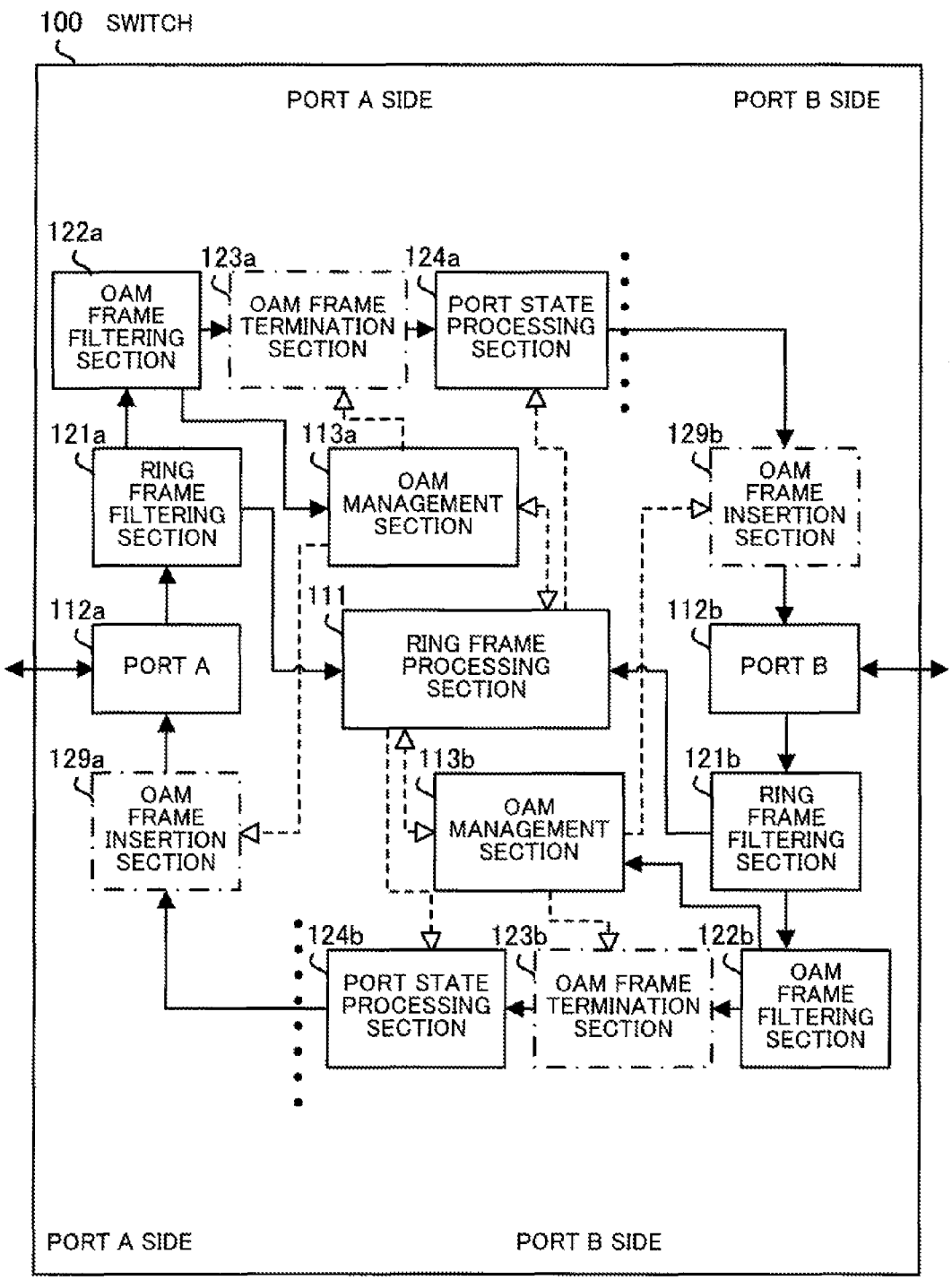
Figure 11:
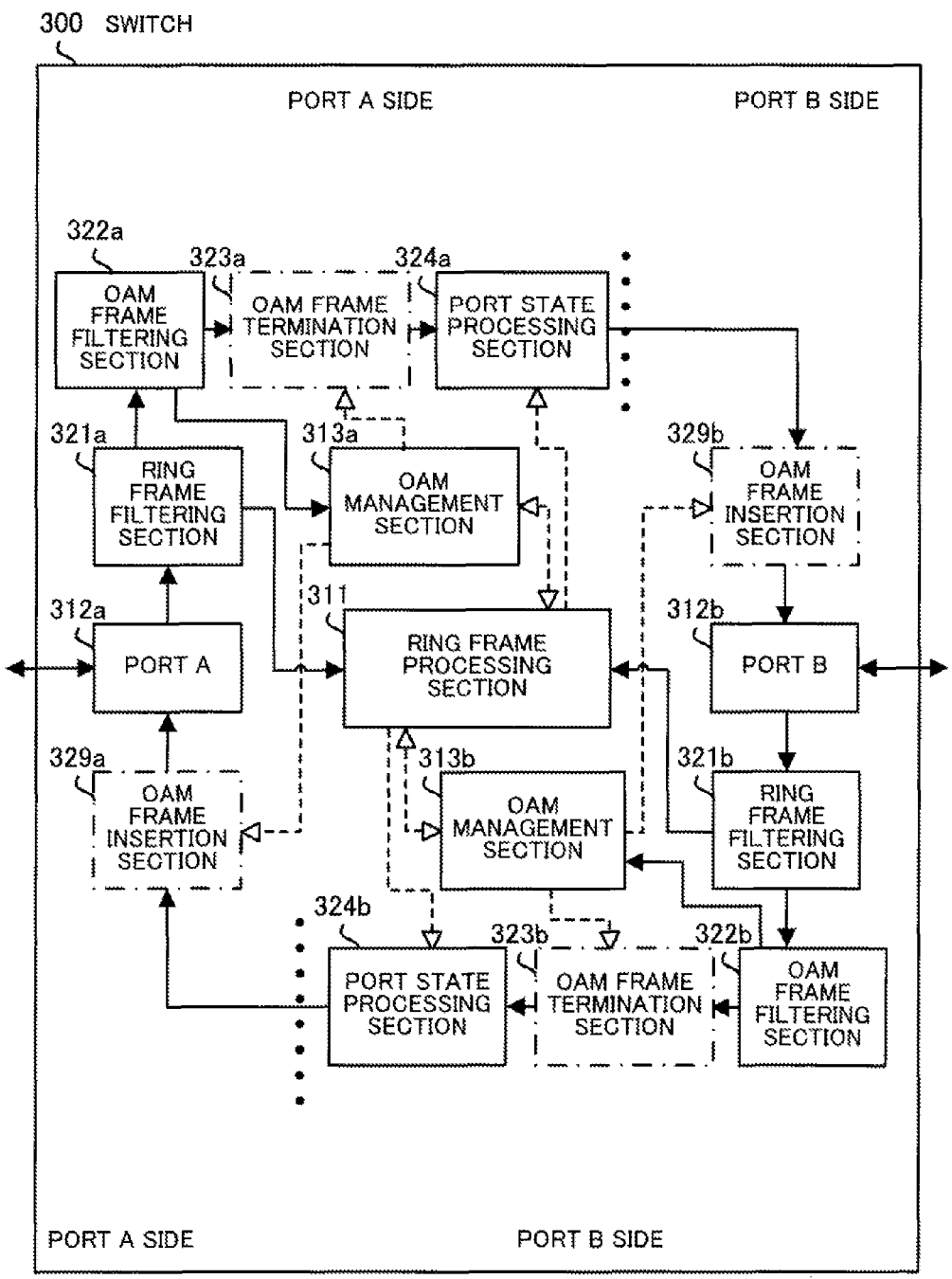
Figure 12:
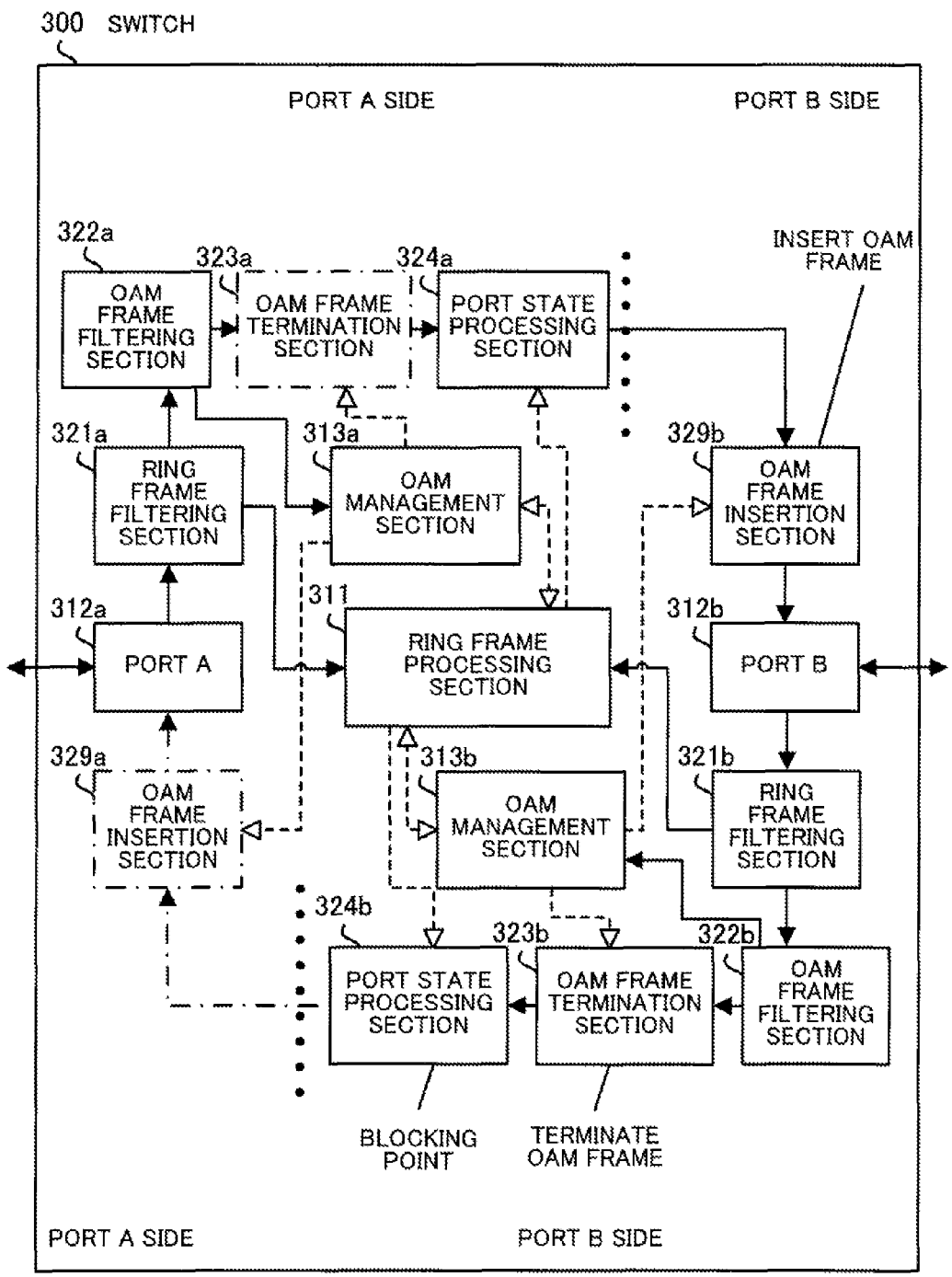
Figure 13:
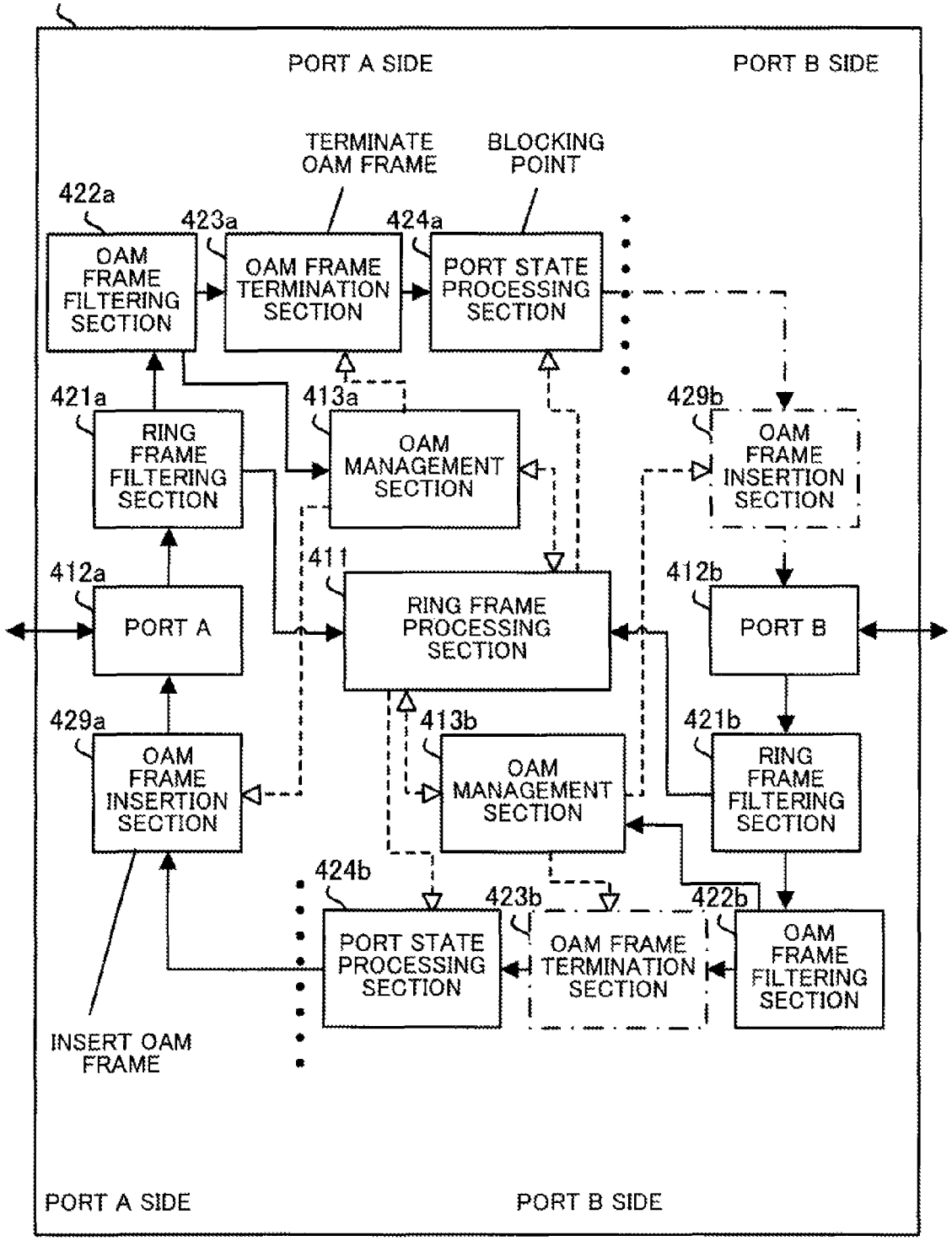
Figure 14:
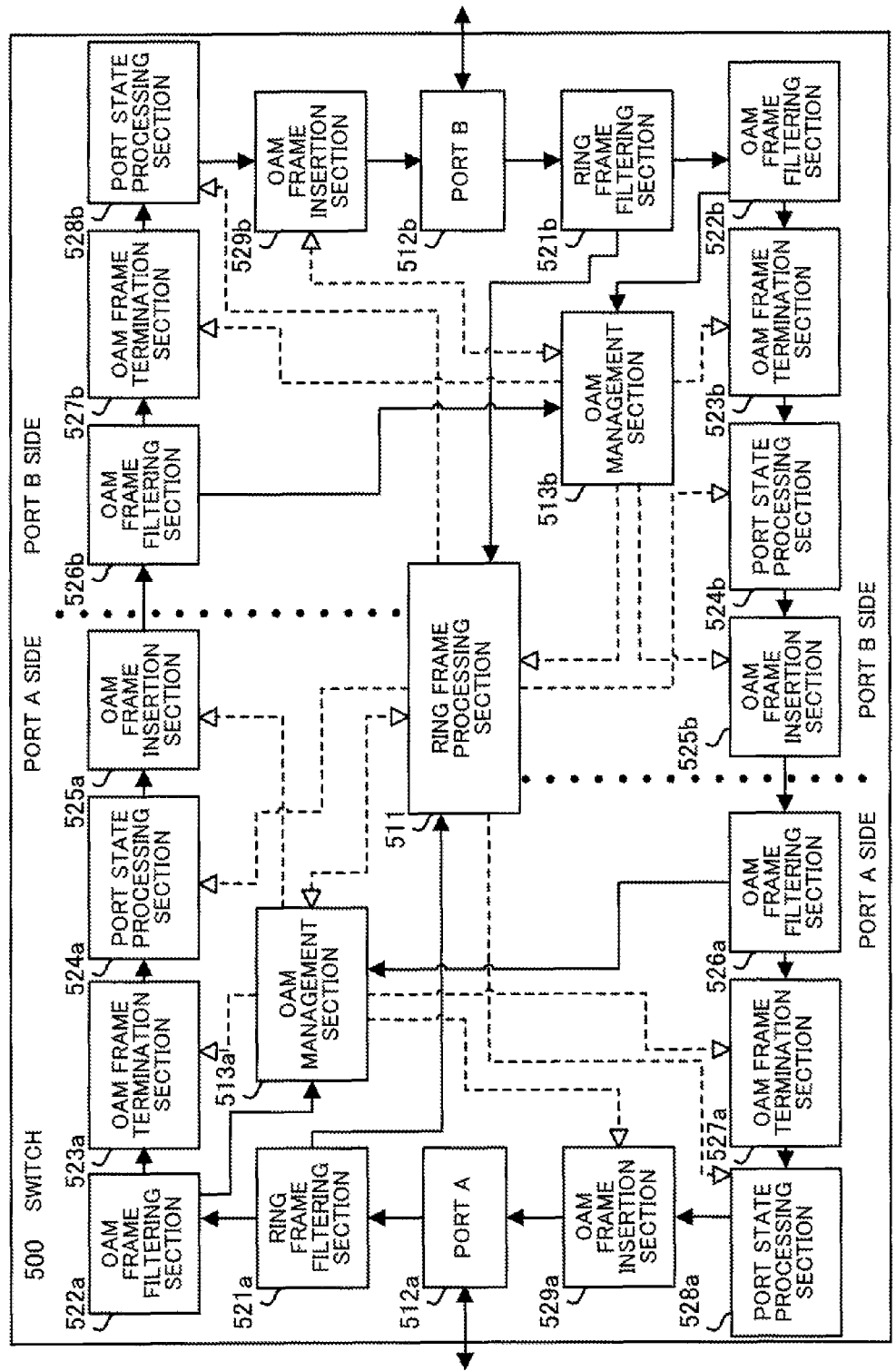
Figure 15:
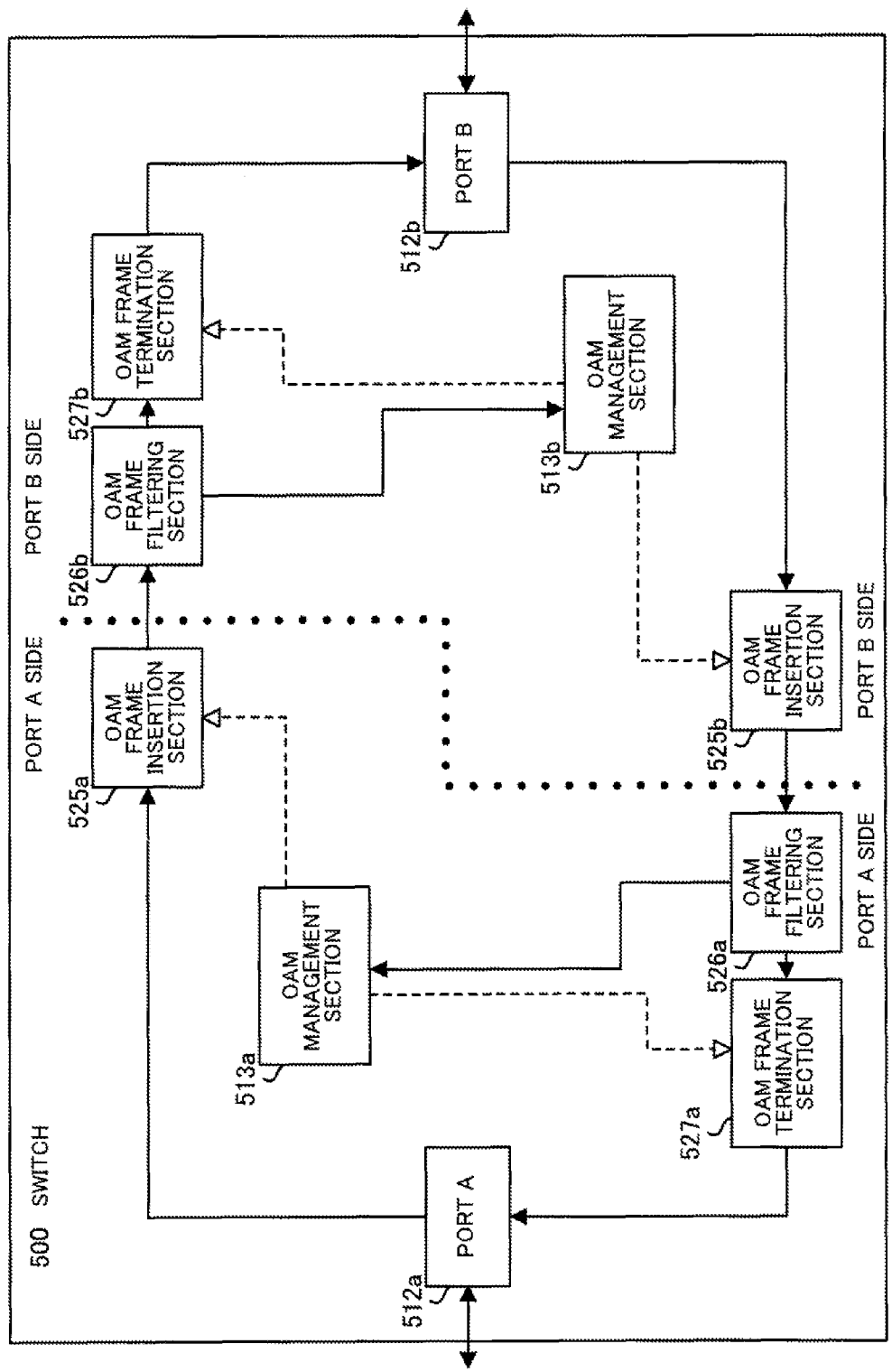
Figure 16A:
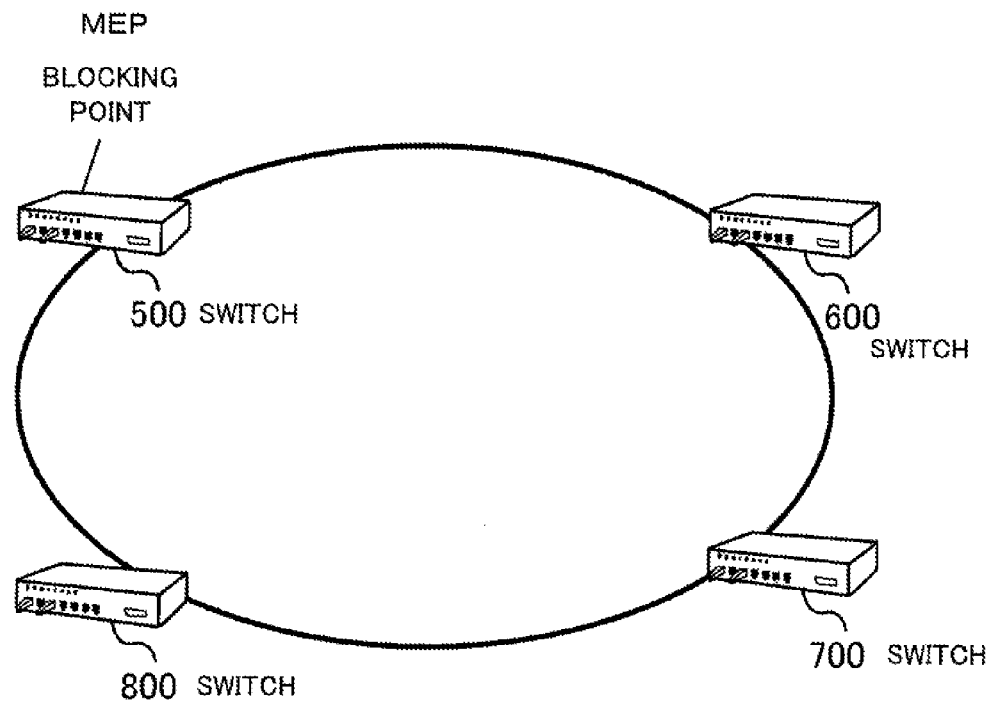
Figure 16B:
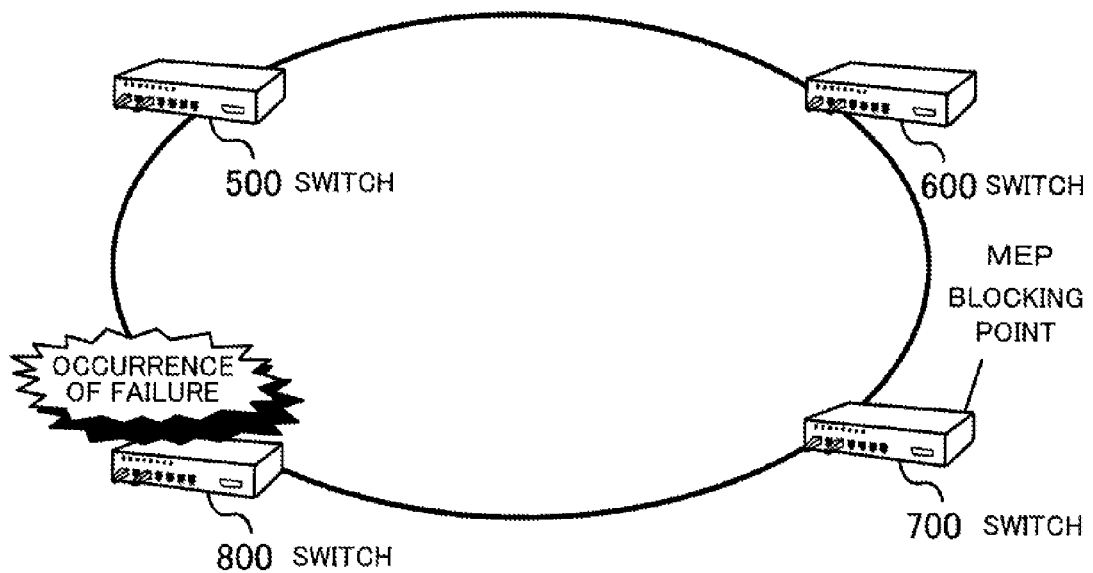
Figure 17:
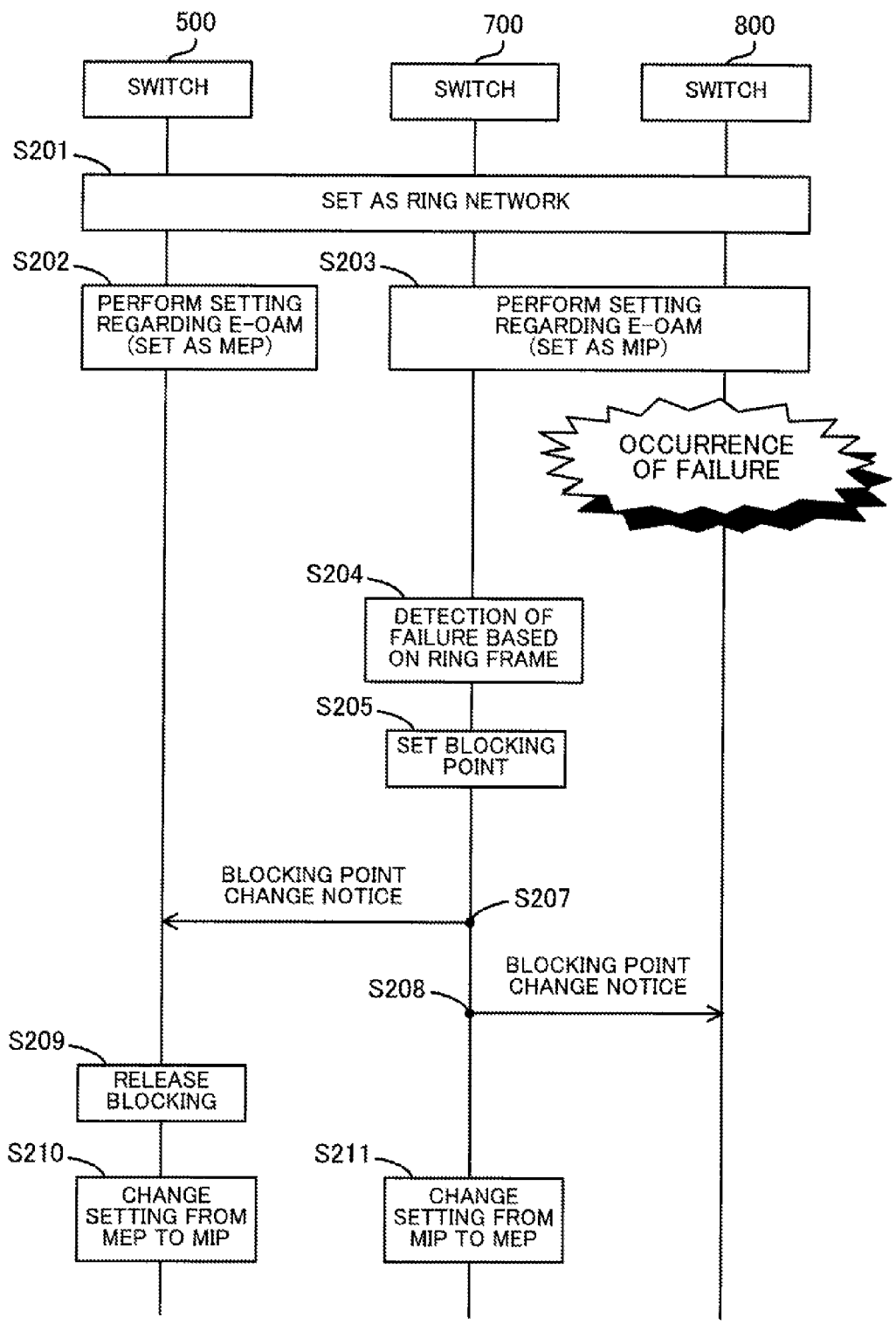
Figure 18:
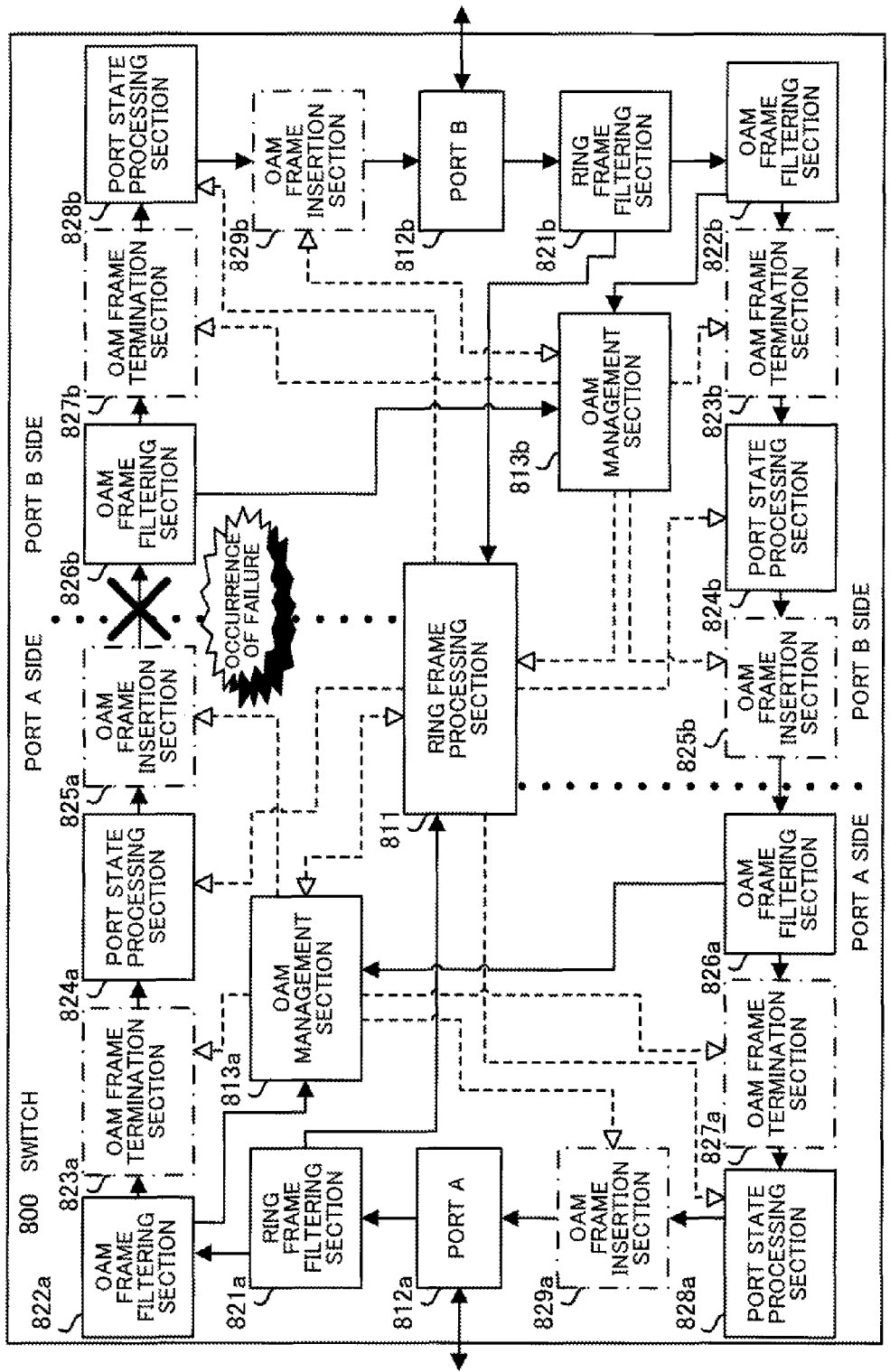
Figure 19:
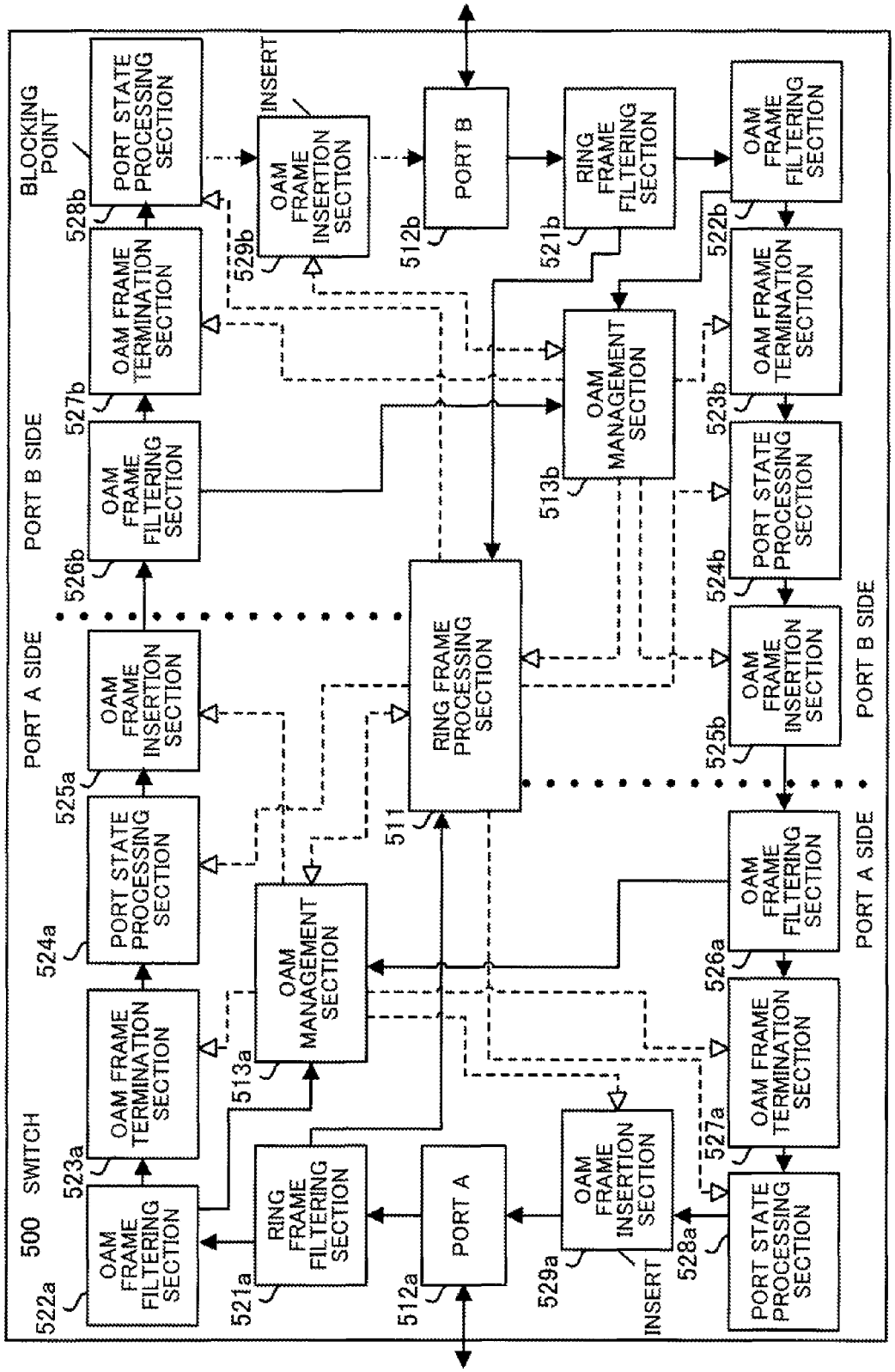
Figure 20:
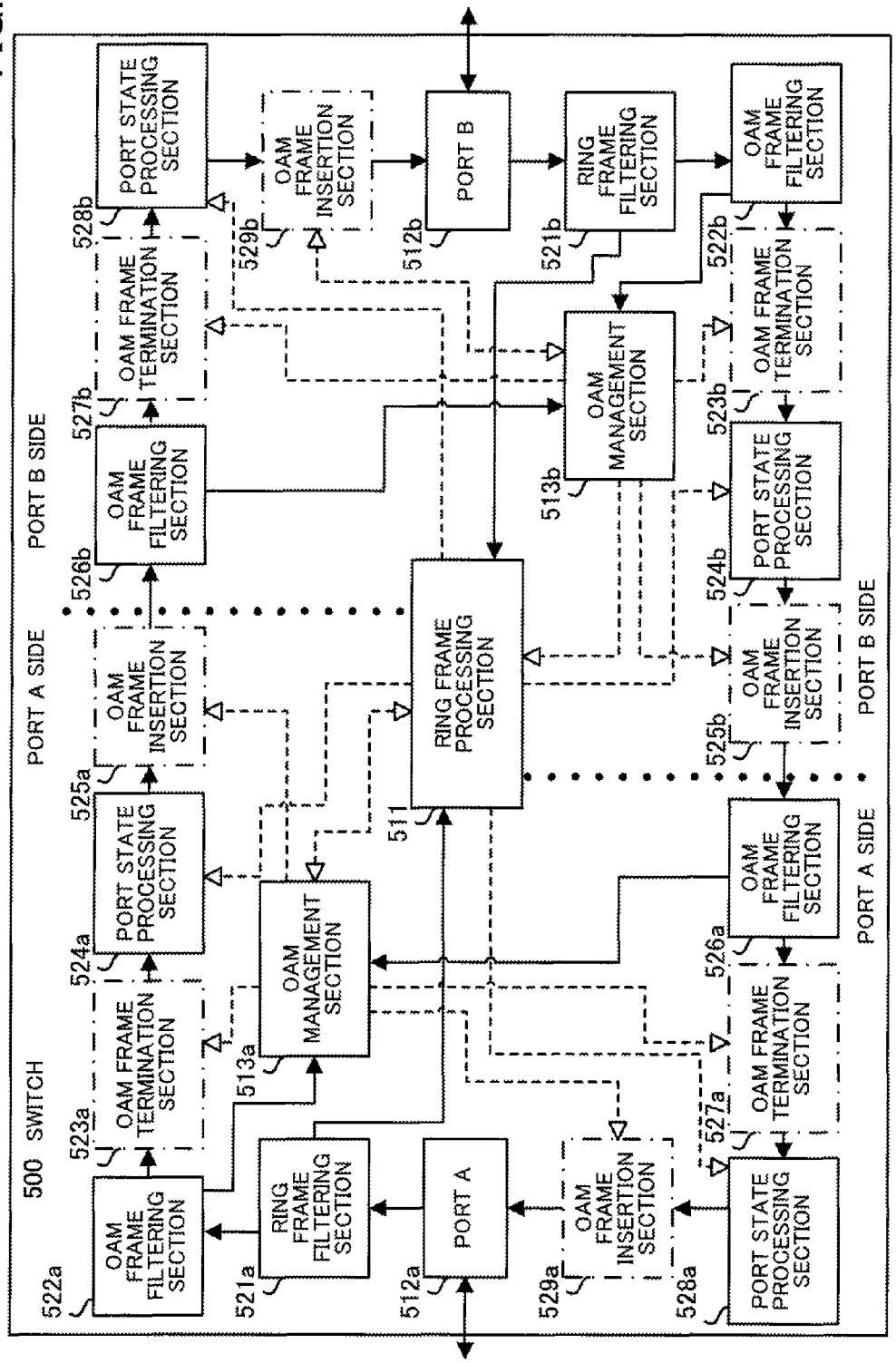
Figure 21:
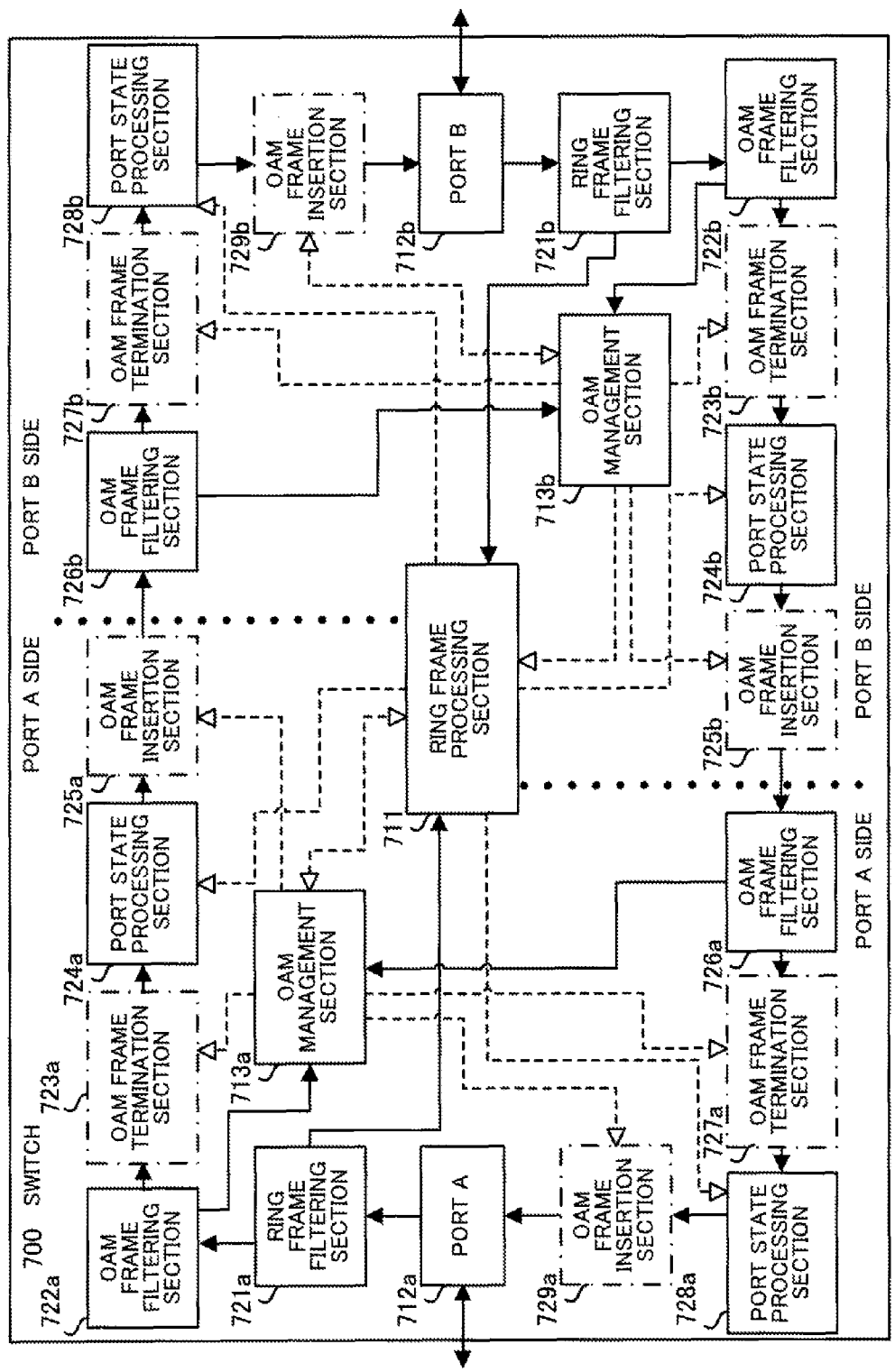
Figure 24A:
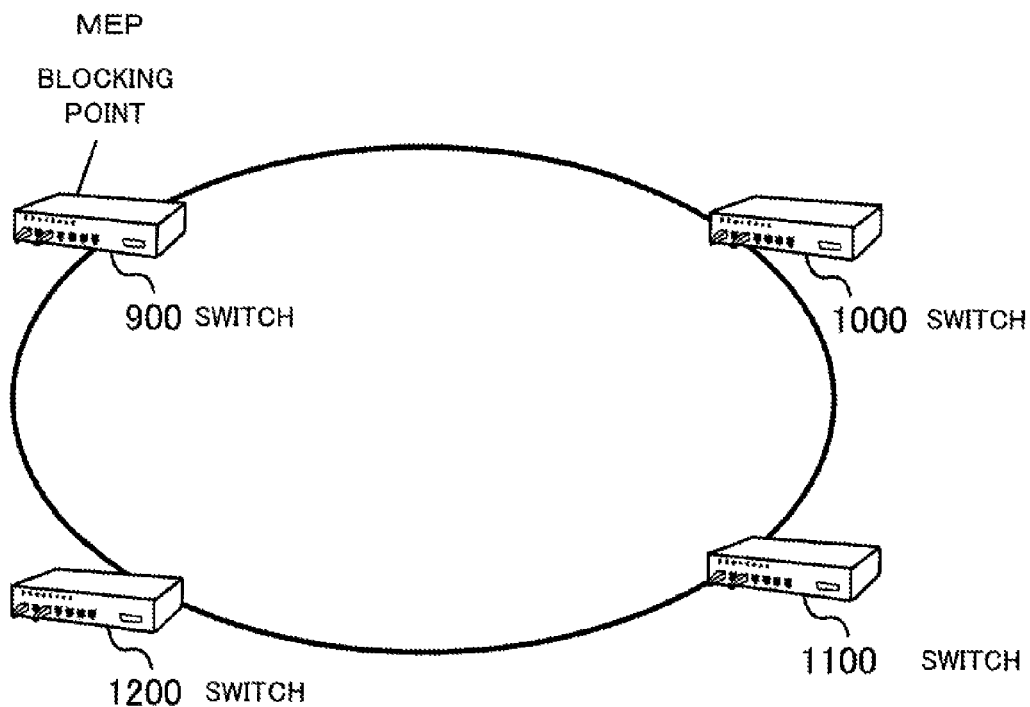
Figure 24B:
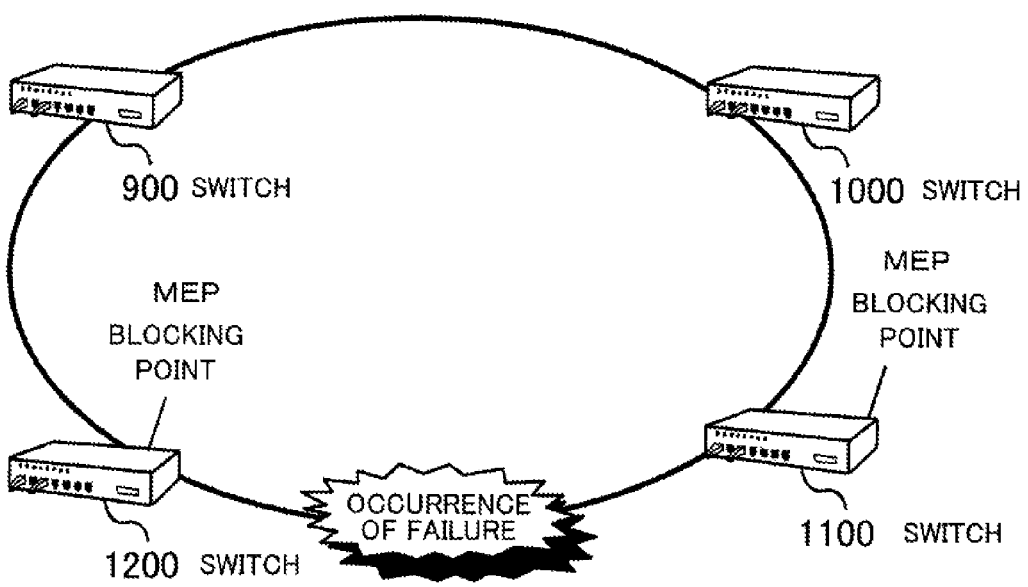
Figure 25:
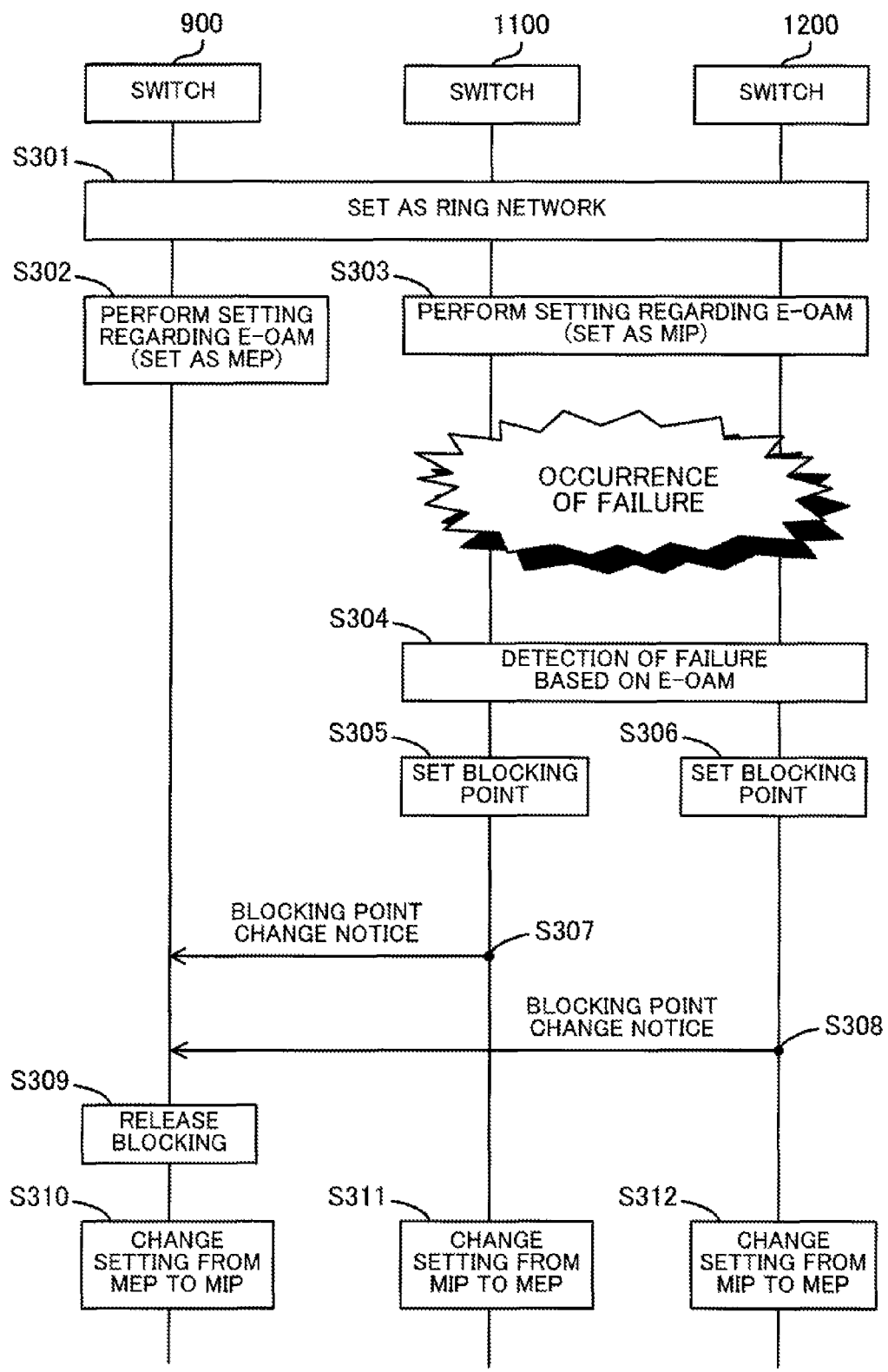
Figure 26:
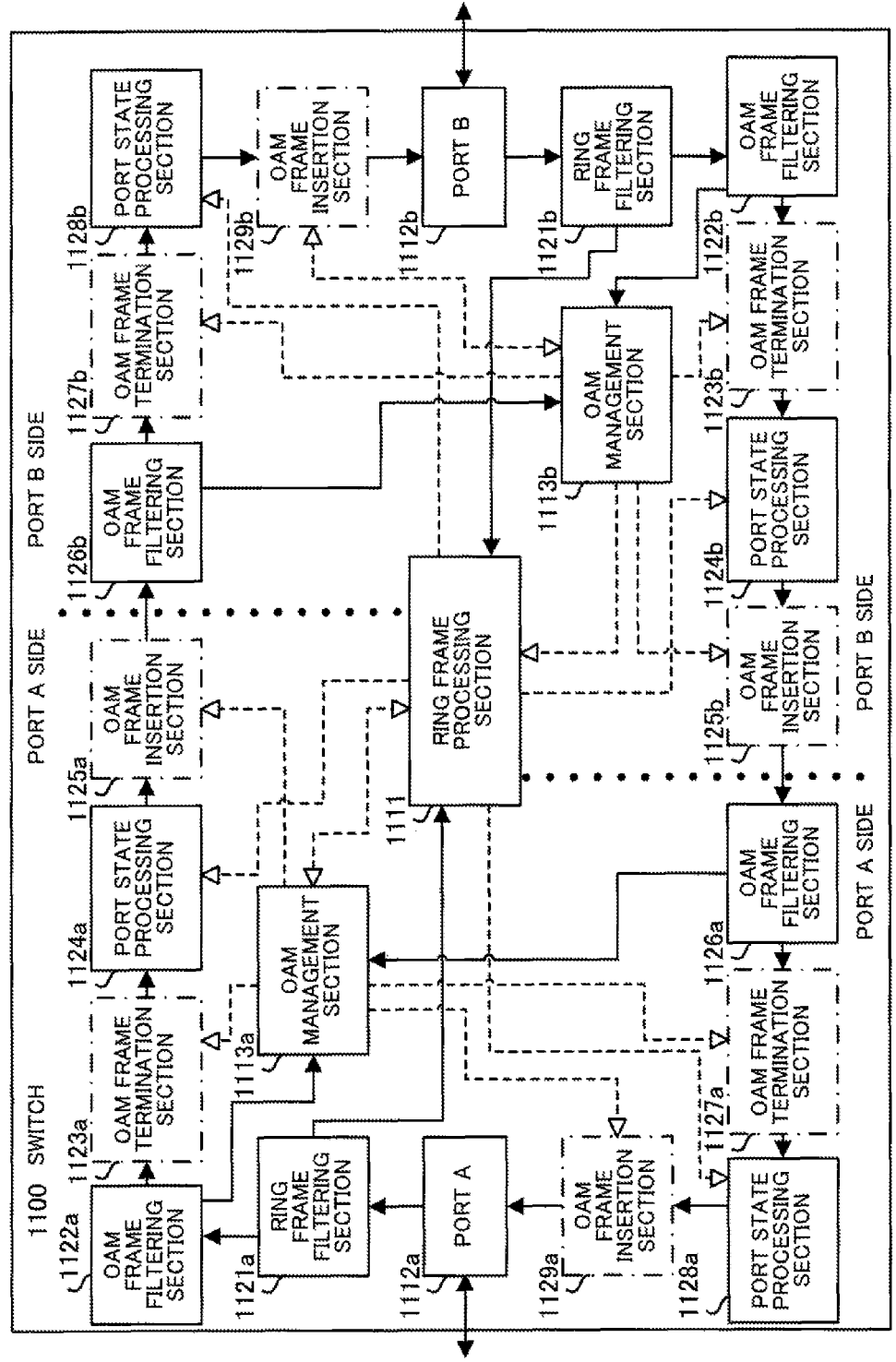
Figure 27:
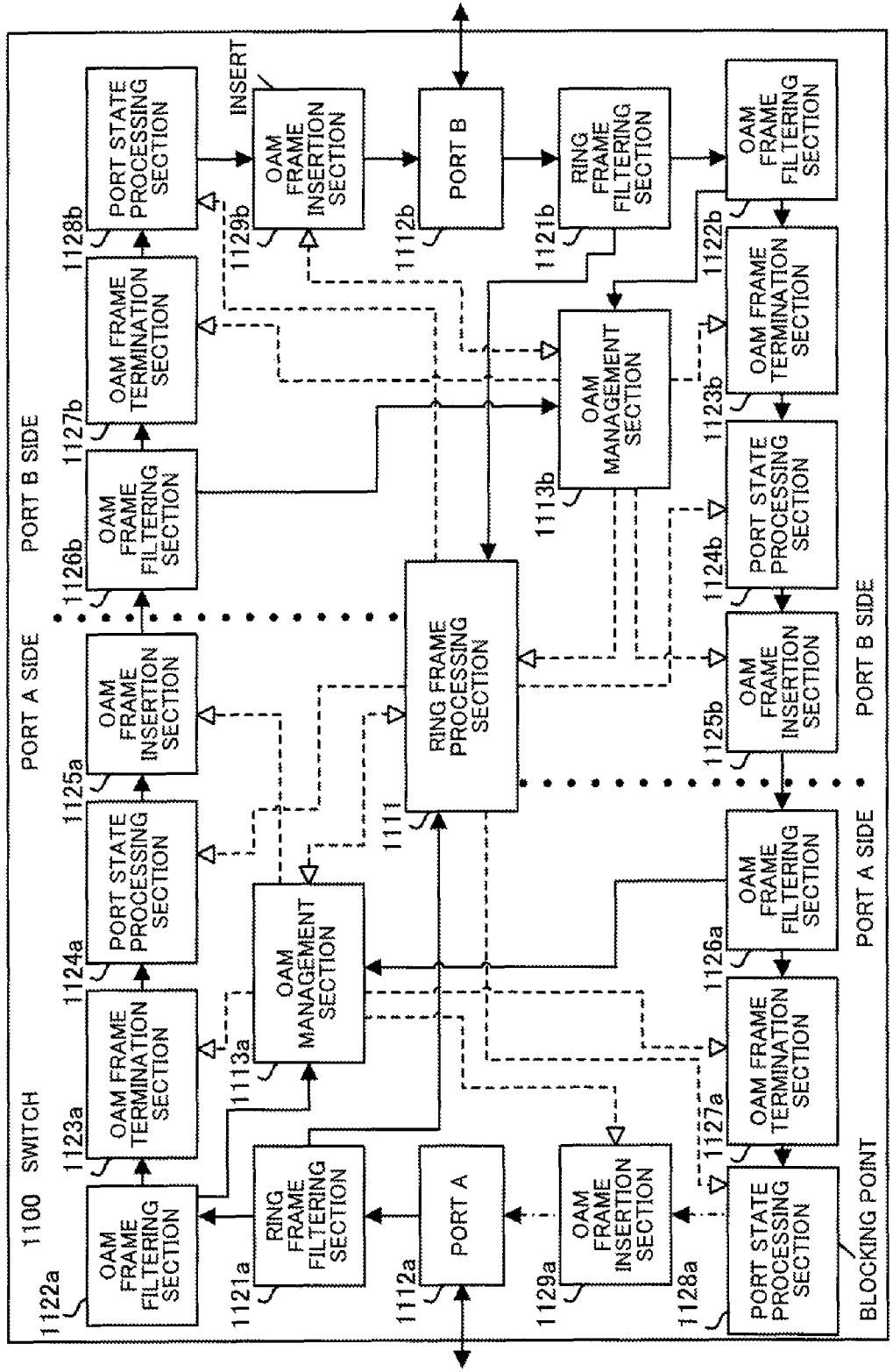
Figure 29A:
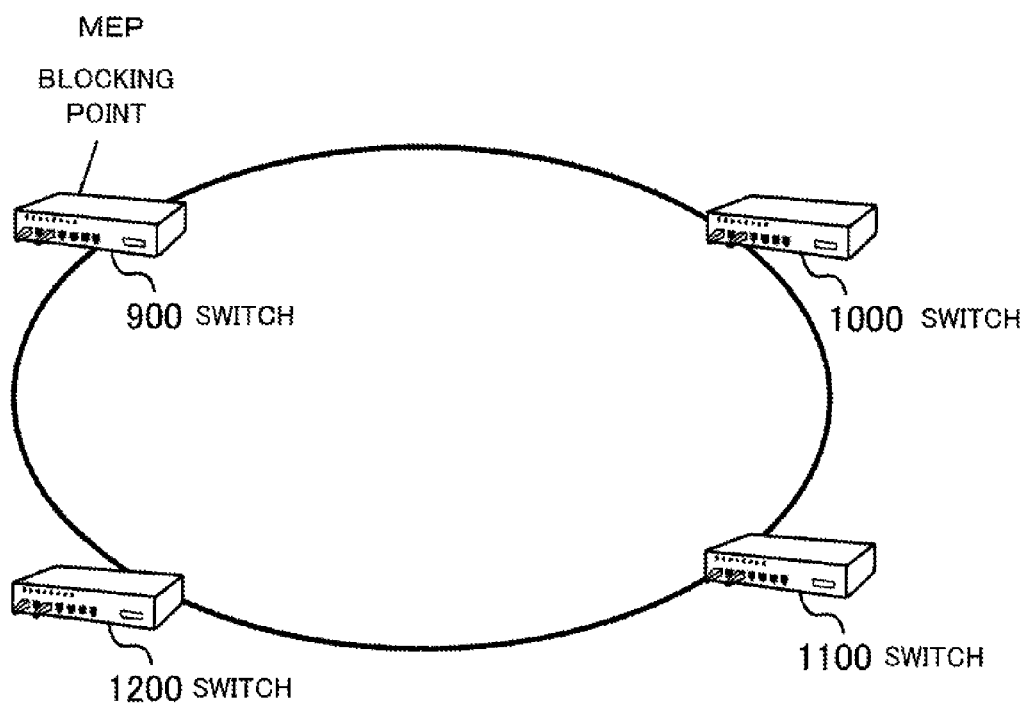
Figure 29B:
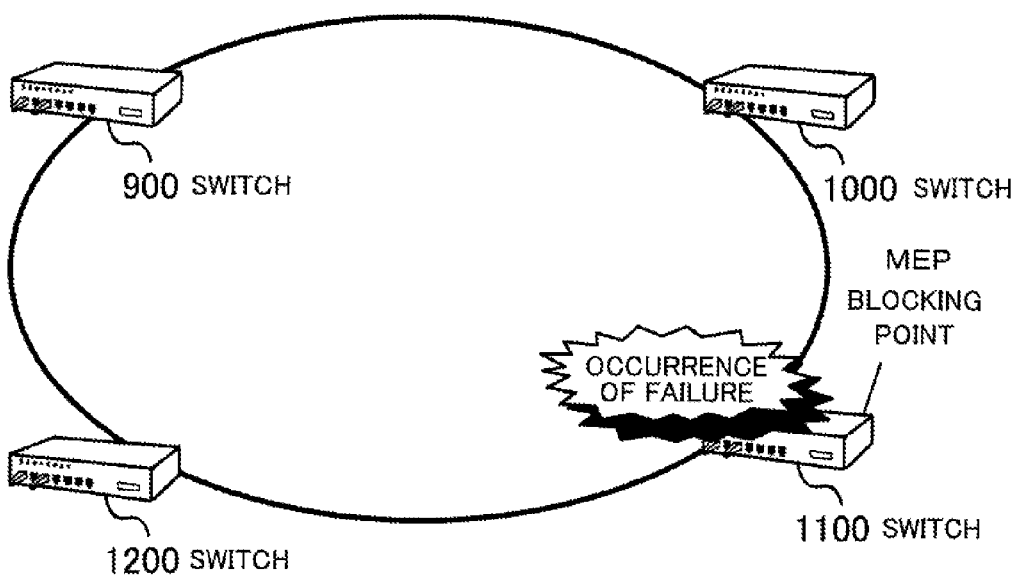
Figure 31:
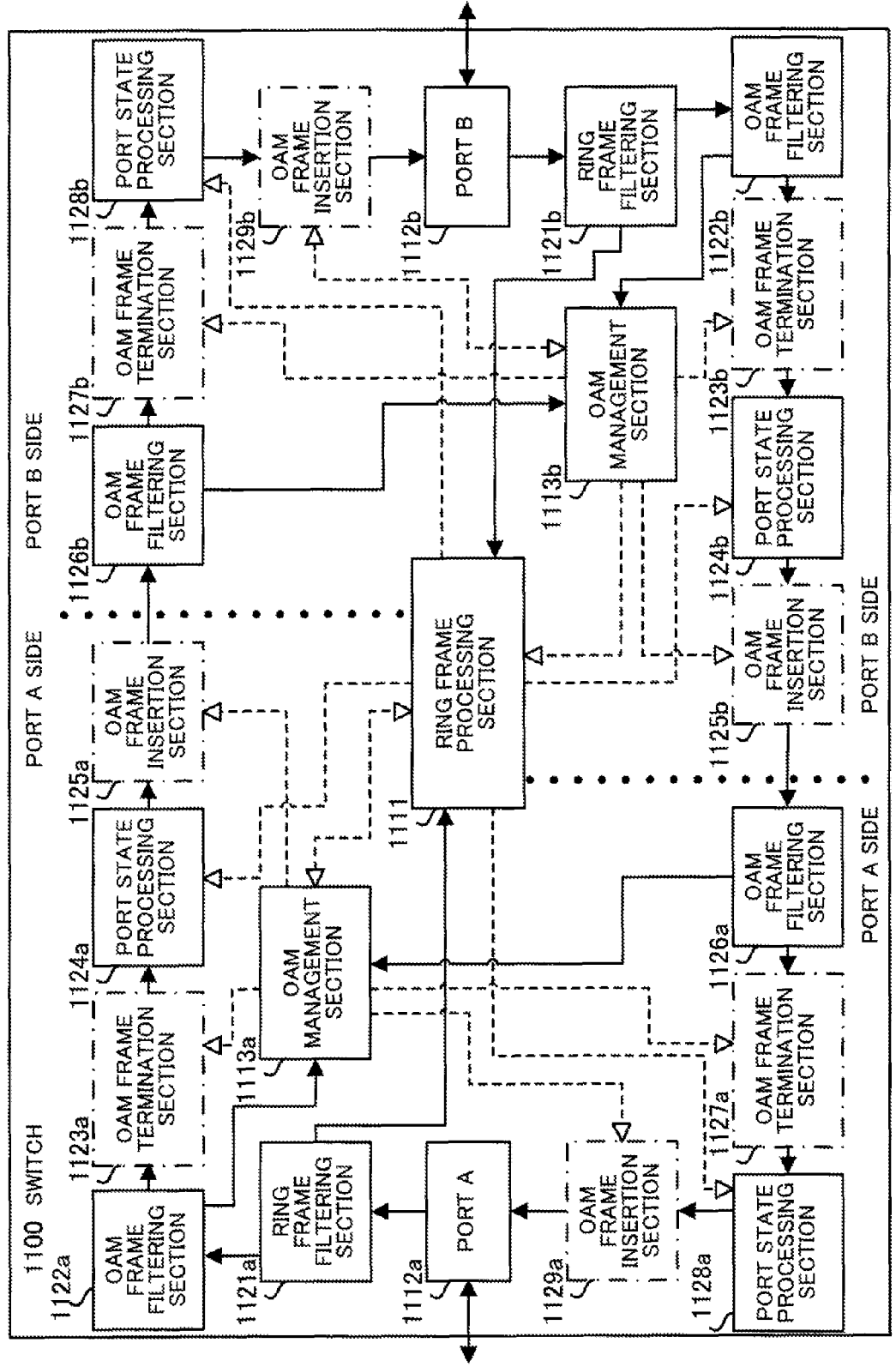
Figure 32:
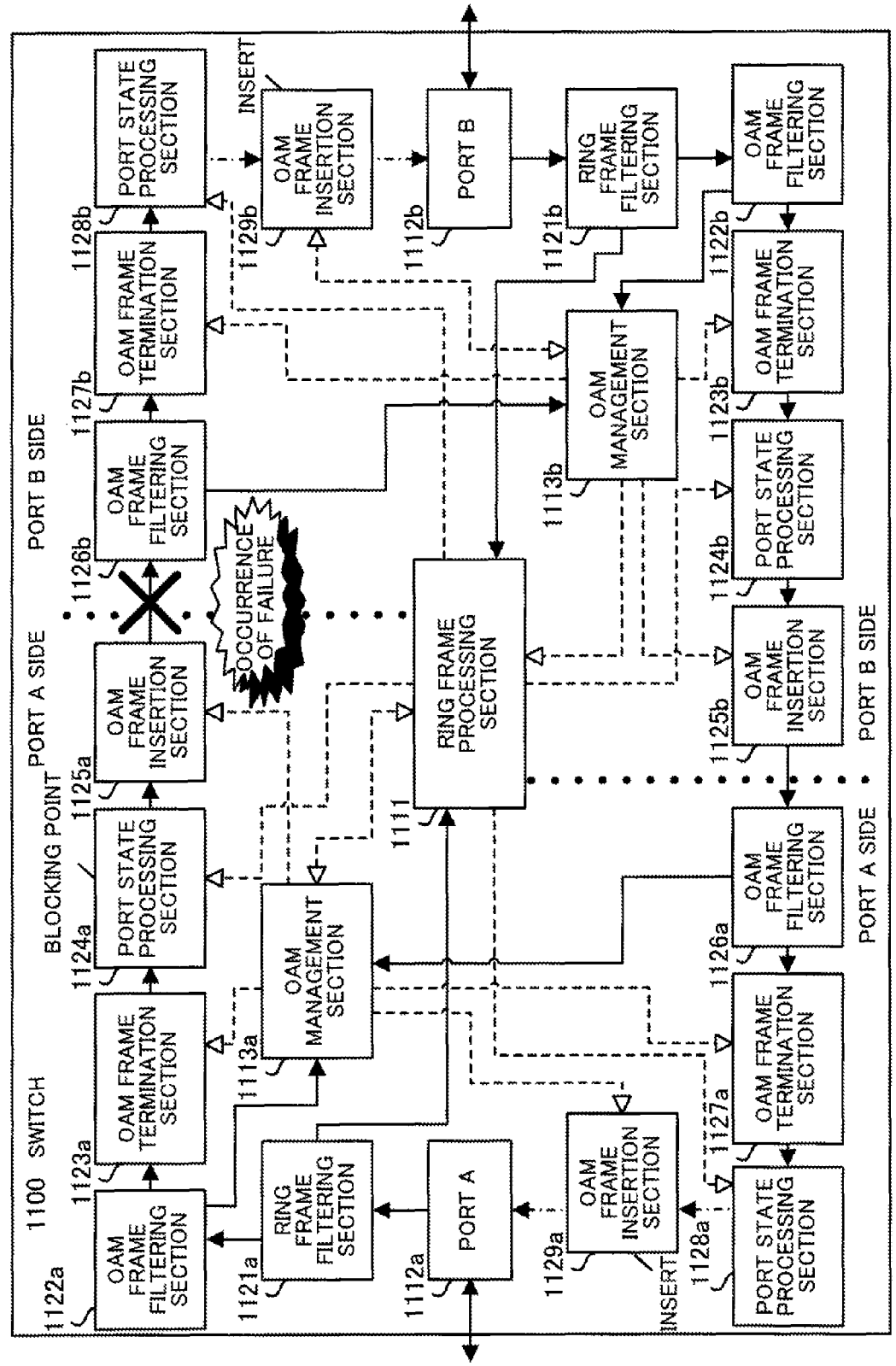

FIGS. 7A and 7B respectively illustrate the state of a network system according to a first embodiment before and after the occurrence of a failure in a communication channel;

FIG. 8 is a sequence diagram of a procedure performed at the time of detecting a failure which has occurred in a communication channel in the network system according to the first embodiment;

FIG. 9 illustrates the state of a switch which is included in the network system according to the first embodiment and which is set as a MEP before the occurrence of a failure in a communication channel;

FIG. 10 illustrates the state of the switch which is included in the network system according to the first embodiment and the setting of which is changed from a MEP to a MIP after the detection of a failure in a communication channel;

FIG. 11 illustrates the state of a switch which is included in the network system according to the first embodiment and which is set as a MIP before the occurrence of a failure;

FIG. 12 illustrates the state of the switch which is included in the network system according to the first embodiment and the setting of which is changed from a MIP to a MEP after the detection of a failure in a communication channel;

FIG. 13 illustrates the state of a switch which is included in the network system according to the first embodiment and the setting of which is changed from a MIP to a MEP after the detection of the failure in the communication channel;

FIG. 14 is a block diagram of the structure of a switch according to a second embodiment;

FIG. 15 illustrates the function of monitoring a network failure by the switch according to the second embodiment which is set as a MEP;

FIGS. 16A and 16B respectively illustrate the state of a network system according to a second embodiment before and after the occurrence of a failure in a switch;

FIG. 17 is a sequence diagram of a procedure performed at the time of detecting a failure which has occurred in a switch in the network system according to the second embodiment;

FIG. 18 illustrates the state of a switch which is included in the network system according to the second embodiment, which is set as a MIP, and in which a failure has occurred;

FIG. 19 illustrates the state of a switch which is included in the network system according to the second embodiment and which is set as a MEP before the occurrence of a failure in another switch;

FIG. 20 illustrates the state of a switch which is included in the network system according to the second embodiment and which is set as a MEP after the detection of a failure in another switch;

FIG. 21 illustrates the state of a switch which is included in the network system according to the second embodiment and which is set as a MIP before the occurrence of a failure in another switch;

FIG. 22 illustrates the state of a switch which is included in the network system according to the second embodiment and the setting of which is changed from a MIP to a MEP after the detection of the failure in another switch;

FIG. 23 is a block diagram of the structure of a switch according to a third embodiment;

FIGS. 24A and 24B respectively illustrate the state of a network system according to a third embodiment before and after the occurrence of a failure in a communication channel;

FIG. 25 is a sequence diagram of a procedure performed at the time of detecting a failure which has occurred in a communication channel in the network system according to the third embodiment;

FIG. 26 illustrates the state of the switch according to the third embodiment which is set as a MIP before the occurrence of a failure in a communication channel;

FIG. 27 illustrates the state of the switch according to the third embodiment the setting of which is changed from a MIP to a MEP after the detection of a failure in a communication channel connected;

FIG. 28 illustrates the state of the switch according to the third embodiment the setting of which is changed from a MIP to a MEP after the detection of the failure in the communication channel connected;

FIGS. 29A and 29B respectively illustrate the state of the network system according to the third embodiment before and after the occurrence of a failure in a switch;

FIG. 30 is a sequence diagram of a procedure performed at the time of detecting a failure which has occurred in a switch in the network system according to the third embodiment;

FIG. 31 illustrates the state of the switch according to the third embodiment which is set as a MIP before the occurrence of a failure in a switch; and FIG. 32 illustrates the state of the switch according to the third embodiment the setting of which is changed from a MIP to a MEP after the occurrence of the failure in the switch.

DESCRIPTION OF EMBODIMENT(S)

Embodiments of the present invention will now be described with reference to the accompanying drawings, wherein like reference numerals refer to like elements throughout.

Figure 1:
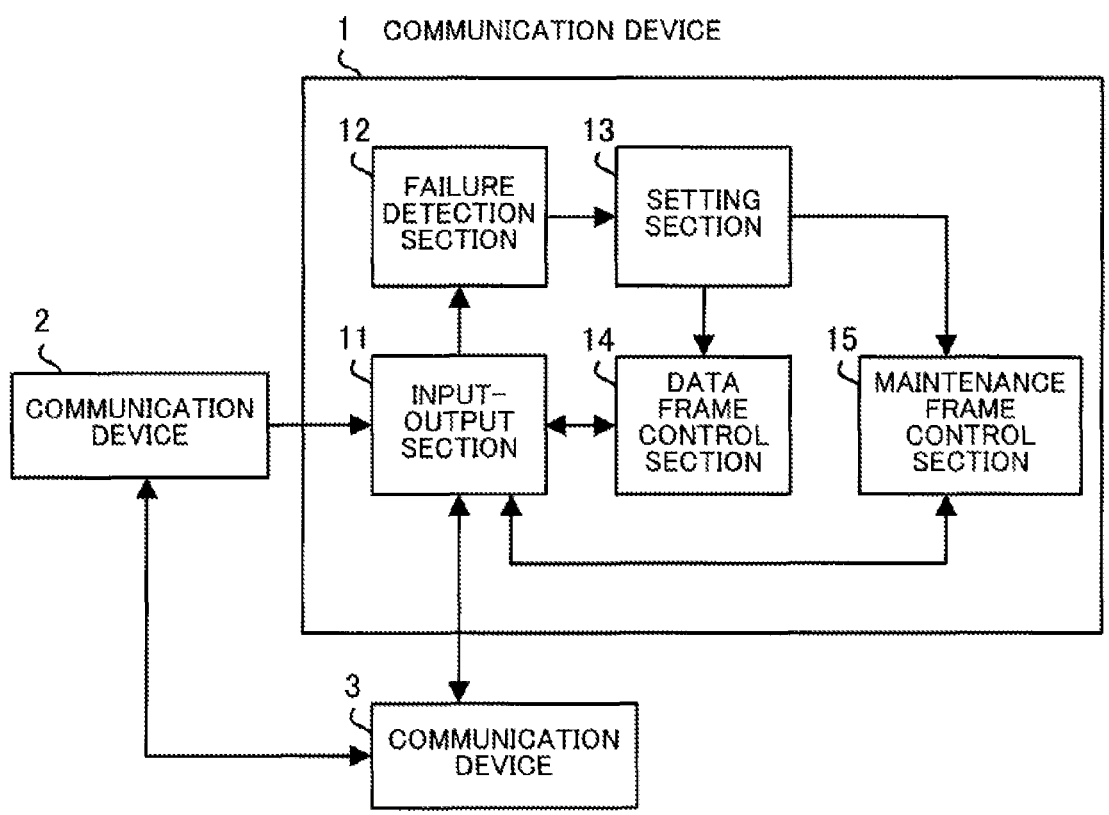
FIG. 1 illustrates a general view of one embodiment.

FIG. 1 illustrates a general view of one embodiment. As illustrated in FIG. 1, a communication device 1 according to the embodiment monitors the occurrence of a failure in a network system in which a frame is transferred by the use of a frame inputted to the communication device 1 and changes the setting of a communication device from termination according to a monitoring result. By doing so, a communication device which is a data frame termination node in a network can be changed and a communication device which is a maintenance management termination node can be changed on the basis of the change in data frame termination node.

The communication device 1 illustrated in FIG. 1 includes an input-output section 11, a failure detection section 12, a setting section 13, a data frame control section 14, and a maintenance frame control section 15.

The input-output section 11 can be connected via communication channels to other communication devices 2 and 3 and other machines with a communication function, such as computers, included in the network system having a ring network. Frames exchanged with, for example, the communication device 2 or 3 are inputted to or outputted from the input-output section 11. The frames inputted to or outputted from the input-output section 11 include a data frame for sending or receiving data, a control frame for controlling the ring network, a maintenance frame for maintaining the network system, and the like. An OAM frame based on E-OAM can be used as a maintenance frame. In this example, the communication device 1 is connected to the communication devices 2 and 3 by the input-output section 11.

The failure detection section 12 detects the occurrence of a failure in the network system on the basis of a frame inputted from the input-output section 11. For example, the failure detection section 12 detects the occurrence of a failure from the fact that input of arbitrary frame or a specific frame at the input-output section 11 is not detected for a certain period of time or that a control frame which is sent at the time of the occurrence of the failure is detected.

The setting section 13 sets the communication device 1 to either data frame termination or data frame transfer on the basis of the detection of the occurrence of the failure by the failure detection section 12. A frame is terminated (blocked) or transferred (forwarded) by the data frame control section 14 or the maintenance frame control section 15 on the basis of the setting by the setting section 13.

The data frame control section 14 exercises control on the basis of the setting of the communication device 1 to data frame termination or data frame transfer by the setting section 13 so as to terminate or transfer a data frame inputted from the input-output section 11. As a result, the data frame is terminated or transferred.

The maintenance frame control section 15 exercises control on the basis of the setting of data frame termination or data frame transfer by the setting section 13 so as to terminate or transfer a maintenance frame inputted from the input-output section 11. As a result, maintenance frame termination or maintenance frame transfer is set according to the setting of data frame termination or data frame transfer in the network system.

With the above communication device 1, a frame is inputted to or outputted from the input-output section 11. The failure detection section 12 detects the occurrence of a failure in the network system on the basis of the frame inputted from the input-output section 11. The setting section 13 sets the communication device 1 to either data frame termination or data frame transfer on the basis of the detection of the occurrence of the failure by the failure detection section 12. The data frame control section 14 exercises control on the basis of the setting of the communication device 1 to data frame termination or data frame transfer by the setting section 13 so as to terminate or transfer a data frame inputted from the input-output section 11. The maintenance frame control section 15 exercises control on the basis of data frame setting by the setting section 13 so as to terminate or transfer a maintenance frame inputted from the input-output section 11.

As a result, a communication device which is a data frame termination node in the network system can be changed and a communication device which is a maintenance management termination node can be changed according to the change in data frame termination node.

[First Embodiment]

Figure 2:
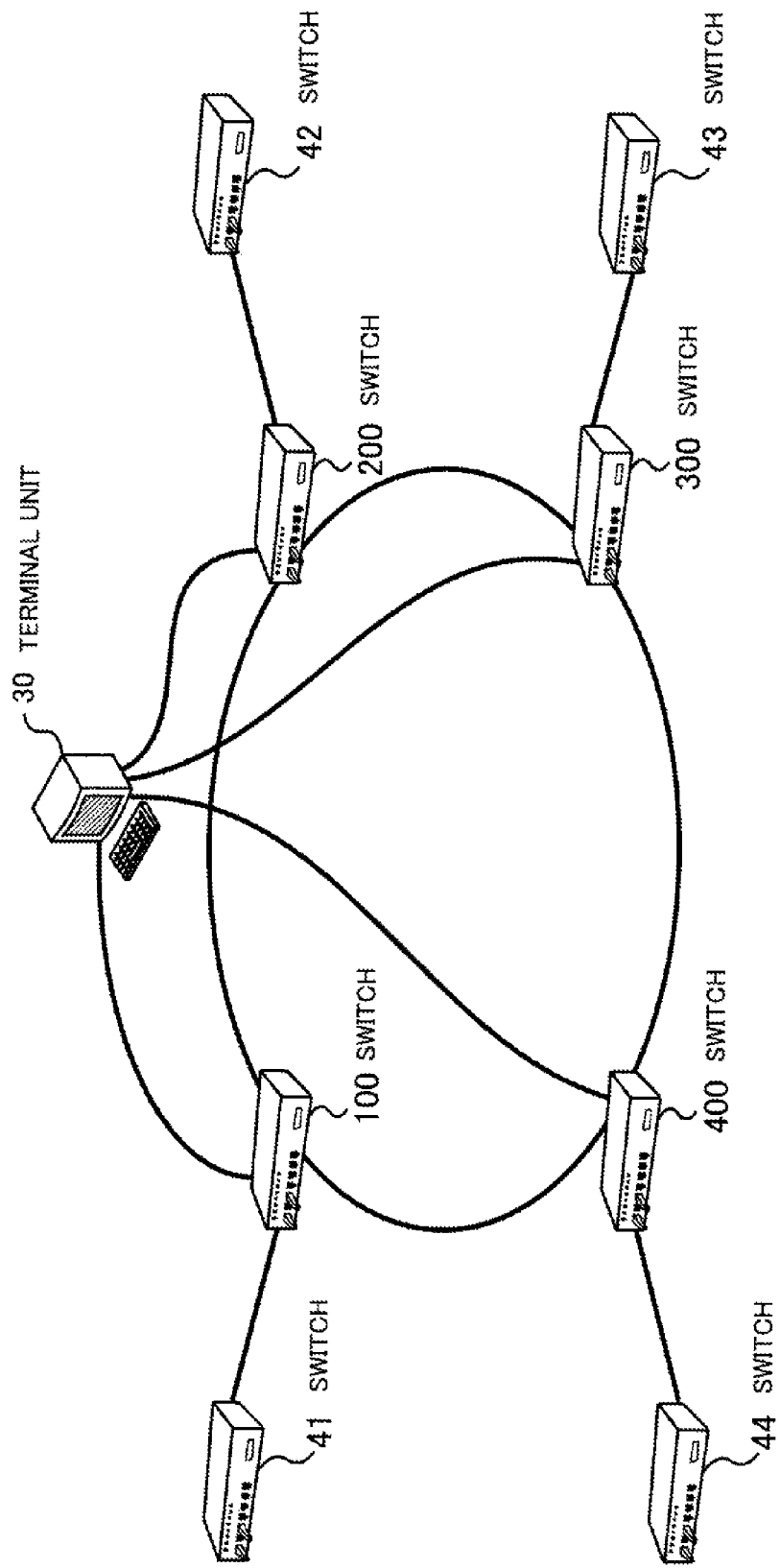
FIG. 2 illustrates an example configuration of a network system.

FIG. 2 illustrates an example configuration of a network system. A network system according to a first embodiment includes a LAN using Ethernet. A plurality of layer 2 switches relay a frame at the data link layer so that each switch can send or receive data.

The network system illustrated in FIG. 2 includes switches 100, 200, 300, and 400 which make up a ring network, a maintenance terminal unit 30 which manages the switches that make up the ring network, and switches 41, 42, 43, and 44 connected to the switches which make up the ring network.

The switch 100 is a layer 2 switch, has the function of transferring a frame, and has a function as a MIP or a MEP according to setting. Each of the switches 200, 300, and 400 has the same structure as the switch 100 has. In addition, each of the switches 200, 300, and 400 has the same function as the switch 100 has.

The maintenance terminal unit 30 is used by a network system administrator for maintaining the switches. Each of the switches 41, 42, 43, and 44 has the function of transferring a frame. A frame is transferred between each of the switches 41, 42, 43, and 44 and the ring network including the switches 100, 200, 300, and 400. By doing so, each of the switches 41, 42, 43, and 44 relays communication via the ring network.

The switch 100 is connected to the switches 200 and 400 and the switch 41. The switch 200 is connected to the switches 100 and 300 and the switch 42. The switch 300 is connected to the switches 200 and 400 and the switch 43. The switch 400 is connected to the switches 100 and 300 and the switch 44.

The maintenance terminal unit 30 is connected to the switches 100, 200, 300, and 400. Switches are connected by one or more physical links (Ethernet cable, for example). Each switch and the maintenance terminal unit 30 are connected by one or more physical or logical links.

The switches 100, 200, 300, and 400 make up the ring network which is a LAN. Each of the switches 41, 42, 43, and 44 is included in another communication device (not illustrated) or another network (not illustrated). A frame is transferred between the switch 41 and the switch 100 to which the switch 41 is connected. Similarly, a frame is transferred between the switch 42 and the switch 200 to which the switch 42 is connected. A frame is transferred between the switch 43 and the switch 300 to which the switch 43 is connected. A frame is transferred between the switch 44 and the switch 400 to which the switch 44 is connected. By doing so, a frame is transferred between the ring network and another communication device or another network. Each of the switches 41, 42, 43, and 44 relays a frame from a source (not illustrated) connected directly or indirectly to a network system to a destination (not illustrated) connected directly or indirectly to a destination network system in accordance with an address included in the frame.

Figure 3A:
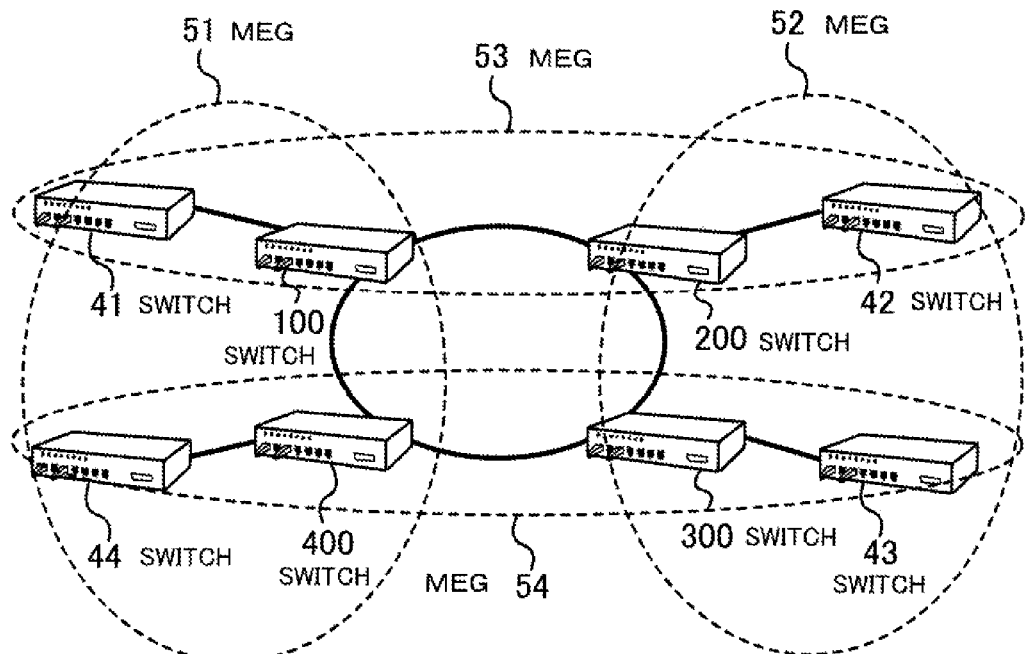
FIGS. 3A and 3B illustrate MEG setting in a network system.
Figure 3B:
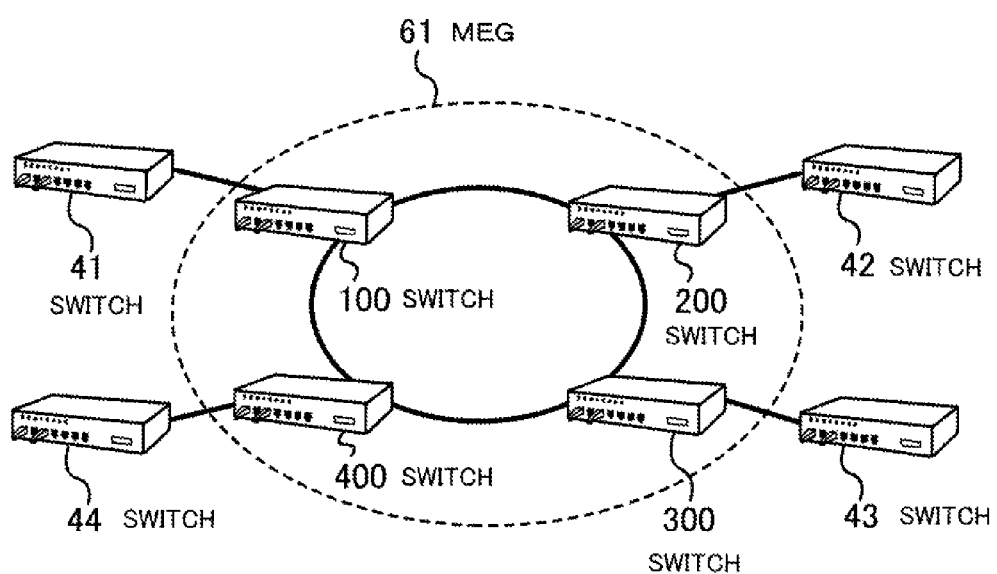

FIGS. 3A and 3B illustrate MEG setting in a network system. FIG. 3A illustrates an example of MEG structure in a network system taken for comparison. FIG. 3B illustrates an example of MEG structure according to this embodiment in a network system.

The MEG structure according to this embodiment will now be described by the use of a network system which includes switches 41, 42, 43, and 44 and switches 100, 200, 300, and 400 and which is illustrated in FIG. 3A or 3B. A comparison will also be made between the MEG structure according to this embodiment and the MEG structure illustrated in FIG. 3A.

In the example which is taken for comparison and which is illustrated in FIG. 3A, four MEGs 51, 52, 53, and 54 monitor a ring network of the network system made up of the switches 100, 200, 300, and 400.

In the example taken for comparison, it is assumed that each of the switches 41, 42, 43, and 44 has the function of transferring a frame and that each of the switches 41, 42, 43, and 44 has a function as a MEP based on E-OAM. Each of the switches 41, 42, 43, and 44 has these functions. Therefore, a frame is transferred between each of the switches 41, 42, 43, and 44 and the ring network made up of the switches 100, 200, 300, and 400. In addition, each of the switches 41, 42, 43, and 44 inserts or terminates an OAM frame.

The MEG 51 includes the switches 41, 100, 400, and 44 connected in that order. In the MEG 51, the switches 41 and 44 are set as MEPs and the switches 100 and 400 are set as MIPs. By doing so, the occurrence of a failure is monitored between the switches 100 and 400 in the ring network.

The MEG 52 includes the switches 42, 200, 300, and 43 connected in that order. In the MEG 52, the switches 42 and 43 are set as MEPs and the switches 200 and 300 are set as MIPs. By doing so, the occurrence of a failure is monitored between the switches 200 and 300 in the ring network.

The MEG 53 includes the switches 41, 100, 200, and 42 connected in that order. In the MEG 53, the switches 41 and 42 are set as MEPs and the switches 100 and 200 are set as MIPs. By doing so, the occurrence of a failure is monitored between the switches 100 and 200 in the ring network.

The MEG 54 includes the switches 43, 300, 400, and 44 connected in that order. In the MEG 54, the switches 43 and 44 are set as MEPs and the switches 300 and 400 are set as MIPs. By doing so, the occurrence of a failure is monitored between the switches 300 and 400 in the ring network.

In the example of MEG structure according to this embodiment illustrated in FIG. 3B, on the other hand, a MEG 61 monitors a ring network of the network system made up of the switches 100, 200, 300, and 400.

In this example, each of the switches 41, 42, 43, and 44 has the function of transferring a frame, so a frame is transferred between each of the switches 41, 42, 43, and 44 and the ring network made up of the switches 100, 200, 300, and 400.

The MEG 61 includes the switches 100, 200, 300, and 400 connected in that order. In the MEG 61, one (switch 100, for example) of the switches 100, 200, 300, and 400 is set as a MEP and the other switches (switches 200, 300, and 400, for example) are set as MIPs. By doing so, the occurrence of a failure can be monitored in the ring network.

In the example which is taken for comparison and which is illustrated in FIG. 3A, in order to monitor the occurrence of a failure in the ring network, the switches 41, 42, 43, and 44 outside the ring network are set as MEPs and the MEGs 51, 52, 53, and 54 including the switches 41, 42, 43, and 44 are formed. In this case, it is necessary to perform MEG setting not only on the switches 100, 200, 300, and 400 inside the ring network but also on the switches 41, 42, 43, and 44 outside the ring network. Accordingly, the system becomes complex. Furthermore, a plurality of MEGs are formed, so many E-OAM frames are transferred. As a result, additional resources are necessary for maintaining the system.

In the example of MEG structure according to this embodiment illustrated in FIG. 3B, on the other hand, the ring network can be monitored only by one MEG (MEG 61). Accordingly, the number of switches necessary for complying with E-OAM can be reduced and the amount of MEG setting work can be reduced. Moreover, only one MEG is formed, so the number of E-OAM frames transferred is small. As a result, the number of resources necessary for maintaining the system can be reduced.

That is to say, if the ring network is monitored by forming the MEGs in the way illustrated in FIG. 3A, it is necessary to form the MEGs by setting the devices outside the ring network as MEPs. Accordingly, it is necessary to set not only the switches inside the ring network but also the switches outside the ring network. As a result, the network system becomes complex and additional system resources are necessary. In the example of MEG structure according to this embodiment illustrated in FIG. 3B, on the other hand, the whole of the ring network can be monitored by one MEG.

Figure 4:
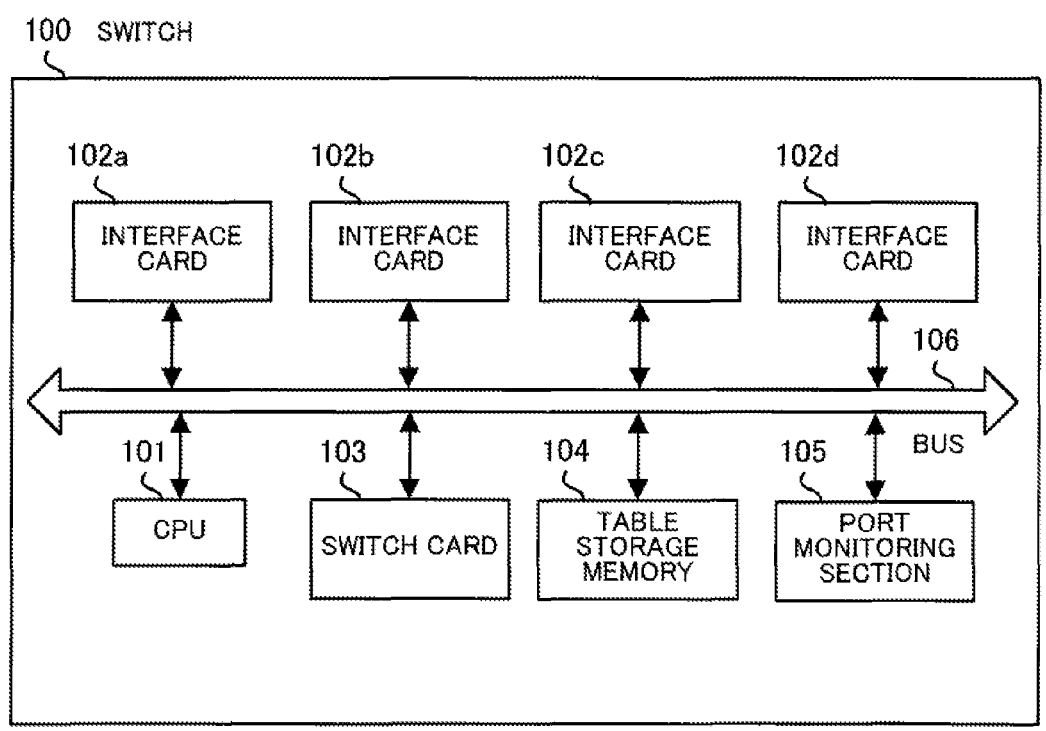
FIG. 4 illustrates the hardware configuration of a switch.

FIG. 4 illustrates the hardware configuration of a switch. FIG. 4 illustrates the internal structure of the switch 100. However, the switches 200, 300, and 400 can also be realized by adopting the same structure. The switch 100 includes a CPU 101, interface cards 102a, 102b, 102c, and 102d, a switch card 103, a table storage memory 104, a port monitoring section 105, and a bus 106.

The CPU (central processing unit) 101 controls the whole of the switch 100. The CPU 101 performs a process based on a program. The CPU 101 executes a program held in a memory (not illustrated) by the use of data held in the memory (not illustrated). The CPU 101 receives a command sent from the terminal unit 30 (described above in FIG. 2) used by the network system administrator via a communication interface (not illustrated) and sends a result obtained by executing the command to the terminal unit 30.

The table storage memory 104 stores a plurality of tables. The tables stored in the table storage memory 104 include a table for managing the structure of a logical link, a table for determining a frame destination in the logical link, and a table which stores information indicative of the frame destination.

The CPU 101, the interface cards 102a, 102b, 102c, and 102d, the switch card 103, the table storage memory 104, and the port monitoring section 105 are connected to the bus 106.

Each of the interface cards 102a, 102b, 102c, and 102d has a plurality of (eight, for example) communication ports. One physical link can be connected to each communication port. Each of the interface cards 102a, 102b, 102c, and 102d monitors its communication ports and acquires a frame. In preparation for the simultaneous arrival of frames at a plurality of communication ports, each of the interface cards 102a, 102b, 102c, and 102d has a built-in buffer for temporarily holding a frame. Each of the interface cards 102a, 102b, 102c, and 102d sends a frame acquired to the switch card 103.

The switch card 103 includes a learning table (not illustrated). The switch card 103 associates an address of a source of a frame received in the past with identification data for a communication port at which the frame arrived or a logical link via which the frame arrived, and stores them in the learning table. The learning table is updated at any time by the switch card 103.

When the switch card 103 receives a frame from one of the interface cards 102a, 102b, 102c, and 102d, the switch card 103 refers to the learning table and determines a destination of the frame. If the destination of the frame which the switch card 103 determines is a logical link, then the switch card 103 refers to a table stored in the table storage memory 104 and determines a specific interface card (interface card 102a, 102b, 102c, or 102d) and communication port to be used for transferring the frame. After that, the switch card 103 sends the frame to the interface card (interface card 102a, 102b, 102c, or 102d) determined.

The interface card 102a, 102b, 102c, or 102d which receives the frame sends the frame from the communication port determined to the destination.

The port monitoring section 105 monitors the communication ports of the interface cards 102a, 102b, 102c, and 102d. When the port monitoring section 105 detects a failure in or the restoration of a physical link connected to a communication port of the interface card 102a, 102b, 102c, or 102d, the port monitoring section 105 sends the CPU 101 notice to that effect.

Figure 5:
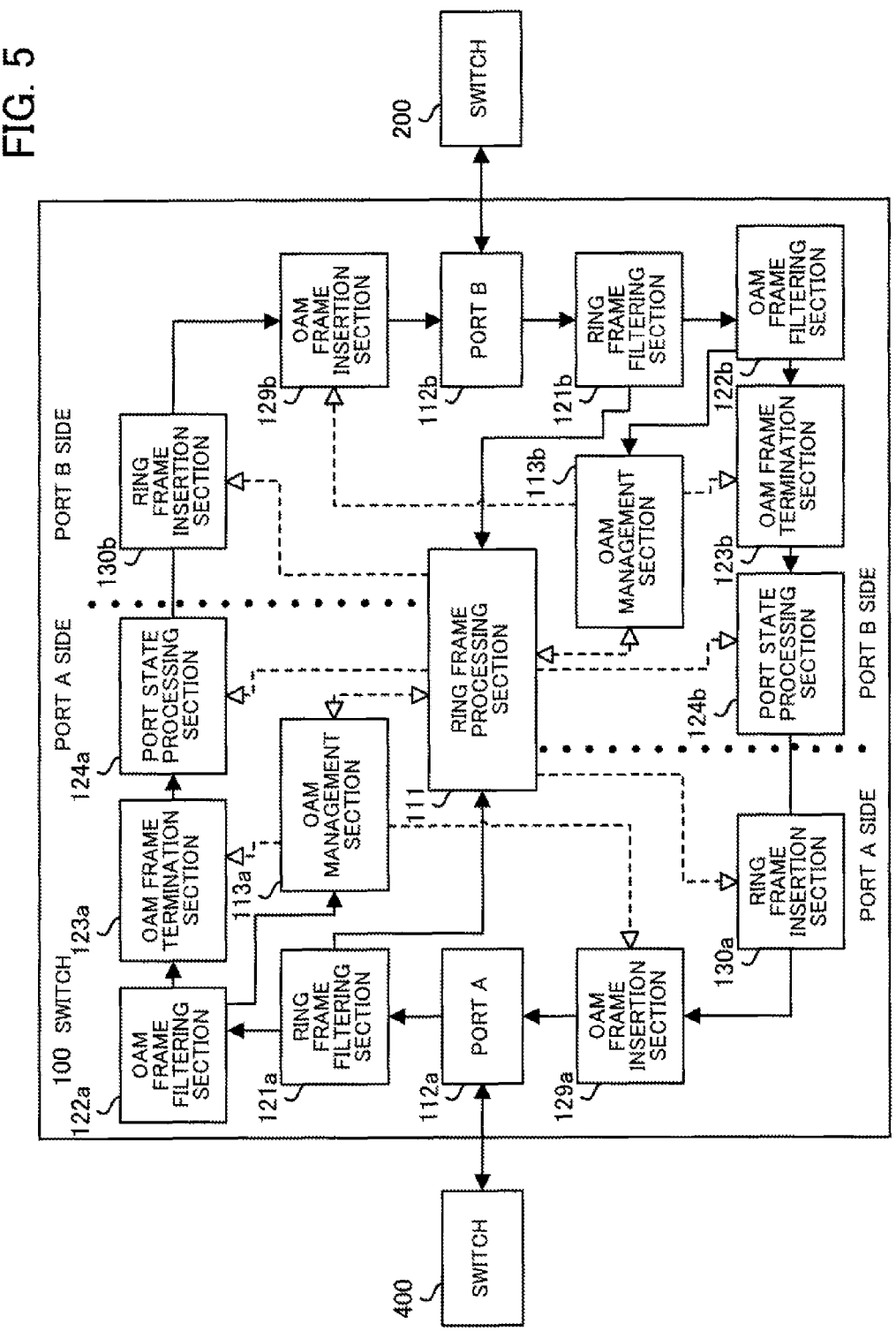
FIG. 5 is a block diagram of the structure of a switch according to a first embodiment.

FIG. 5 is a block diagram of the structure of a switch according to a first embodiment. FIG. 5 illustrates the function of the switch 100. However, the other switches 200, 300, and 400 described in FIG. 2 can also be realized by adopting the same structure that the switch 100 has, and have the same function that the switch 100 has. A solid-line arrow indicates data frame sending. A dotted-line arrow indicates control in the switch 100. (The same applies to other figures.)

The switch 100 according to the first embodiment monitors the occurrence of a failure in the network system in which a frame is transferred. By doing so, the switch 100 changes a data frame termination switch (hereinafter referred to as a termination node) in the network and changes a MEP which is based on E-OAM and which is a maintenance management termination node on the basis of the change in data frame termination node. The switch 100 includes a ring frame processing section 111, a port A 112a, a port B 112b, OAM management sections 113a and 113b, ring frame filtering sections 121a and 121b, OAM frame filtering sections 122a and 122b, OAM frame termination sections 123a and 123b, port state processing sections 124a and 124b, OAM frame insertion sections 129a and 129b, ring frame insertion sections 130a and 130b, and a user command processing section (not illustrated). Ethernet is used in the network system.

The ring frame processing section 111 controls the ring network for transferring a ring frame. In addition, the ring frame processing section 111 controls the switch 100 in accordance with a command of which the user command processing section informs the ring frame processing section 111.

Each of the port A 112a and the port B 112b is connected to another switch by a communication channel of the ring network. A frame is inputted to the port A 112a from a switch connected thereto or a frame is outputted from the port A 112a to the switch connected thereto. Similarly, a frame is inputted to the port B 112b from a switch connected thereto or a frame is outputted from the port B 112b to the switch connected thereto.

The OAM management sections 113a and 113b included correspond to the port A 112a and the port B 112b, respectively, and make the switch 100 function as a MIP or a MEP in accordance with setting which a user performs by the use of the terminal unit 30. In addition, the OAM management sections 113a and 113b accept OAM frames from the OAM frame filtering sections 122a and 122b, respectively, and control the switch 100 with regard to OAM frame transfer in accordance with the contents of the OAM frames accepted. Moreover, the OAM management sections 113a and 113b detect the occurrence of a failure in the ring network on the basis of the OAM frames accepted.

The ring frame filtering sections 121a and 121b included correspond to the port A 112a and the port B 112b respectively. The ring frame filtering sections 121a and 121b extract ring frames from frames inputted from the port A 112a and the port B 112b, respectively, and transfer the ring frames extracted to the ring frame processing section 111. The ring frames include a control frame and a data frame. In the first embodiment, blocking point change notice is sent as a control frame. Furthermore, in the first embodiment blocking point change notice functions as setting change notice.

The OAM frame filtering sections 122a and 122b included correspond to the port A 112a and the port B 112b respectively. The OAM frame filtering sections 122a and 122b extract OAM frames from the frames inputted from the port A 112a and the port B 112b, respectively, and transfer the OAM frames extracted to the OAM management sections 113a and 113b respectively. The OAM frames are transferred to the ring frame processing section 111 via the OAM management sections 113a and 113b.

The OAM frame termination sections 123a and 123b included correspond to the port A 112a and the port B 112b respectively. The OAM frame termination sections 123a and 123b terminate OAM frames inputted from the port A 112a and the port B 112b by the control of the OAM management sections 113a and 113b respectively.

The port state processing sections 124a and 124b included correspond to the port A 112a and the port B 112b respectively. The port state processing sections 124a and 124b terminate data frames inputted from the port A 112a and the port B 112b, respectively, by the control of the ring frame processing section 111.

The OAM frame insertion sections 129a and 129b included correspond to the port A 112a and the port B 112b respectively. The OAM frame insertion sections 129a and 129b insert OAM frames to be outputted from the port A 112a and the port B 112b by the control of the OAM management sections 113a and 113b respectively.

The ring frame insertion sections 130a and 130b included correspond to the port A 112a and the port B 112b respectively. The ring frame insertion sections 130a and 130b insert ring frames to be outputted from the port A 112a and the port B 112b, respectively, by the control of the ring frame processing section 111.

The user command processing section accepts a command, such as setting regarding ring frame processing by the network system or the switch 100, which a user issues by operating the terminal unit 30 (described above in FIG. 2), and informs the ring frame processing section 111 of the command accepted.

With the switch 100 according to the first embodiment, each of the above sections functions as follows.

The ring frame processing section 111 detects the occurrence of a failure in the network system on the basis of a ring frame which is inputted from the port A 112a or the port B 112b and which is extracted by the ring frame filtering section 121a or 121b. In this case, the ring frame processing section 111 monitors control frames which are inputted from the port A 112a and the port B 112b and which are extracted by the ring frame filtering sections 121a and 121b. If the ring frame processing section 111 detects a control frame by which notice of the occurrence of a failure is given, then the ring frame processing section 111 detects the occurrence of the failure in a communication channel of the network system on the basis of the extracted control frame by which notice of the occurrence of the failure is given.

For example, the ring frame processing section 111 detects the occurrence of a failure in the network system from the fact that a ring frame inputted from the port A 112a or the port B 112b is not detected for a certain period of time or that blocking point change notice included in control frames included in ring frames extracted by the ring frame filtering section 121a or 121b is received. The ring frame processing section 111 and the ring frame filtering sections 121a and 121b included in the switch 100 according to the first embodiment function as the failure detection section illustrated in FIG. 1.

The blocking point change notice is given for informing another switch (switch 200, 300, or 400, for example) of setting a switch in the network system to data frame termination or data frame transfer.

If the ring frame processing section 111 detects the occurrence of a failure in a communication channel adjacent to the switch 100 from the fact that, for example, a ring frame extracted by the ring frame filtering section 121a or 121b is not detected for a certain period of time, then the ring frame processing section 111 makes the ring frame insertion section 130a or 130b insert blocking point change notice for informing that an adjacent switch connected by the communication channel in which the occurrence of the failure is detected is set to "data frame termination" of data frame termination and data frame transfer.

A communication channel adjacent to a switch is a communication channel connected to the switch and another switch does not intervene between the communication channel and the switch. A switch adjacent to a second switch is a switch connected to the second switch by a communication channel and another switch does not intervene between the switch and the second switch.

At this time the ring frame processing section 111 makes the ring frame insertion section 130a or 130b insert blocking point change notice for informing that a switch which is set to "data frame termination" of data frame termination and data frame transfer before the detection of the failure is set to "data frame transfer" of data frame termination and data frame transfer. In addition, at this time the ring frame processing section 111 sets the switch 100 to "data frame termination" of data frame termination and data frame transfer.

Moreover, if the ring frame processing section 111 detects the occurrence of a failure in a communication channel on the basis of blocking point change notice which is sent from another switch and which is extracted by the ring frame filtering section 121a or 121b, then the ring frame processing section 111 sets the switch 100 to data frame termination or data frame transfer in accordance with setting designated in the extracted blocking point change notice.

Furthermore, the ring frame processing section 111 sets OAM frame termination or OAM frame transfer on the basis of which of data frame termination and data frame transfer is set. That is to say, if the ring frame processing section 111 performs setting for terminating a data frame inputted from the port A 112a, then the ring frame processing section 111 performs setting for terminating an OAM frame inputted from the port A 112*a*. The same applies to the case where a data frame is inputted from the port B 112*b* or where data frame transfer is set.

The port state processing section 124*a* or 124*b* or the OAM frame termination section 123*a* or 123*b* terminates or transfers a frame on the basis of setting performed by the ring frame processing section 111. The ring frame processing section 111 included in the switch 100 according to the first embodiment functions as the setting section illustrated in FIG. 1.

Each of the port A 112*a* and the port B 112*b* is connected via a communication channel to another communication device, such as the switch 200, 300, or 400, or another machine with a communication function, such as a computer, included in the network system. As a result, frames exchanged with, for example, the switch 200, 300, or 400 are inputted to or outputted from each of the port A 112*a* and the port B 112*b*. The port A 112*a* is connected to the switch 400 and the port B 112*b* is connected to the switch 200.

Frames inputted to or outputted from each of the port A 112*a* and the port B 112*b* include ring frames transferred in the ring network, maintenance frames for maintaining the network system having the ring network, and the like. The ring frames include data frames for sending or receiving data, control frames for controlling the ring network, and the like. In this embodiment, an OAM frame based on E-OAM is used as a maintenance frame. The port A 112*a* and the port B 112*b* included in the switch 100 according to the first embodiment function as the input-output section illustrated in FIG. 1.

The port state processing section 124*a* or 124*b* exercises control in accordance with the setting performed by the ring frame processing section 111 so that a data frame inputted from the port A 112*a* or the port B 112*b* will be terminated or transferred. By doing so, the data frame is terminated or transferred. The port state processing sections 124*a* and 124*b* included in the switch 100 according to the first embodiment function as the data frame control section illustrated in FIG. 1.

For example, if the occurrence of a failure is detected in a communication channel (communication channel between the switches 100 and 200) adjacent to the port B 112*b* of the switch 100, then the ring frame processing section 111 performs setting so that the port state processing section 124*a* will terminate a data frame to be sent to the communication channel adjacent to the port B 112*b*. The port state processing section 124*a* terminates the data frame to be sent to the port B 112*b* on the basis of the setting performed by the ring frame processing section 111.

The OAM management sections 113*a* and 113*b* exercise control on the basis of the setting of data frame termination or data frame transfer performed by the ring frame processing section 111 so that the OAM frame termination sections 123*a* and 123*b* will terminate or transfer OAM frames inputted from the port A 112*a* and the port B 112*b* respectively.

If the switch 100 is set to OAM frame "termination" by the ring frame processing section 111, then the OAM management section 113*a* or 113*b* exercises control so that the OAM frame termination section 123*a* or 123*b* will terminate an OAM frame according to a point at which a failure detected has occurred.

The OAM frame termination section 123*a* or 123*b* exercises control by the control of the OAM management section 113*a* or 113*b* so that an OAM frame inputted from the port A 112*a* or the port B 112*b* will be terminated or transferred. As a result, OAM frame termination or OAM frame transfer is set on the basis of the setting of data frame termination or data frame transfer in the network system. The OAM frame termination sections 123*a* and 123*b* included in the switch 100 according to the first embodiment function as the maintenance frame control section illustrated in FIG. 1.

The ring frame insertion section 130*a* or 130*b* inserts a ring frame by the control of the ring frame processing section 111. The ring frame insertion section 130*a* or 130*b* sends blocking point change notice for informing other switches that the switch 100 and another switch are set to "data frame termination" of data frame termination and data frame transfer according to a point in the network system at which a failure has occurred on the basis of the setting of data frame termination or data frame transfer performed by the ring frame processing section 111. The other switches which receive the blocking point change notice set themselves to ring frame transfer or ring frame termination and OAM frame transfer or OAM frame termination in accordance with the blocking point change notice received. The ring frame insertion sections 130*a* and 130*b* function as a change notice sending section.

Figure 6:
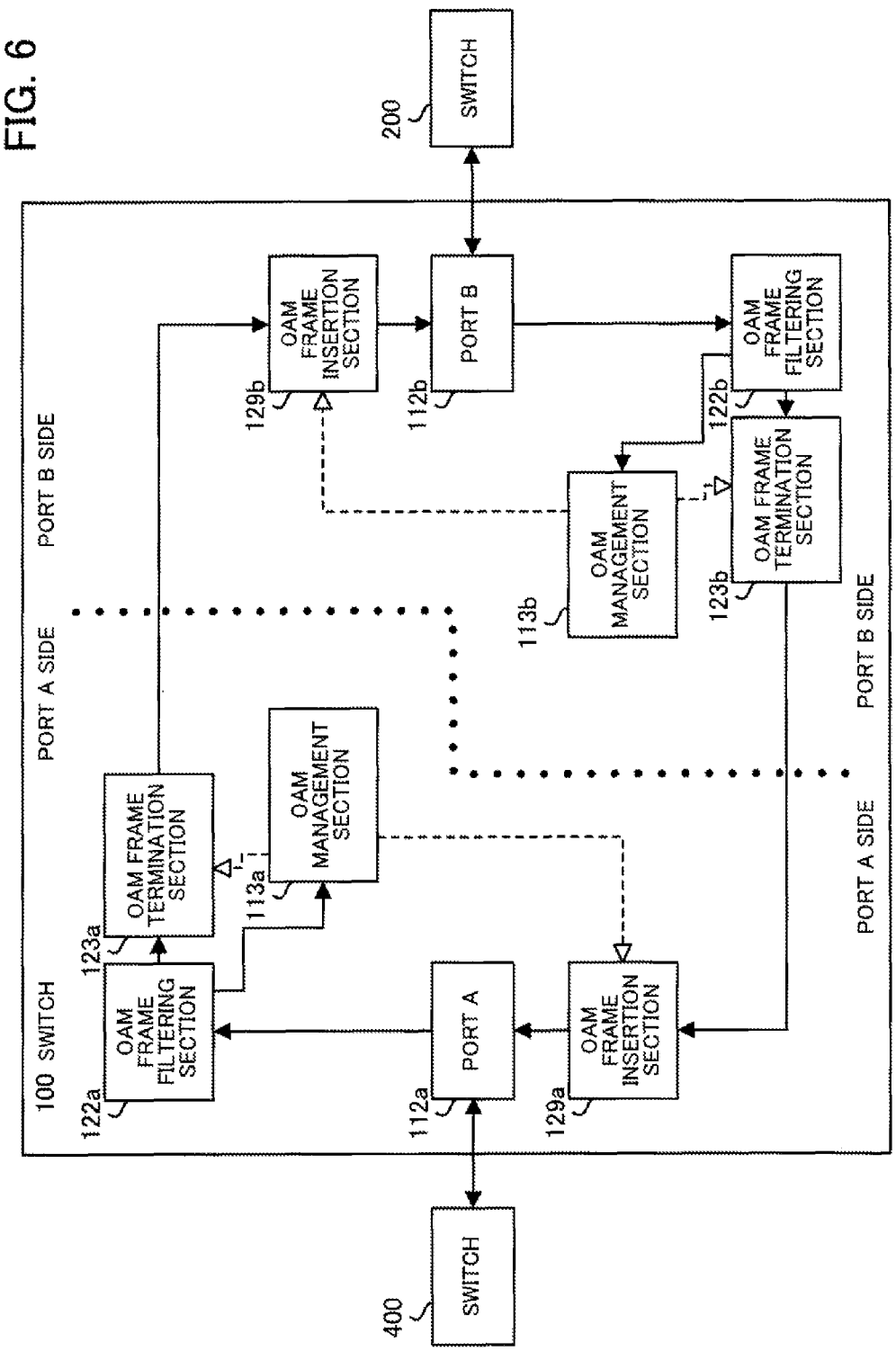
FIG. 6 illustrates the function of monitoring a network failure by the switch according to the first embodiment which is set as a MEP.

FIG. 6 illustrates the function of monitoring a network failure by the switch according to the first embodiment which is set as a MEP.

A process in which the switch according to the first embodiment that is set as a MEP monitors the occurrence of a failure in a communication channel by the use of an OAM frame will now be described with reference to FIG. 6.

As described above in FIG. 5, the port A 112*a* and the port B 112*b* of the switch 100 illustrated in FIG. 6 are connected to the switches 400 and 200, respectively, via the ring network (described above in FIG. 2).

When an OAM frame transferred from the switch 400 is inputted from the port A 112*a* of the switch 100, the OAM frame filtering section 122*a* extracts the OAM frame inputted from the port A 112*a* by the control of the OAM management section 113*a*. The OAM frame extracted by the OAM frame filtering section 122*a* is accepted by the OAM management section 113*a*. The switch 100 detects the occurrence of a failure in a communication channel on the basis of the OAM frame accepted by the OAM management section 113*a*, and is controlled in accordance with the OAM frame accepted.

The OAM frame termination section 123*a* is set to OAM frame termination by the control of the OAM management section 113*a*. Accordingly, the OAM frame transferred from the switch 400 via a communication channel is terminated in the switch 100.

In addition, the OAM frame insertion section 129*a* inserts an OAM frame by the control of the OAM management section 113*a*. By doing so, the OAM frame to be transferred to the switch 200 via a communication channel is inserted in the switch 100.

Similarly, when an OAM frame transferred from the switch 200 is inputted from the port B 112*b* of the switch 100, the OAM frame filtering section 122*b* and the OAM frame termination section 123*b* process the OAM frame by the control of the OAM management section 113*b*. Furthermore, the OAM frame insertion section 129*b* inserts an OAM frame to be transferred to the switch 200 via a communication channel by the control of the OAM management section 113*b*.

FIGS. 7A and 7B respectively illustrate the state of a network system according to a first embodiment before and after the occurrence of a failure in a communication channel. FIG. 7A illustrates a network system according to a first embodiment before the occurrence of a failure in a communication channel. FIG. 7B illustrates the network system according to the first embodiment after the occurrence of a failure in a communication channel.

With E-OAM, monitoring the connectivity of a network is the purpose of setting a MEP as a monitoring termination point which is a maintenance management termination node and setting a MIP as a monitoring intermediate point which is a maintenance management relay node. A monitor group which is called a MEG and which is made up of MEPs and MIPs is formed. An OAM frame is sent periodically. By doing so, the occurrence of a failure in the MEG is detected. A MIP and MEP in an initial state can be set arbitrarily on the basis of the determination of a user.

A MIP only refers to an OAM frame which passes therethrough. On the other hand, a MEP refers to an OAM frame it receives, terminates the OAM frame, and inserts an OAM frame.

By monitoring an outward frame exchanged with an external device, each of the switches 100, 200, 300, and 400 according to the first embodiment terminates an OAM frame received from a switch directly connected thereto by a communication channel and inserts an OAM frame to be transferred to an adjacent switch. By doing so, the occurrence of a failure in a communication channel between adjacent switches can be detected.

As illustrated in FIG. 7A, for convenience of explanation it is assumed that the network system according to the first embodiment includes the switches 100, 200, 300, and 400 connected in that order like a ring.

In FIG. 7A, a blocking point is set in the switch 100 and the switch 100 is set as a MEP.

As a result, a ring frame for transferring data and a control command and an OAM frame used for OAM which are sent from the switch 100 to the switch 200 are transferred from the switch 200 to the switch 300, are transferred from the switch 300 to the switch 400, are received again by the switch 100, and are terminated by the switch 100. A ring frame and an OAM frame sent from the switch 100 to the switch 400 are transferred from the switch 400 to the switch 300, are transferred from the switch 300 to the switch 200, are received again by the switch 100, and are terminated by the switch 100.

In FIG. 7B, a failure has occurred in a communication channel between the switches 300 and 400 in the network system illustrated in FIG. 7A. As a result of the occurrence of the failure, blocking point setting is changed from the switch 100 to the switches 300 and 400 and MEP setting is changed from the switch 100 to the switches 300 and 400. In addition, the setting of the switch 100 is changed to a MIP and the setting of the switch 100 is changed from a blocking point to forwarding.

As a result, a ring frame and an OAM frame sent from the switch 300 to the switch 200 are transferred from the switch 200 to the switch 100, are received by the switch 400, and are terminated by the switch 400. A ring frame and an OAM frame sent from the switch 400 to the switch 100 are transferred from the switch 100 to the switch 200, are received by the switch 300, and are terminated by the switch 300. A ring frame and an OAM frame are turned back by a switch on this side of the communication channel in which the failure has occurred, so communication is performed normally in the ring network without being influenced by the failure.

FIG. 8 is a sequence diagram of a procedure performed at the time of detecting a failure which has occurred in a communication channel in the network system according to the first embodiment.

A procedure performed at the time of detecting a failure among the switch 100 which is set as a blocking point and MEP before the occurrence of the failure and the switches 300 and 400 which are set as data frame relay nodes and MIPs based on E-OAM before the occurrence of the failure and which are set as blocking points and MEPs after the detection of the failure will now be described in accordance with FIG. 8.

[Step S101] Each node is set as a ring network by a control command sent from the terminal unit 30 (described above in FIG. 2). As a result, the switch 100 is set as a data frame blocking point. In addition, the switches 200 (described above in FIGS. 7A and 7B), 300 and 400 are set as data frame relay nodes.

[Step S102] The switch 100 is set as a MEP based on E-OAM by a control command sent from the terminal unit 30.

[Step S103] The switches 200, 300 and 400 are set as MIPs based on E-OAM by a control command sent from the terminal unit 30.

Initial setting regarding the ring network of the network system and E-OAM is completed by performing the above steps S101 through S103.

[Step S104] A ring frame processing section 311 (described later in FIG. 11) included in the switch 300 or a ring frame processing section 411 (described later in FIG. 13) included in the switch 400 detects the occurrence of a failure in a communication channel of the ring network from the occurrence of an abnormality in ring frame transfer on the basis of a ring network protocol.

[Step S105] The ring frame processing section 311 sets a blocking point in the switch 300.

[Step S106] The ring frame processing section 411 sets a blocking point in the switch 400.

[Step S107] The ring frame processing section 311 sends blocking point change notice to the whole of the ring network.

[Step S108] The ring frame processing section 411 sends blocking point change notice to the whole of the ring network.

By performing the above steps S107 and S108, the other switches are informed of a change in blocking point.

[Step S109] When the ring frame processing section 111 (described above in FIG. 5) included in the switch 100 receives the blocking point change notice, the ring frame processing section 111 changes the setting of the switch 100 from a blocking point to forwarding.

[Step S110] The ring frame processing section 111 changes the setting of the switch 100 from a MEP to a MIP.

[Step S111] The ring frame processing section 311 changes the setting of the switch 300 from a MIP to a MEP.

[Step S112] The ring frame processing section 411 changes the setting of the switch 400 from a MIP to a MEP.

The state before the occurrence of a failure and after the detection of the failure of each switch included in the network system will now be described.

A switch which is set as a MEP before the occurrence of a failure and the setting of which is changed to a MIP after the detection of the failure will be described first.

FIG. 9 illustrates the state of a switch which is included in the network system according to the first embodiment and which is set as a MEP before the occurrence of a failure in a communication channel. FIG. 10 illustrates the state of the switch which is included in the network system according to the first embodiment and the setting of which is changed from a MEP to a MIP after the detection of a failure in a communication channel.

A switch 100 illustrated in FIG. 9 or 10 includes a ring frame processing section 111, a port A 112a, a port B 112b, OAM management sections 113a and 113b, ring frame filtering sections 121a and 121b, OAM frame filtering sections 122a and 122b, OAM frame termination sections 123a and 123b, port state processing sections 124a and 124b, and OAM frame insertion sections 129a and 129b. This is the same with the switch 100 illustrated in FIG. 5. As stated above, a solid-line arrow indicates data frame sending. A dotted-line arrow indicates control in the switch 100. A dot-dash-line arrow indicates that a data frame is not sent because of termination by each port state processing section. Each block regarding an OAM frame indicated by a dot-dash line has stopped the function of inserting or terminating an OAM frame on the basis of data frame termination. (The same applies to other figures.)

As illustrated in FIG. 9, the switch 100 is set as a MEP before the occurrence of a failure and an OAM frame is terminated by the OAM frame termination section 123a or 123b. As a result, an OAM frame inputted from the port A 112a is terminated by the OAM frame termination section 123a and an OAM frame inputted from the port B 112b is terminated by the OAM frame termination section 123b.

In addition, an OAM frame is inserted by the OAM frame insertion section 129a or 129b. On the basis of a control command sent from the terminal unit 30, the ring frame processing section 111 requests the OAM management sections 113a and 113b to perform setting. By doing so, the above initial setting regarding OAM in the switch 100 is performed.

At this time the port state processing section 124a is set as a data frame blocking point in the switch 100. On the basis of a control command sent from the terminal unit 30, the ring frame processing section 111 sets the port state processing section 124a to data frame termination (makes blocking effective) and sets the port state processing section 124b to data frame transfer (blocking is ineffective and forwarding is performed). By doing so, initial setting regarding data frame blocking in the switch 100 is performed.

As illustrated in FIG. 10, the setting of the switch 100 is changed from a MEP to a MIP after the detection of the failure in the communication channel. OAM frame termination by the OAM frame termination sections 123a and 123b is released. As a result, an OAM frame inputted from the port A 112a passes through the OAM frame termination section 123a and is transferred to a switch (switch 200, for example) connected via the port B 112b. Furthermore, an OAM frame inputted from the port B 112b passes through the OAM frame termination section 123b and is transferred to a switch (switch 400, for example) connected via the port A 112a. An OAM frame is not inserted by the OAM frame insertion section 129a or 129b. On the basis of the receiving of blocking point change notice sent from another switch, the ring frame processing section 111 requests the OAM management sections 113a and 113b to make changes in the setting. By doing so, the above changes in the setting regarding OAM are made.

At this time the setting of the port state processing section 124a of the switch 100 is changed from a data frame blocking point to forwarding (transfer). On the basis of the receiving of the blocking point change notice sent from another switch, the ring frame processing section 111 changes the setting of the port state processing section 124a from data frame blocking (termination) to data frame forwarding. By doing so, the setting regarding a data frame blocking point is changed.

A switch which is set as a MIP before the occurrence of the failure and the setting of which is changed to a MEP after the detection of the failure will be described next.

FIG. 11 illustrates the state of a switch which is included in the network system according to the first embodiment and which is set as a MIP before the occurrence of a failure. FIG. 12 illustrates the state of the switch which is included in the network system according to the first embodiment and the setting of which is changed from a MIP to a MEP after the detection of a failure in a communication channel. FIG. 13 illustrates the state of a switch which is included in the network system according to the first embodiment and the setting of which is changed from a MIP to a MEP after the detection of the failure in the communication channel. As described above in FIG. 7B, it is assumed that a failure has occurred in a communication channel between switches 300 and 400.

A switch 300 illustrated in FIG. 11 or 12 includes a ring frame processing section 311, a port A 312a, a port B 312b, OAM management sections 313a and 313b, ring frame filtering sections 321a and 321b, OAM frame filtering sections 322a and 322b, OAM frame termination sections 323a and 323b, port state processing sections 324a and 324b, and OAM frame insertion sections 329a and 329b. This is the same with the switch 100 illustrated in FIG. 5 described above.

Similarly, a switch 400 illustrated in FIG. 13 includes a ring frame processing section 411, a port A 412a, a port B 412b, OAM management sections 413a and 413b, ring frame filtering sections 421a and 421b, OAM frame filtering sections 422a and 422b, OAM frame termination sections 423a and 423b, port state processing sections 424a and 424b, and OAM frame insertion sections 429a and 429b. This is the same with the switch 100 illustrated in FIG. 5 described above.

As illustrated in FIG. 11, the switch 300 is set as a MIP before the occurrence of a failure and an OAM frame is not terminated by the OAM frame termination section 323a or 323b. As a result, an OAM frame inputted from the port A 312a passes through the OAM frame termination section 323a and is transferred to a switch (switch 200, for example) connected via the port B 312b. Furthermore, an OAM frame inputted from the port B 312b passes through the OAM frame termination section 323b and is transferred to a switch (switch 400, for example) connected via the port A 312a. An OAM frame is not inserted by the OAM frame insertion section 329a or 329b. On the basis of a control command sent from the terminal unit 30, the ring frame processing section 311 requests the OAM management sections 313a and 313b to perform setting. By doing so, the above initial setting in the switch 300 regarding OAM is performed.

At this time the port state processing sections 324a and 324b of the switch 300 are set not to data frame blocking but to data frame forwarding. On the basis of a control command sent from the terminal unit 30, the ring frame processing section 311 sets the port state processing sections 324a and 324b to data frame transfer. By doing so, initial setting regarding data frame blocking in the switch 300 is performed. The switches 200 and 400 which are set as MIPs based on E-OAM before the occurrence of the failure, that is to say, which are set as data frame relay nodes before the occurrence of a failure are the same as the switch 300 before the occurrence of the failure. Therefore, descriptions of them will be omitted.

In FIG. 12, a failure has occurred in a communication channel on the port A 312a side of the switch 300 connected to the switch 400 in the network system.

The ring frame processing section 311 included in the switch 300 can detect the occurrence of the failure in the communication channel on the port A 312a side on the basis of the fact that a ring frame is not extracted by the ring frame filtering section 321a (for a certain period of time, for example). Alternatively, the ring frame processing section 311 can detect the occurrence of the failure in the communication channel on the port A 312a side on the basis of the detection of blocking point change notice transferred from another switch. When the ring frame processing section 311 detects the occurrence of the failure in the communication channel by either method, the setting of the switch 300 is changed from a MIP to a MEP. An OAM frame which is transferred from the switch 200 and which is inputted from the port B 312*b* is terminated by the OAM frame termination section 323*b*. In addition, an OAM frame which is to be sent from the port B 312*b* and which is to be transferred to the switch 200 is inserted by the OAM frame insertion section 329*b*.

On the basis of the detection of the occurrence of the failure in the communication channel or the receiving of the blocking point change notice sent from another switch, the ring frame processing section 311 requests the OAM management sections 313*a* and 313*b* to make changes in the setting. By doing so, the above changes in the setting regarding OAM are made.

At this time the port state processing section 324*b* is set as a data frame blocking point in the switch 300. On the basis of the detection of the occurrence of the failure in the communication channel or the receiving of the blocking point change notice sent from another switch, the ring frame processing section 311 sets the port state processing section 324*b* so as to terminate a data frame. By doing so, a change in the setting regarding a data frame blocking point is made.

In FIG. 13, the failure has occurred in the communication channel on the port B 412*b* side of the switch 400 connected to the switch 300 in the network system.

The ring frame processing section 411 included in the switch 400 can detect the occurrence of the failure in the communication channel on the port B 412*b* side on the basis of the fact that a ring frame is not extracted by the ring frame filtering section 421*a* (for a certain period of time, for example). Alternatively, the ring frame processing section 411 can detect the occurrence of the failure in the communication channel on the port B 412*a* side on the basis of the detection of blocking point change notice transferred from another switch. When the ring frame processing section 411 detects the occurrence of the failure by either method, the setting of the switch 400 is changed from a MIP to a MEP. An OAM frame which is transferred from the switch 100 and which is inputted from the port A 412*a* is terminated by the OAM frame termination section 423*a*. In addition, an OAM frame which is to be sent from the port A 412*a* and which is to be transferred to the switch 100 is inserted by the OAM frame insertion section 429*a*. On the basis of the detection of the occurrence of the failure in the communication channel or the receiving of the blocking point change notice sent from another switch, the ring frame processing section 411 requests the OAM management sections 413*a* and 413*b* to make changes in the setting. By doing so, the above changes in the setting regarding OAM are made.

At this time the port state processing section 424*a* is set as a data frame blocking point in the switch 400. On the basis of the detection of the occurrence of the failure in the communication channel or the receiving of the blocking point change notice sent from another switch, the ring frame processing section 411 sets the port state processing section 424*a* so as to terminate a data frame. By doing so, a change in setting regarding data frame blocking point is made.

As has been described in the foregoing, according to the first embodiment a data frame which is a ring frame and blocking point change notice are monitored. By doing so, the setting of a maintenance management termination node, that is to say, the setting of a MEP based on E-OAM can be changed according to a change in data frame termination node (change in blocking point) caused by the occurrence of a failure in a communication channel in the network system. As a result, labor required for the maintenance and management of the network system can be reduced.

In addition, the setting of a MEP based on E-OAM can be changed automatically according to a change in data frame blocking point in the ring network. Accordingly, the reliability of the network system is improved. The possibility that the occurrence of a failure is not detected because of the occurrence of a double failure can be reduced. For example, the possibility that in spite of the occurrence of a failure in the ring network, the failure is not detected, can be reduced.

[Second Embodiment]

A second embodiment will now be described. The differences between the above first embodiment and the second embodiment will be described mainly. The same symbols will be used for representing the same sections and descriptions of them will be omitted.

The second embodiment differs from the first embodiment in that each of switches 500, 600, 700, and 800 included in a network system detects a failure which has occurred therein by a ring frame and that each of the switches 500, 600, 700, and 800 can change the structure of a MEG based on E-OAM and the structure of a network in which ring frame transfer is performed according to the failure detected.

FIG. 14 is a block diagram of the structure of a switch according to the second embodiment. In FIG. 14, the function of the switch 500 is illustrated. However, the other switches 600, 700, and 800 described later in FIGS. 16A and 16B can be realized by adopting the same structure as the switch 500 has, and have the same function.

The switch 500 according to the second embodiment monitors the occurrence of a failure in the network system in which a frame is transferred. By doing so, the switch 500 changes a data frame termination node in the network and changes a MEP which is based on E-OAM and which is a maintenance management termination node on the basis of the change in data frame termination node. This is the same with the first embodiment. The switch 500 includes a ring frame processing section 511, a port A 512*a*, a port B 512*b*, OAM management sections 513*a* and 513*b*, ring frame filtering sections 521*a* and 521*b*, OAM frame filtering sections 522*a*, 522*b*, 526*a*, and 526*b*, OAM frame termination sections 523*a*, 523*b*, 527*a*, and 527*b*, port state processing sections 524*a*, 524*b*, 528*a*, and 528*b*, OAM frame insertion sections 525*a*, 525*b*, 529*a*, and 529*b*, ring frame insertion sections (not illustrated), and a user command processing section (not illustrated). Ethernet is used in the network system.

The ring frame processing section 511 controls a ring network for transferring a ring frame. In addition, the ring frame processing section 511 controls the switch 500 in accordance with a command of which the user command processing section informs the ring frame processing section 511.

Each of the port A 512*a* and the port B 512*b* is connected to another switch by a communication channel of the ring network. A frame is inputted to the port A 512*a* from a switch connected thereto or a frame is outputted from the port A 512*a* to the switch connected thereto. Similarly, a frame is inputted to the port B 512*b* from a switch connected thereto or a frame is outputted from the port B 512*b* to the switch connected thereto.

The OAM management sections 513*a* and 513*b* included correspond to the port A 512*a* and the port B 512*b*, respectively, and make the switch 500 function as a MIP or a MEP in accordance with setting which a user performs by the use of the terminal unit 30. In addition, the OAM management sections 513*a* and 513*b* accept OAM frames from the OAM frame filtering sections 522*a* and 526*a* and the OAM frame filtering sections 522*b* and 526*b*, respectively, and control the switch 500 with regard to OAM frame transfer in accordance with the contents of the OAM frames accepted.

The ring frame filtering sections 521*a* and 521*b* included correspond to the port A 512*a* and the port B 512*b* respectively. The ring frame filtering sections 521*a* and 521*b* extract ring frames from frames inputted from the port A 512a and the port B 512b, respectively, and transfer the ring frames extracted to the ring frame processing section 511. The ring frames include a control frame and a data frame. In the second embodiment, blocking point change notice is sent as a control frame. Furthermore, in the second embodiment blocking point change notice functions as setting change notice.

The OAM frame filtering sections 522a and 522b included correspond to the port A 512a and the port B 512b respectively. The OAM frame filtering sections 522a and 522b extract OAM frames from the frames inputted from the port A 512a and the port B 512b, respectively, and transfer the OAM frames extracted to the OAM management sections 513a and 513b respectively. The OAM frames are transferred to the ring frame processing section 511 via the OAM management sections 513a and 513b.

The OAM frame filtering sections 526a and 526b are included for extracting OAM frames inside the switch 500. The OAM frame filtering sections 526a and 526b extract OAM frames inserted by the OAM frame insertion sections 525b and 525a, respectively, and transfer the OAM frames extracted to the OAM management sections 513a and 513b respectively. These OAM frames are also transferred to the ring frame processing section 511 via the OAM management sections 513a and 513b.

The OAM frame termination sections 523a and 523b included correspond to the port A 512a and the port B 512b respectively. The OAM frame termination sections 523a and 523b terminate OAM frames inputted from the port A 512a and the port B 512b by the control of the OAM management sections 513a and 513b respectively.

The OAM frame termination sections 527a and 527b are included for terminating OAM frames inside the switch 500. The OAM frame termination sections 527a and 527b terminate OAM frames inserted by the OAM frame insertion sections 525b and 525a by the control of the OAM management sections 513a and 513b respectively.

The port state processing sections 524a and 524b included correspond to the port A 512a and the port B 512b respectively. The port state processing sections 524a and 524b terminate data frames inputted from the port A 512a and the port B 512b, respectively, by the control of the ring frame processing section 511.

The port state processing sections 528a and 528b are included for terminating data frames inside the switch 500. The port state processing section 528a terminates a data frame sent from the port B side to the port A side of the switch 500 by the control of the ring frame processing section 511. The port state processing section 528b terminates a data frame sent from the port A side to the port B side of the switch 500 by the control of the ring frame processing section 511.

The OAM frame insertion sections 525a and 525b are included for inserting OAM frames inside the switch 500. The OAM frame insertion section 525a inserts an OAM frame to be sent from the port A side to the port B side by the control of the OAM management section 513a. The OAM frame insertion section 525b inserts an OAM frame to be sent from the port B side to the port A side by the control of the OAM management section 513b.

The OAM frame insertion sections 529a and 529b included correspond to the port A 512a and the port B 512b respectively. The OAM frame insertion sections 529a and 529b insert OAM frames to be outputted from the port A 512a and the port B 512b by the control of the OAM management sections 513a and 513b respectively.

The ring frame insertion sections included correspond to the port A 512a and the port B 512b. The ring frame insertion sections insert ring frames to be outputted from the port A 512a and the port B 512b by the control of the ring frame processing section 511.

The user command processing section accepts a command, such as setting regarding ring frame processing by the network system or the switch 500, which a user issues by operating the terminal unit 30 (described above in FIG. 2), and informs the ring frame processing section 511 of the command accepted.

With the switch 500 according to the second embodiment, each of the above sections functions as follows.

The ring frame processing section 511 detects the occurrence of a failure in the network system on the basis of a ring frame which is inputted from the port A 512a or the port B 512b and which is extracted by the ring frame filtering section 521a or 521b. In this case, the ring frame processing section 511 monitors control frames which are inputted from the port A 512a and the port B 512b and which are extracted by the ring frame filtering sections 521a and 521b. If the ring frame processing section 511 detects a control frame by which notice of the occurrence of a failure is given, then the ring frame processing section 511 detects the occurrence of the failure in a communication channel of the network system on the basis of the extracted control frame by which notice of the occurrence of the failure is given.

For example, the ring frame processing section 511 detects the occurrence of a failure in the network system from the fact that a ring frame inputted from the port A 512a or the port B 512b is not detected for a certain period of time or that blocking point change notice extracted by the ring frame filtering section 521a or 521b is received. The ring frame processing section 511 and the ring frame filtering sections 521a and 521b included in the switch 500 according to the second embodiment function as the failure detection section illustrated in FIG. 1.

The blocking point change notice is given for informing another switch (switch 600, 700, or 800 described later in FIGS. 16A and 16B, for example) of setting a switch in the network system to data frame termination or data frame transfer.

If the ring frame processing section 511 detects the occurrence of a failure in a switch adjacent to the switch 500 from the fact that, for example, a ring frame extracted by the ring frame filtering section 521a or 521b is not detected for a certain period of time, then the ring frame processing section 511 makes a ring frame insertion section insert blocking point change notice for informing that a switch which is set to "data frame termination" of data frame termination and data frame transfer before the occurrence of the failure is set to "data frame transfer" of data frame termination and data frame transfer. In addition, at this time the ring frame processing section 511 sets the switch 500 to "data frame termination" of data frame termination and data frame transfer.

Moreover, if the ring frame processing section 511 detects the occurrence of a failure in a switch on the basis of blocking point change notice which is sent from another switch and which is extracted by the ring frame filtering section 521a or 521b, then the ring frame processing section 511 sets the switch 500 to data frame termination or data frame transfer in accordance with setting designated in the extracted blocking point change notice.

Furthermore, the ring frame processing section 511 sets OAM frame termination or OAM frame transfer on the basis of which of data frame termination and data frame transfer is set. That is to say, if the ring frame processing section 511 performs setting so as to terminate a data frame inputted from the port A 512a, then the ring frame processing section 511 performs setting so as to terminate an OAM frame inputted from the port A 512a. The same applies to the case where a data frame is inputted from the port B 512b or where data frame transfer is set.

The port state processing section 524a, 524b, 528a, or 528b or the OAM frame termination section 523a, 523b, 527a, or 527b terminates or transfers a frame on the basis of setting performed by the ring frame processing section 511. The ring frame processing section 511 included in the switch 500 according to the second embodiment functions as the setting section illustrated in FIG. 1.

Each of the port A 512a and the port B 512b is connected via a communication channel to another communication device, such as the switch 600, 700, or 800, or another machine with a communication function, such as a computer, included in the network system. As a result, frames exchanged with, for example, the switch 600, 700, or 800 are inputted to or outputted from each of the port A 512a and the port B 512b. The port A 512a is connected to the switch 800 and the port B 512b is connected to the switch 600.

Frames inputted to or outputted from each of the port A 512a and the port B 512b include ring frames transferred in the ring network, maintenance frames for maintaining the network system having the ring network, and the like. The ring frames include data frames for sending or receiving data, control frames for controlling the ring network, and the like. In this embodiment, an OAM frame based on E-OAM is used as a maintenance frame. The port A 512a and the port B 512b included in the switch 500 according to the second embodiment function as the input-output section illustrated in FIG. 1.

The port state processing section 524a or 524b exercises control in accordance with the setting performed by the ring frame processing section 511 so that a data frame inputted from the port A 512a or the port B 512b will be terminated or transferred. By doing so, the data frame is terminated or transferred. The port state processing sections 524a and 524b included in the switch 500 according to the second embodiment function as the data frame control section illustrated in FIG. 1.

The OAM management sections 513a and 513b exercise control on the basis of the setting of data frame termination or data frame transfer performed by the ring frame processing section 511 so that the OAM frame termination sections 523a and 523b will terminate or transfer OAM frames inputted from the port A 512a and the port B 512b respectively.

If the switch 500 is set to OAM frame "termination" by the ring frame processing section 511, then the OAM management section 513a or 513b exercises control so that the OAM frame termination section 523a or 523b will terminate an OAM frame according to a point at which a failure detected has occurred.

The OAM frame termination section 523a or 523b exercises control by the control of the OAM management section 513a or 513b so that an OAM frame inputted from the port A 512a or the port B 512b will be terminated or transferred. As a result, OAM frame termination or OAM frame transfer is set on the basis of the setting of data frame termination or data frame transfer in the network system. The OAM frame termination sections 523a and 523b included in the switch 500 according to the second embodiment function as the maintenance frame control section illustrated in FIG. 1.

Each of the ring frame insertion sections inserts a ring frame by the control of the ring frame processing section 511. This is the same with the ring frame insertion sections 130a and 130b included in the switch 100 according to the first embodiment. Each ring frame insertion section sends blocking point change notice for informing other switches that the switch 500 and another switch are set to "data frame termination" of data frame termination and data frame transfer according to a point in the network system at which a failure has occurred on the basis of the setting of data frame termination or data frame transfer performed by the ring frame processing section 511. The other switches which receive the blocking point change notice set themselves to ring frame transfer or ring frame termination and OAM frame transfer or OAM frame termination in accordance with the blocking point change notice received. The ring frame insertion sections function as a change notice sending section.

FIG. 15 illustrates the function of monitoring a network failure by the switch according to the second embodiment which is set as a MEP.

A process in which the switch according to the second embodiment that is set as a MEP monitors the occurrence of a failure in a communication channel by the use of an OAM frame will now be described with reference to FIG. 15.

The port A 512a and the port B 512b of the switch 500 illustrated in FIG. 15 are connected to the switches 800 and 600, respectively, via the ring network. This is the same with the switch 100 according to the first embodiment.

On the port A side the OAM frame insertion section 525a inserts an OAM frame by the control of the OAM management section 513a. By doing so, an OAM frame to be sent from the port A side to the port B side for detecting the occurrence of a failure in the switch 500 is inserted. The OAM frame inserted is extracted on the port B side by the OAM frame filtering section 526b by the control of the OAM management section 513b. The OAM frame extracted by the OAM frame filtering section 526b is accepted by the OAM management section 513b. The switch 500 detects the occurrence of the failure therein on the basis of the OAM frame accepted by the OAM management section 513b, and is controlled in accordance with the OAM frame accepted by the OAM management section 513b.

In addition, the OAM frame termination section 527b is set to OAM frame termination by the control of the OAM management section 513b. As a result, the OAM frame sent from the port A side to the port B side for detecting the occurrence of the failure in the switch 500 is terminated.

Furthermore, the OAM frame insertion section 525b functions the same as the OAM frame insertion section 525a by the control of the OAM management section 513b. Moreover, the OAM frame filtering section 526a and the OAM frame termination section 527a function the same as the OAM frame filtering section 526b and the OAM frame termination section 527b, respectively, by the control of the OAM management section 513a.

FIGS. 16A and 16B respectively illustrate the state of a network system according to a second embodiment before and after the occurrence of a failure in a switch. FIG. 16A illustrates a network system according to a second embodiment before the occurrence of a failure in a switch. FIG. 16B illustrates the network system according to the second embodiment after the occurrence of a failure in a switch.

As illustrated in FIG. 16A, for convenience of explanation it is assumed that the network system according to the second embodiment includes the switches 500, 600, 700, and 800 connected in that order like a ring.

Each of the switches 500, 600, 700, and 800 according to the second embodiment monitors an outward frame described in the first embodiment. By doing so, each of the switches 500, 600, 700, and 800 terminates an OAM frame received from a switch directly connected thereto by a communication channel and inserts an OAM frame to be transferred to an adjacent switch. As a result, the occurrence of a failure in a communication channel between adjacent switches can be detected.

In addition to monitoring an outward frame described in the first embodiment, each of the switches 500, 600, 700, and 800 according to the second embodiment monitors an inward frame. By doing so, each switch can also monitor the occurrence of a failure between ports in a switch. In this case, an OAM frame transferred from a second port of the switch is terminated and an OAM frame to be sent to the second port is inserted. By doing so, the occurrence of the failure between the ports in the switch can be detected.

In FIG. 16A, a blocking point is set in the switch 500 and the switch 500 is set as a MEP.

As a result, a ring frame for transferring data and a control command and an OAM frame used for OAM which are sent from the switch 500 to the switch 600 are transferred from the switch 600 to the switch 700, are transferred from the switch 700 to the switch 800, are received again by the switch 500, and are terminated by the switch 500. A ring frame and an OAM frame sent from the switch 500 to the switch 800 are transferred from the switch 800 to the switch 700, are transferred from the switch 700 to the switch 600, are received again by the switch 500, and are terminated by the switch 500.

In FIG. 16B, a failure has occurred in the switch 800 in the network system illustrated in FIG. 16A. As a result of the occurrence of the failure, blocking point setting is changed from the switch 500 to the switch 700 and MEP setting is changed from the switch 500 to the switch 700. In addition, the setting of the switch 500 is changed to a MIP and the setting of the switch 500 is changed from a blocking point to forwarding.

As a result, a ring frame for transferring data and a control command and an OAM frame used for OAM which are sent from the switch 500 to the switch 600 are transferred from the switch 600 to the switch 700, are received by the switch 700, and are terminated by the switch 700.

On the other hand, a ring frame and an OAM frame sent from the switch 700 to the switch 600 are transferred from the switch 600 to the switch 500 and are received by the switch 500. The failure has occurred in the switch 800, so the switch 800 cannot receive these frames. Before the occurrence of the failure, a blocking point is set in the switch 500 and the switch 500 is set as a MEP. After the occurrence of the failure, a change in blocking point and MEP setting is made. That is to say, a blocking point is set in the switch 700 and the switch 700 is set as a MEP. In addition, a blocking point is not set in the switch 500 and the switch 500 functions as a MIP. As a result, only the switch 700 functions as a MEP. The other MEP is not set automatically in the network system according to the second embodiment.

That is to say, if a failure occurs in the switch 800 in the network system according to the second embodiment, then the failure is detected and the switch 800 is excluded. Data is sent or received between the switches 500, 600, and 700 with only the switch 700 as a MEP. Furthermore, the ring network including the switches 500, 600, and 700 is managed on the basis of E-OAM with only the switch 700 as a MEP.

As stated above, another switch which is adjacent to a switch detects the occurrence of a failure in the switch and makes a change in blocking point and MEP setting. Therefore, communication is performed normally in the ring network without being influenced by the failure in the switch.

The case where the occurrence of the failure in the switch 800 is detected by the switch 700 which is adjacent to the switch 800 and which is set as a MIP has been described. In the case where the occurrence of the failure in the switch 800 is detected by the switch 500 which is adjacent to the switch 800 and which is set as a MEP, however, the same process is performed. In addition, if a failure has occurred in the switch 500 which is set as a MEP, the occurrence of the failure is detected by the switch 600 or 800 which is adjacent to the switch 500, and the same process is performed.

FIG. 17 is a sequence diagram of a procedure performed at the time of detecting a failure which has occurred in a switch in the network system according to the second embodiment.

A procedure performed at the time of detecting a failure among the switch 500 which is set as a data frame termination node and MEP before the occurrence of the failure, the switch 700 which is set as a data frame relay node and MIP based on E-OAM before the occurrence of the failure, which is adjacent to the switch 800 in which the failure has occurred, which detects the occurrence of the failure, and which is set as a blocking point and MEP after the detection of the failure, and the switch 800 which is set as a MIP and in which the failure has occurred will now be described in accordance with FIG. 17.

[Step S201] Each node is set as a ring network by a control command sent from the terminal unit 30 (described above in FIG. 2). As a result, the switch 500 is set as a data frame blocking point. In addition, the switches 600 (described above in FIGS. 16A and 16B), 700 and 800 are set as data frame relay nodes.

[Step S202] The switch 500 is set as a MEP based on E-OAM by a control command sent from the terminal unit 30.

[Step S203] The switches 600, 700 and 800 are set as MIPs based on E-OAM by a control command sent from the terminal unit 30.

Initial setting regarding the ring network of the network system and E-OAM is completed by performing the above steps S201 through S203.

[Step S204] A ring frame processing section 711 (described later in FIG. 21) included in the switch 700 detects the occurrence of a failure in the switch 800 from the occurrence of an abnormality in ring frame transfer on the basis of a ring network protocol.

[Step S205] The ring frame processing section 711 sets a blocking point in the switch 700.

[Step S207] The ring frame processing section 711 sends blocking point change notice to the switches 500 and 600 in which the occurrence of a failure is not detected.

[Step S208] The ring frame processing section 711 sends blocking point change notice to the switch 800 in which the occurrence of the failure is detected.

By performing the above steps S207 and S208, the other switches are informed of a change in blocking point.

[Step S209] When the ring frame processing section 511 (described above in FIG. 14) included in the switch 500 receives the blocking point change notice, the ring frame processing section 511 changes the setting of the switch 500 from a blocking point to forwarding.

[Step S210] The ring frame processing section 511 changes the setting of the switch 500 from a MEP to a MIP.

[Step S211] The ring frame processing section 711 changes the setting of the switch 700 from a MIP to a MEP.

The state before the occurrence of a failure and after the detection of the failure of each switch included in the network system will now be described.

The state of a switch in which a failure has occurred will be described first.

FIG. 18 illustrates the state of a switch which is included in the network system according to the second embodiment, which is set as a MIP, and in which a failure has occurred. As described above in FIG. 16B, it is assumed that a failure has occurred in the switch 800.

The switch 800 illustrated in FIG. 18 includes a ring frame processing section 811, a port A 812a, a port B 812b, OAM management sections 813a and 813b, ring frame filtering sections 821a and 821b, OAM frame filtering sections 822a, 822b, 826a, and 826b, OAM frame termination sections 823a, 823b, 827a, and 827b, port state processing sections 824a, 824b, 828a, and 828b, and OAM frame insertion sections 825a, 825b, 829a, and 829b. This is the same with the above switch 500 illustrated in FIG. 14.

As illustrated in FIG. 18, a failure has occurred between the OAM frame insertion section 825a and the OAM frame filtering section 826b included in the switch 800 which is set as a MIP. As a result, a ring frame sent from the port A 812a to the port B 812b cannot be relayed in the switch 800.

Accordingly, each switch included in the network system according to the second embodiment performs operation described later.

A switch which is set as a MEP before the occurrence of the failure and the setting of which is changed to a MIP after the detection of the failure will be described next.

FIG. 19 illustrates the state of a switch which is included in the network system according to the second embodiment and which is set as a MEP before the occurrence of a failure in another switch. FIG. 20 illustrates the state of a switch which is included in the network system according to the second embodiment and which is set as a MEP after the detection of a failure in another switch. As described above in FIG. 16B, it is assumed that a failure has occurred in the switch 800.

The switch 500 illustrated in FIG. 19 or 20 includes a ring frame processing section 511, a port A 512a, a port B 512b, OAM management sections 513a and 513b, ring frame filtering sections 521a and 521b, OAM frame filtering sections 522a, 522b, 526a, and 526b, OAM frame termination sections 523a, 523b, 527a, and 527b, port state processing sections 524a, 524b, 528a, and 528b, and OAM frame insertion sections 525a, 525b, 529a, and 529b. This is the same with the switch 500 illustrated in FIG. 14.

As illustrated in FIG. 19, the switch 500 is set as a MEP before the occurrence of the failure and an OAM frame is terminated by the OAM frame termination section 527a or 527b. As a result, an OAM frame inputted from the port A 512a is terminated by the OAM frame termination section 527b and an OAM frame inputted from the port B 512b is terminated by the OAM frame termination section 527a.

In addition, an OAM frame is inserted by the OAM frame insertion section 529a or 529b. On the basis of a control command sent from the terminal unit 30, the ring frame processing section 511 requests the OAM management sections 513a and 513b to perform setting. By doing so, the above initial setting regarding OAM in the switch 500 is performed.

Furthermore, the port state processing section 528b is set as a data frame blocking point. On the basis of a control command sent from the terminal unit 30, the ring frame processing section 511 sets the port state processing section 528b to data frame termination and sets the port state processing section 524a, 524b, and 528a to data frame transfer (blocking is ineffective and forwarding is performed). By doing so, initial setting regarding data frame blocking in the switch 500 is performed.

As illustrated in FIG. 20, the setting of the switch 500 is changed from a MEP to a MIP after the detection of the failure in the switch 800. OAM frame termination by the OAM frame termination sections 523a, 523b, 527a, and 527b is released.

As a result, an OAM frame inputted from the port A 512a passes through the OAM frame termination sections 523a and 527b and is transferred to a switch (switch 600, for example) connected via the port B 512b. Furthermore, an OAM frame inputted from the port B 512b passes through the OAM frame termination sections 523b and 527a and is transferred to a switch (switch 800, for example) connected via the port A 512a. An OAM frame is not inserted by the OAM frame insertion section 525a, 525b, 529a, or 529b. On the basis of the receiving of blocking point change notice sent from another switch, the ring frame processing section 511 requests the OAM management sections 513a and 513b to make changes in the setting. By doing so, the above changes in the setting regarding OAM are made.

At this time the setting of the port state processing section 528b in the switch 500 is changed from a data frame blocking point to forwarding. On the basis of the receiving of the blocking point change notice sent from another switch, the ring frame processing section 511 changes the setting of the port state processing section 528b from data frame termination to data frame forwarding. By doing so, the setting regarding a data frame blocking point is changed.

A switch which is set as a MIP before the occurrence of the failure and the setting of which is changed to a MEP after the detection of the failure will be described next.

FIG. 21 illustrates the state of a switch which is included in the network system according to the second embodiment and which is set as a MIP before the occurrence of a failure in another switch. FIG. 22 illustrates the state of a switch which is included in the network system according to the second embodiment and the setting of which is changed from a MIP to a MEP after the detection of the failure in another switch. As described above in FIG. 16B, it is assumed that a failure has occurred in the switch 800.

The switch 700 illustrated in FIG. 21 or 22 includes a ring frame processing section 711, a port A 712a, a port B 712b, OAM management sections 713a and 713b, ring frame filtering sections 721a and 721b, OAM frame filtering sections 722a, 722b, 726a, and 726b, OAM frame termination sections 723a, 723b, 727a, and 727b, port state processing sections 724a, 724b, 728a, and 728b, and OAM frame insertion sections 725a, 725b, 729a, and 729b. This is the same with the above switch 500 illustrated in FIG. 14.

The switch 700 illustrated in FIG. 21 is set as a MIP before the occurrence of the failure in the switch 800 and an OAM frame is not terminated by the OAM frame termination section 723a, 723b, 727a, or 727b. As a result, an OAM frame inputted from the port A 712a passes through the OAM frame termination sections 723a and 727b and is transferred to a switch (switch 600, for example) connected via the port B 712b. Furthermore, an OAM frame inputted from the port B 712b passes through the OAM frame termination sections 723b and 727a and is transferred to a switch (switch 800, for example) connected via the port A 712a. An OAM frame is not inserted by the OAM frame insertion section 725a, 725b, 729a, or 729b. On the basis of a control command sent from the terminal unit 30, the ring frame processing section 711 requests the OAM management sections 713a and 713b to perform setting. By doing so, the above initial setting in the switch 700 regarding OAM is performed.

At this time each of the port state processing sections 724a, 724b, 728a, and 728b is not set as a data frame blocking point. On the basis of a control command sent from the terminal unit 30, the ring frame processing section 711 sets the port state processing sections 724a, 724b, 728a, and 728b to data frame transfer. By doing so, initial setting regarding data frame blocking in the switch 700 is performed. The switches 600 and 800 which are set as MIPs based on E-OAM before the occurrence of the failure, that is to say, which are set as data frame relay nodes before the occurrence of the failure are the same as the switch 700 before the occurrence of the failure. Therefore, descriptions of them will be omitted.

As described above in FIG. 18, the failure has occurred between the OAM frame insertion section 825*a* and the OAM frame filtering section 826*b* included in the switch 800 included in the network system. As a result, a ring frame sent from the port A 812*a* to the port B 812*b* cannot be relayed in the switch 800. The port B 812*b* of the switch 800 is adjacent to the switch 700, so the ring frame to be outputted from the switch 800 to the switch 700 is not received by the switch 700.

Accordingly, the switch 700 detects the occurrence of the failure in the switch 800 from the fact that a ring frame inputted from the port A 712*a* adjacent to the switch 800 is not extracted by the ring frame filtering section 721*a* (for a certain period of time, for example). When the occurrence of the failure in the switch 800 is detected, the setting of the switch 700 is changed from a MIP to a MEP. As a result, an OAM frame which is transferred from the switch 600 and which is inputted from the port B 712*b* is terminated by the OAM frame termination section 723*b*. In addition, an OAM frame which is to be sent from the port B 712*b* and which is to be transferred to the switch 600 is inserted by the OAM frame insertion section 729*b*. On the basis of the detection of the occurrence of the failure in the switch 800, the ring frame processing section 711 requests the OAM management sections 713*a* and 713*b* to make changes in the setting. By doing so, the above changes in the setting regarding OAM are made.

At this time the port state processing section 728*a* is set as a data frame blocking point in the switch 700. On the basis of the detection of the occurrence of the failure in the switch 800, the ring frame processing section 711 sets the port state processing section 728*a* so as to terminate a data frame. By doing so, a change in the setting regarding a data frame blocking point is made.

If the occurrence of the failure in the switch 800 adjacent to the port A 712*a* is detected in the network system according to the second embodiment, then a ring frame inputted from the port B 712*b* is terminated by the port state processing section 728*a*. However, the ring frame inputted from the port B 712*b* may be terminated by the port state processing section 724*b* which can perform termination.

As has been described in the foregoing, according to the second embodiment a data frame which is a ring frame and blocking point change notice are monitored. By doing so, a data frame termination node can be changed according to the occurrence of a failure in another switch in the network system and the setting of a maintenance management termination node, that is to say, the setting of a MEP based on E-OAM can be changed according to the change in data frame termination node. As a result, labor required for the maintenance and management of the network system can be reduced.

In addition, by monitoring both an inward frame and an outward frame on the basis of E-OAM, the occurrence of a failure in a switch can also be detected at the time of the occurrence of a failure in the network system. Accordingly, a point at which a failure has occurred can be specified more precisely.

In addition, the setting of a MEP based on E-OAM can be changed automatically according to a change in data frame blocking point in the ring network. Accordingly, the reliability of the network system is improved. The possibility that the occurrence of a failure is not detected because of the occurrence of a double failure can be reduced. For example, the possibility that in spite of the occurrence of a failure in the ring network, the failure is not detected can be reduced.

[Third Embodiment]

A third embodiment will now be described. The differences between the above first and second embodiments and the third embodiment will be described mainly. The same symbols will be used for representing the same sections and descriptions of them will be omitted.

The third embodiment differs from the first and second embodiments in that each of switches 900, 1000, 1100, and 1200 included in a network system detects a failure which has occurred in a communication channel or a switch included in the network system by an E-OAM frame and that the structure of MEGs based on E-OAM and the structure of a network in which a ring frame is transferred can be changed according to the failure detected.

FIG. 23 is a block diagram of the structure of a switch according to the third embodiment. In FIG. 23, the function of the switch 900 is illustrated. However, the other switches 1000, 1100, and 1200 described later in FIGS. 24A and 24B can be realized by adopting the same structure as the switch 900 has, and have the same function.

The switch 900 according to the third embodiment monitors the occurrence of a failure in the network system in which a frame is transferred. By doing so, the switch 900 changes a data frame termination node in the network and changes a MEP which is based on E-OAM and which is a maintenance management termination node on the basis of the change in data frame termination node. This is the same with the first and second embodiments. The switch 900 includes a ring frame processing section 911, a port A 912*a*, a port B 912*b*, OAM management sections 913*a* and 913*b*, ring frame filtering sections 921*a* and 921*b*, OAM frame filtering sections 922*a*, 922*b*, 926*a*, and 926*b*, OAM frame termination sections 923*a*, 923*b*, 927*a*, and 927*b*, port state processing sections 924*a*, 924*b*, 928*a*, and 928*b*, OAM frame insertion sections 925*a*, 925*b*, 929*a*, and 929*b*, ring frame insertion sections (not illustrated), and a user command processing section (not illustrated). Ethernet is used in the network system.

The ring frame processing section 911 controls a ring network for transferring a ring frame. In addition, the ring frame processing section 911 controls the switch 900 in accordance with a command of which the user command processing section informs the ring frame processing section 911.

Furthermore, the ring frame processing section 911 controls the OAM frame insertion sections 925*a*, 925*b*, 929*a*, and 929*b* and the OAM frame filtering sections 922*a*, 922*b*, 926*a*, and 926*b* via the OAM management sections 913*a* and 913*b*. By doing so, the ring frame processing section 911 monitors an OAM frame based on E-OAM, and detects the occurrence of a failure.

Each of the port A 912*a* and the port B 912*b* is connected to another switch by a communication channel of the ring network. A frame is inputted to the port A 912*a* from a switch connected thereto or a frame is outputted from the port A 912*a* to the switch connected thereto. Similarly, a frame is inputted to the port B 912*b* from a switch connected thereto or a frame is outputted from the port B 912*b* to the switch connected thereto.

The OAM management sections 913*a* and 913*b* included correspond to the port A 912*a* and the port B 912*b*, respectively, and make the switch 900 function as a MIP or a MEP in accordance with setting which a user performs by the use of the terminal unit 30. In addition, the OAM management sections 913*a* and 913*b* accept OAM frames from the OAM frame filtering sections 922*a* and 926*a* and the OAM frame filtering sections 922b and 926b, respectively, and control the switch 900 with regard to OAM frame transfer in accordance with the contents of the OAM frames accepted. Furthermore, the OAM management sections 913a and 913b detect the occurrence of a failure in the ring network on the basis of the OAM frames accepted.

The ring frame filtering sections 921a and 921b included correspond to the port A 912a and the port B 912b respectively. The ring frame filtering sections 921a and 921b extract ring frames from frames inputted from the port A 912a and the port B 912b, respectively, and transfer the ring frames extracted to the ring frame processing section 911. The ring frames include a control frame and a data frame. In the third embodiment, blocking point change notice is sent as a control frame. Furthermore, in the third embodiment blocking point change notice functions as setting change notice.

The OAM frame filtering sections 922a and 922b included correspond to the port A 912a and the port B 912b respectively. The OAM frame filtering sections 922a and 922b extract OAM frames from the frames inputted from the port A 912a and the port B 912b, respectively, and transfer the OAM frames extracted to the OAM management sections 913a and 913b respectively. The OAM frames are transferred to the ring frame processing section 911 via the OAM management sections 913a and 913b.

The OAM frame filtering sections 926a and 926b are included for extracting OAM frames inside the switch 900. The OAM frame filtering sections 926a and 926b extract OAM frames inserted by the OAM frame insertion sections 925b and 925a and transfer the OAM frames extracted to the OAM management sections 913a and 913b respectively. These OAM frames are also transferred to the ring frame processing section 911 via the OAM management sections 913a and 913b.

The OAM frame termination sections 923a and 923b included correspond to the port A 912a and the port B 912b respectively. The OAM frame termination sections 923a and 923b terminate OAM frames inputted from the port A 912a and the port B 912b by the control of the OAM management sections 913a and 913b respectively.

The OAM frame termination sections 927a and 927b are included for terminating OAM frames inside the switch 900. The OAM frame termination sections 927a and 927b terminate OAM frames inserted by the OAM frame insertion sections 925b and 925a by the control of the OAM management sections 913a and 913b respectively.

The port state processing sections 924a and 924b included correspond to the port A 912a and the port B 912b respectively. The port state processing sections 924a and 924b terminate data frames inputted from the port A 912a and the port B 912b, respectively, by the control of the ring frame processing section 911.

The port state processing sections 928a and 928b are included for terminating data frames inside the switch 900. The port state processing section 928a terminates a data frame sent from the port B side to the port A side of the switch 900 by the control of the ring frame processing section 911. The port state processing section 928b terminates a data frame sent from the port A side to the port B side of the switch 900 by the control of the ring frame processing section 911.

The OAM frame insertion sections 925a and 925b are included for inserting OAM frames inside the switch 900. The OAM frame insertion section 925a inserts an OAM frame to be sent from the port A side to the port B side by the control of the OAM management section 913a. The OAM frame insertion section 925b inserts an OAM frame to be sent from the port B side to the port A side by the control of the OAM management section 913b.

The OAM frame insertion sections 929a and 929b included correspond to the port A 912a and the port B 912b respectively. The OAM frame insertion sections 929a and 929b insert OAM frames to be outputted from the port A 912a and the port B 912b by the control of the OAM management sections 913a and 913b respectively.

The ring frame insertion sections included correspond to the port A 912a and the port B 912b. The ring frame insertion sections insert ring frames to be outputted from the port A 912a and the port B 912b by the control of the ring frame processing section 911.

The user command processing section accepts a command, such as setting regarding ring frame processing by the network system or the switch 900, which a user issues by operating the terminal unit 30 (described above in FIG. 2), and informs the ring frame processing section 911 of the command accepted.

With the switch 900 according to the third embodiment, each of the above sections functions as follows.

The ring frame processing section 911 detects the occurrence of a failure in a communication channel of the network system on the basis of an OAM frame which is inputted from the port A 912a or the port B 912b and which is extracted by the OAM frame filtering section 922a or 922b. In addition, the ring frame processing section 911 detects the occurrence of a failure between the port A 912a and the port B 912b included in the switch 900 on the basis of an OAM frame which is inserted by the OAM frame insertion section 925a or 925b and which is extracted by the OAM frame filtering section 926a or 926b. In this case, the ring frame processing section 911 monitors control frames which are inputted from the port A 912a and the port B 912b and which are extracted by the ring frame filtering sections 921a and 921b. If the ring frame processing section 911 detects a control frame by which notice of the occurrence of a failure is given, then the ring frame processing section 911 detects the occurrence of the failure in a communication channel of the network system on the basis of the extracted control frame by which notice of the occurrence of the failure is given.

For example, the ring frame processing section 911 detects the occurrence of a failure in the network system from the fact that an OAM frame which is sent from an adjacent switch and which is inputted from the port A 912a or the port B 912b is not detected for a certain period of time or that blocking point change notice extracted by the ring frame filtering section 921a or 921b is received. The ring frame processing section 911, the ring frame filtering sections 921a and 921b, and the OAM frame filtering sections 922a, 922b, 926a, and 926b included in the switch 900 according to the third embodiment function as the failure detection section illustrated in FIG. 1.

By receiving blocking point change notice extracted by the ring frame filtering section 921a or 921b, the ring frame processing section 911 detects the occurrence of a failure in the network system.

The blocking point change notice is given for informing another switch (switch 1000, 1100, or 1200 described later in FIGS. 24A and 24B, for example) of setting a switch in the network system to data frame termination or data frame transfer.

If the ring frame processing section 911 detects the occurrence of a failure in a communication channel adjacent to the switch 900 from the fact that, for example, an OAM frame extracted by the OAM frame filtering section 922a or 922b is not detected for a certain period of time, then the ring frame processing section 911 informs that an adjacent switch connected by the communication channel in which the occurrence of the failure is detected is set to "data frame termination" of data frame termination and data frame transfer.

Furthermore, if the ring frame processing section 911 detects the occurrence of a failure in a communication channel adjacent to the switch 900, then the ring frame processing section 911 makes a ring frame insertion section insert blocking point change notice for informing that a switch which is set to "data frame termination" of data frame termination and data frame transfer before the detection of the failure is set to data frame transfer" of data frame termination and data frame transfer. In addition, if the ring frame processing section 911 detects the occurrence of a failure in a communication channel adjacent to the switch 900, then the ring frame processing section 911 sets the switch 900 to "data frame termination" of data frame termination and data frame transfer.

If the ring frame processing section 911 detects the occurrence of a failure in a switch adjacent to the switch 900 from the fact that, for example, an OAM frame extracted by the OAM frame filtering section 922a or 922b is not detected for a certain period of time, then the ring frame processing section 911 makes a ring frame insertion section insert blocking point change notice for informing that a switch which is set to "data frame termination" of data frame termination and data frame transfer before the occurrence of the failure is set to "data frame transfer" of data frame termination and data frame transfer. At this time the ring frame processing section 911 sets the switch 900 to "data frame termination" of data frame termination and data frame transfer.

Moreover, if the ring frame processing section 911 detects the occurrence of a failure in the network on the basis of blocking point change notice which is sent from another switch and which is extracted by the ring frame filtering section 921a or 521b, then the ring frame processing section 911 sets the switch 900 to data frame termination or data frame transfer in accordance with setting designated in the extracted blocking point change notice.

Furthermore, the ring frame processing section 911 sets OAM frame termination or OAM frame transfer on the basis of which of data frame termination and data frame transfer is set. That is to say, if the ring frame processing section 911 performs setting for terminating a data frame inputted from the port A 912a, then the ring frame processing section 911 performs setting for terminating an OAM frame inputted from the port A 912a. The same applies to the case where a data frame is inputted from the port B 912b or where data frame transfer is set.

The port state processing section 924a, 924b, 928a, or 928b or the OAM frame termination section 923a, 923b, 927a, or 927b terminates or transfers a frame on the basis of setting performed by the ring frame processing section 911. The ring frame processing section 911 included in the switch 900 according to the third embodiment functions as the setting section illustrated in FIG. 1.

Each of the port A 912a and the port B 912b is connected via a communication channel to another communication device, such as the switch 1000, 1100, or 1200, or another machine with a communication function, such as a computer, included in the network system. As a result, frames exchanged with, for example, the switch 1000, 1100, or 1200 are inputted to or outputted from each of the port A 912a and the port B 912b. The port A 912a is connected to the switch 1200 and the port B 912b is connected to the switch 1000.

Frames inputted to or outputted from each of the port A 912a and the port B 912b include ring frames transferred in the ring network, maintenance frames for maintaining the network system having the ring network, and the like. The ring frames include data frames for sending or receiving data, control frames for controlling the ring network, and the like. In this embodiment, an OAM frame based on E-OAM is used as a maintenance frame. The port A 912a and the port B 912b included in the switch 900 according to the third embodiment function as the input-output section illustrated in FIG. 1.

The port state processing section 924a or 924b exercises control in accordance with the setting performed by the ring frame processing section 911 so that a data frame inputted from the port A 912a or the port B 912b will be terminated or transferred. By doing so, the data frame is terminated or transferred. The port state processing sections 924a and 924b included in the switch 900 according to the third embodiment function as the data frame control section illustrated in FIG. 1.

For example, if the occurrence of a failure is detected in the transfer of a data frame from the port A side to the port B side in the switch 900, then the ring frame processing section 911 performs setting so that the port state processing section 924a will terminate the data frame sent from the port A side to the port B side in the switch 900. The port state processing section 924a terminates the data frame sent from the port A side to the port B side in the switch 900 on the basis of the setting performed by the ring frame processing section 911.

The OAM management sections 913a and 913b exercise control on the basis of the setting of data frame termination or data frame transfer performed by the ring frame processing section 911 so that the OAM frame termination sections 923a and 923b will terminate or transfer OAM frames inputted from the port A 912a and the port B 912b respectively.

If the switch 900 is set to "OAM frame termination" by the ring frame processing section 911, then the OAM management section 913a or 913b exercises control so that the OAM frame termination section 923a or 923b will terminate an OAM frame according to a place at which a failure detected has occurred.

If the switch 900 is set to "OAM frame termination" by the ring frame processing section 911, then the OAM management section 913a or 913b exercises control so that the OAM frame termination section 923a or 923b will terminate an OAM frame according to a point at which a failure detected has occurred.

The OAM frame termination section 923a or 923b exercises control by the control of the OAM management section 913a or 913b so that an OAM frame inputted from the port A 912a or the port B 912b will be terminated or transferred. As a result, OAM frame termination or OAM frame transfer is set on the basis of the setting of data frame termination or data frame transfer in the network system. The OAM frame termination sections 923a and 923b included in the switch 900 according to the third embodiment function as the maintenance frame control section illustrated in FIG. 1.

Each of the ring frame insertion sections inserts a ring frame by the control of the ring frame processing section 911. This is the same with the ring frame insertion sections (not illustrated) included in the switch 500 according to the second embodiment. Each of the ring frame insertion sections sends blocking point change notice for informing other switches that the switch 900 and another switch are set to "data frame termination" of data frame termination and data frame transfer according to a point in the network system at which a failure has occurred on the basis of the setting of data frame termination or data frame transfer performed by the ring frame processing section 911. The other switches which receive the blocking point change notice set themselves to ring frame transfer or ring frame termination and OAM frame transfer or OAM frame termination in accordance with the blocking point change notice received. The ring frame insertion sections function as a change notice sending section.

In addition, in the third embodiment the occurrence of a failure between the port A 912a and the port B 912b included in the switch 900 is detected by the OAM frame insertion section 925a or 925b of the switch 900 which sends an OAM frame to the inside of the switch 900, the OAM frame filtering section 926b or 926a of the switch 900 which extracts the OAM frame sent by the OAM frame insertion section 925a or 925b, and the OAM frame termination section 927b or 927a of the switch 900 which terminates the OAM frame sent by the OAM frame insertion section 925a or 925b.

The ring frame processing section 911 detects the occurrence of the failure in the switch 900 on the basis of the OAM frame sent by the OAM frame insertion section 925a or 925b. If the ring frame processing section 911 detects the occurrence of the failure in the switch 900, then the ring frame processing section 911 sets the switch 900 to "data frame termination" of data frame termination and data frame transfer.

Operation performed in the case of the occurrence of a failure in the network system according to the third embodiment will now be described.

The case where a failure has occurred in a communication channel of the network system according to the third embodiment will be described first.

FIGS. 24A and 24B respectively illustrate the state of a network system according to a third embodiment before and after the occurrence of a failure in a communication channel. FIG. 24A illustrates a network system according to a third embodiment before the occurrence of a failure in a communication channel. FIG. 24B illustrates the network system according to the third embodiment after the occurrence of a failure in a communication channel.

As illustrated in FIG. 24A, for convenience of explanation it is assumed that the network system according to the third embodiment includes the switches 900, 1000, 1100, and 1200 connected in that order like a ring.

In FIG. 24A, a blocking point is set in the switch 900 and the switch 900 is set as a MEP.

As a result, a ring frame for transferring data and a control command and an OAM frame used for OAM which are sent from the switch 900 to the switch 1000 are transferred from the switch 1000 to the switch 1100, are transferred from the switch 1100 to the switch 1200, are received again by the switch 900, and are terminated by the switch 900. A ring frame and an OAM frame sent from the switch 900 to the switch 1200 are transferred from the switch 1200 to the switch 1100, are transferred from the switch 1100 to the switch 1000, are received again by the switch 900, and are terminated by the switch 900.

In FIG. 24B, a failure has occurred in a communication channel between the switches 1100 and 1200 in the network system illustrated in FIG. 24A. As a result of the occurrence of the failure, blocking point setting is changed from the switch 900 to the switches 1100 and 1200 and MEP setting is changed from the switch 900 to the switches 1100 and 1200. In addition, the switch 900 is set as a MIP and the setting of the switch 900 is changed from a blocking point to forwarding.

As a result, a ring frame and an OAM frame which are sent from the switch 1100 to the switch 1000 are transferred from the switch 1000 to the switch 900, are received by the switch 1200, and are terminated by the switch 1200. A ring frame and an OAM frame which are sent from the switch 1200 to the switch 900 are transferred from the switch 900 to the switch 1000, are received by the switch 1100, and are terminated by the switch 1100. A ring frame and an OAM frame are turned back by a switch on this side of the communication channel in which the failure has occurred, so communication is performed normally in the ring network without being influenced by the failure.

FIG. 25 is a sequence diagram of a procedure performed at the time of detecting a failure which has occurred in a communication channel in the network system according to the third embodiment.

A procedure performed at the time of detecting a failure among the switch 900 which is set as a blocking point and MEP before the occurrence of the failure and the switches 1100 and 1200 which are set as data frame relay nodes and MIPs based on E-OAM before the occurrence of the failure and which are set as blocking points and MEPs after the detection of the failure will now be described in accordance with FIG. 25.

[Step S301] Each node is set as a ring network by a control command sent from the terminal unit 30 (described above in FIG. 2). As a result, the switch 900 is set as a data frame blocking point. In addition, the switches 1000 (described above in FIGS. 24A and 24B), 1100 and 1200 are set as data frame relay nodes.

[Step S302] The switch 900 is set as a MEP based on E-OAM by a control command sent from the terminal unit 30.

[Step S303] The switches 1000, 1100 and 1200 are set as MIPs based on E-OAM by a control command sent from the terminal unit 30.

Initial setting regarding the ring network of the network system and E-OAM is completed by performing the above steps S301 through S303.

[Step S304] A ring frame processing section 1111 (described later in FIG. 26) included in the switch 1100 or a ring frame processing section 1211 (described later in FIG. 28) included in the switch 1200 detects the occurrence of a failure in a communication channel of the ring network from the occurrence of an abnormality in the transfer of an OAM frame based on E-OAM.

[Step S305] The ring frame processing section 1111 sets a blocking point in the switch 1100.

[Step S306] The ring frame processing section 1211 sets a blocking point in the switch 1200.

[Step S307] The ring frame processing section 1111 sends blocking point change notice to the whole of the ring network.

[Step S308] The ring frame processing section 1211 sends blocking point change notice to the whole of the ring network.

By performing the above steps S307 and S308, the other switches are informed of a change in blocking point.

[Step S309] When the ring frame processing section 911 (described above in FIG. 23) included in the switch 900 receives the blocking point change notice, the ring frame processing section 911 changes the setting of the switch 900 from a blocking point to forwarding.

[Step S310] The ring frame processing section 911 changes the setting of the switch 900 from a MEP to a MIP.

[Step S311] The ring frame processing section 1111 changes the setting of the switch 1100 from a MIP to a MEP.

[Step S312] The ring frame processing section 1211 changes the setting of the switch 1200 from a MIP to a MEP.

The state before the occurrence of a failure and after the detection of the failure of each switch included in the network system will now be described.

The switch 900 according to the third embodiment is set as a MEP and data frame termination node before the occurrence of a failure. If another switch detects the occurrence of a failure in a communication channel, the setting of the switch 900 is changed to a MIP and data frame relay node on the basis of blocking point change notice received. The operation of the switch 900 performed before the occurrence of the failure and after the detection of the failure is the same as that of the switch 500 according to the second embodiment performed before the occurrence of a failure and after the detection of the failure (described above in FIGS. 19 and 20), so descriptions of it will be omitted.

The switches 1100 and 1200 which are set as MIPs before the occurrence of a failure in a communication channel and the setting of which is changed to a MEP after the detection of a failure in a communication channel will now be described.

FIG. 26 illustrates the state of the switch according to the third embodiment which is set as a MIP before the occurrence of a failure in a communication channel. FIGS. 27 and 28 illustrate the state of the switch according to the third embodiment the setting of which is changed from a MIP to a MEP after the detection of a failure in a communication channel connected. As described above in FIG. 24B, it is assumed that a failure has occurred in a communication channel between the switches 1100 and 1200.

The switch 1100 illustrated in FIG. 26 or 27 includes a ring frame processing section 1111, a port A 1112a, a port B 1112b, OAM management sections 1113a and 1113b, ring frame filtering sections 1121a and 1121b, OAM frame filtering sections 1122a, 1122b, 1126a, and 1126b, OAM frame termination sections 1123a, 1123b, 1127a, and 1127b, port state processing sections 1124a, 1124b, 1128a, and 1128b, and OAM frame insertion sections 1125a, 1125b, 1129a, and 1129b. This is the same with the above switch 900 illustrated in FIG. 23.

The switch 1200 illustrated in FIG. 28 also includes a ring frame processing section 1211, a port A 1212a, a port B 1212b, OAM management sections 1213a and 1213b, ring frame filtering sections 1221a and 1221b, OAM frame filtering sections 1222a, 1222b, 1226a, and 1226b, OAM frame termination sections 1223a, 1223b, 1227a, and 1227b, port state processing sections 1224a, 1224b, 1228a, and 1228b, and OAM frame insertion sections 1225a, 1225b, 1229a, and 1229b. This is the same with the above switch 900 illustrated in FIG. 23.

As illustrated in FIG. 26, the switch 1100 is set as a MIP before the occurrence of the failure and an OAM frame is not terminated by the OAM frame termination section 1123a, 1123b, 1127a, or 1127b. As a result, an OAM frame inputted from the port A 1112a passes through the OAM frame termination sections 1123a and 1127b and is transferred to a switch (switch 1000, for example) connected via the port B 1112b. Furthermore, an OAM frame inputted from the port B 1112b passes through the OAM frame termination sections 1123b and 1127a and is transferred to a switch (switch 1200, for example) connected via the port A 1112a. An OAM frame is not inserted by the OAM frame insertion section 1125a, 1125b, 1129a, or 1129b. On the basis of a control command sent from the terminal unit 30, the ring frame processing section 1111 requests the OAM management sections 1113a and 1113b to perform setting. By doing so, the above initial setting in the switch 1100 regarding OAM is performed.

At this time each of the port state processing sections 1124a, 1124b, 1128a, and 1128b is not set as a data frame blocking point in the switch 1100. On the basis of a control command sent from the terminal unit 30, the ring frame processing section 1111 sets the port state processing sections 1124a, 1124b, 1128a, and 1128b to data frame transfer. By doing so, initial setting regarding data frame blocking in the switch 1100 is performed. The switches 1000 and 1200 which are set as MIPs based on E-OAM before the occurrence of the failure, that is to say, which are set as data frame relay nodes before the occurrence of the failure are the same as the switch 1100 before the occurrence of the failure. Therefore, descriptions of them will be omitted.

The failure has occurred in the communication channel on the side of the port A 1112a of the switch 1100 connected to the switch 1200 in the network system.

The ring frame processing section 1111 included in the switch 1100 can detect the occurrence of the failure in the communication channel on the side of the port A 1112a from the fact that an OAM frame is not extracted by the OAM frame filtering section 1122a (for a certain period of time, for example). Alternatively, the ring frame processing section 1111 can detect the occurrence of the failure in the communication channel on the side of the port A 1112a from the fact that the ring frame processing section 1111 detects blocking point change notice transferred from another switch. When the ring frame processing section 1111 detects the occurrence of the failure in the communication channel from these facts, the setting of the switch 1100 is changed from a MIP to a MEP. An OAM frame which is transferred from the switch 1000 and which is inputted from the port B 1112b is terminated by the OAM frame termination section 1123a. In addition, an OAM frame which is to be sent from the port B 1112b and which is to be transferred to the switch 1000 is inserted by the OAM frame insertion section 1129b.

On the basis of the detection of the occurrence of the failure in the communication channel, the ring frame processing section 1111 requests the OAM management sections 1113a and 1113b to make changes in the setting. By doing so, the above changes in the setting regarding OAM are made.

At this time the port state processing section 1128a is set as a data frame blocking point in the switch 1100. On the basis of the detection of the occurrence of the failure in the communication channel or the receiving of the blocking point change notice sent from another switch, the ring frame processing section 1111 sets the port state processing section 1128b to data frame termination. By doing so, a change in the setting regarding a data frame blocking point is made.

If the occurrence of the failure in the communication channel adjacent to the port A 1112a is detected in the network system according to the third embodiment, then a ring frame inputted from the port B 1112b is terminated by the port state processing section 1128a. However, the ring frame inputted from the port B 1112b may be terminated by the port state processing section 1124b.

The failure has occurred in the communication channel on the side of the port B 1212b of the switch 1200 connected to the switch 1100 in the network system. Accordingly, the switch 1200 detects the occurrence of the failure from the fact that an OAM frame is not extracted by the OAM frame filtering section 1226a or that blocking point change notice transferred from another switch is detected. At this time the setting of the switch 1200 is changed from a MIP to a MEP. As a result, an OAM frame which is transferred from the switch 900 and which is inputted from the port A 1212a is terminated by the OAM frame termination section 1223b. In addition, an OAM frame which is to be sent from the port A 1212a and which is to be transferred to the switch 900 is inserted by the OAM frame insertion section 1229a. On the basis of the detection of the occurrence of the failure in the communication channel, the ring frame processing section 1211 requests the OAM management sections 1213a and 1213b to make changes in the setting. By doing so, the above changes in the setting regarding OAM are made.

At this time the port state processing section 1228b is set as a data frame blocking point in the switch 1200. On the basis of the detection of the occurrence of the failure in the communication channel or the receiving of the blocking point change notice sent from another switch, the ring frame processing section 1211 sets the port state processing section 1228*b* to data frame termination. By doing so, a change in the setting regarding a data frame blocking point is made.

If the occurrence of the failure in the communication channel adjacent to the port B 1212*b* is detected in the network system according to the third embodiment, then a ring frame inputted from the port A 1212*a* is terminated by the port state processing section 1228*b*. However, the ring frame inputted from the port A 1212*a* may be terminated by the port state processing section 1224*a*.

The case where a failure has occurred in a switch in the network system according to the third embodiment will now be described.

FIGS. 29A and 29B respectively illustrate the state of the network system according to the third embodiment before and after the occurrence of a failure in a switch. FIG. 29A illustrates the network system according to the third embodiment before the occurrence of a failure in a switch. FIG. 29B illustrates the network system according to the third embodiment after the occurrence of a failure in a switch.

As illustrated in FIG. 29A, for convenience of explanation it is assumed that the network system according to the third embodiment includes switches 900, 1000, 1100, and 1200 connected in that order like a ring. This is the same with FIGS. 24A and 24B.

Each of the switches 900, 1000, 1100, and 1200 according to the third embodiment monitors an outward frame. By doing so, each of the switches 900, 1000, 1100, and 1200 terminates an OAM frame received from a switch directly connected thereto by a communication channel and inserts an OAM frame to be transferred to an adjacent switch. As a result, the occurrence of a failure in a communication channel between adjacent switches can be detected. In addition, each of the switches 900, 1000, 1100, and 1200 monitors an inward frame. By doing so, the occurrence of a failure between ports in each switch can also be monitored. This is the same with the second embodiment.

In FIG. 29A, a blocking point is set in the switch 900 and the switch 900 is set as a MEP.

As a result, a ring frame for transferring data and a control command and an OAM frame used for OAM which are sent from the switch 900 to the switch 1000 are transferred from the switch 1000 to the switch 1100, are transferred from the switch 1100 to the switch 1200, are received again by the switch 900, and are terminated by the switch 900. A ring frame and an OAM frame which are sent from the switch 900 to the switch 1200 are transferred from the switch 1200 to the switch 1100, are transferred from the switch 1100 to the switch 1000, are received again by the switch 900, and are terminated by the switch 900.

In FIG. 29B, a failure has occurred in the switch 1100 in the network system illustrated in FIG. 29A. As a result of the occurrence of the failure, blocking point setting is changed from the switch 900 to the switch 1100 and MEP setting is changed from the switch 900 to the switch 1100. In addition, the setting of the switch 900 is changed to a MIP and the setting of the switch 900 is changed from a blocking point to forwarding.

As a result, a ring frame and an OAM frame which are sent from the switch 1100 to the switch 1000 are transferred from the switch 1000 to the switch 900, are transferred from the switch 900 to the switch 1200, are received again by the switch 1100, and are terminated by the switch 1100. A ring frame and an OAM frame which are sent from the switch 1100 to the switch 1200 are transferred from the switch 1200 to the switch 900, are transferred from the switch 900 to the switch 1000, are received again by the switch 1100, and are terminated by the switch 1100. The switch in which the failure has occurred is set in this way as a blocking point and a MEP and a ring frame and an OAM frame are turned back by this switch. Therefore, communication is performed normally in the ring network without being influenced by the failure.

FIG. 30 is a sequence diagram of a procedure performed at the time of detecting a failure which has occurred in a switch in the network system according to the third embodiment.

A procedure performed at the time of detecting a failure between the switch 900 which is set as a blocking point and a MEP before the occurrence of the failure and the switch 1100 which is set as a data frame relay node and a MIP based on E-OAM before the occurrence of the failure and which is set as a blocking point and a MEP after the detection of the failure will now be described in accordance with FIG. 30.

[Step S401] Each node is set as a ring network by a control command sent from the terminal unit 30 (described above in FIG. 2). As a result, the switch 900 is set as a data frame blocking point. In addition, the switches 1000 (described above in FIGS. 29A and 29B), 1100 and 1200 (described above in FIGS. 29A and 29B) are set as data frame relay nodes.

[Step S402] The switch 900 is set as a MEP based on E-OAM by a control command sent from the terminal unit 30.

[Step S403] The switches 1000, 1100 and 1200 are set as MIPs based on E-OAM by a control command sent from the terminal unit 30.

Initial setting regarding the ring network of the network system and E-OAM is completed by performing the above steps S401 through S403.

[Step S404] A ring frame processing section 1111 (described later in FIG. 31) included in the switch 1100 detects the occurrence of a failure in the switch 1100 from the occurrence of an abnormality in the transfer of an OAM frame based on E-OAM.

[Step S405] The ring frame processing section 1111 sets a blocking point in the switch 1100.

[Step S407] The ring frame processing section 1111 sends blocking point change notice to the whole of the ring network.

By performing the above step S407, the other switches are informed of a change in blocking point.

[Step S409] When a ring frame processing section 911 (described above in FIG. 23) included in the switch 900 receives the blocking point change notice, the ring frame processing section 911 changes the setting of the switch 900 from a blocking point to forwarding.

[Step S410] The ring frame processing section 911 changes the setting of the switch 900 from a MEP to a MIP.

[Step S411] The ring frame processing section 1111 changes the setting of the switch 1100 from a MIP to a MEP.

The state before the occurrence of a failure in a switch and after the detection of the failure in the switch of each switch included in the network system will now be described. As described above, the operation of the switch 900 according to the third embodiment performed before the occurrence of the failure and after the detection of the failure is the same as that of the switch 500 according to the second embodiment (described above in FIGS. 19 and 20). Therefore, descriptions of it will be omitted.

A switch which is set as a MIP before the occurrence of a failure and the setting of which is changed to a MEP after the detection of the failure will now be described.

FIG. 31 illustrates the state of the switch according to the third embodiment which is set as a MIP before the occurrence of a failure in a switch. FIG. 32 illustrates the state of the switch according to the third embodiment the setting of which is changed from a MIP to a MEP after the occurrence of the failure in the switch. As described above in FIG. 29B, it is assumed that a failure has occurred in the switch 1100.

The switch 1100 illustrated in FIG. 31 or 32 includes a ring frame processing section 1111, a port A 1112a, a port B 1112b, OAM management sections 1113a and 1113b, ring frame filtering sections 1121a and 1121b, OAM frame filtering sections 1122a, 1122b, 1126a, and 1126b, OAM frame termination sections 1123a, 1123b, 1127a, and 1127b, port state processing sections 1124a, 1124b, 1128a, and 1128b, and OAM frame insertion sections 1125a, 1125b, 1129a, and 1129b. This is the same with the above switch 900 illustrated in FIG. 23.

As illustrated in FIG. 31, the switch 1100 is set as a MIP before the occurrence of the failure and an OAM frame is not terminated by the OAM frame termination section 1123a, 1123b, 1127a, or 1127b. As a result, an OAM frame inputted from the port A 1112a passes through the OAM frame termination sections 1123a and 1127b and is transferred to a switch (switch 1000, for example) connected via the port B 1112b. Furthermore, an OAM frame inputted from the port B 1112b passes through the OAM frame termination sections 1123b and 1127a and is transferred to a switch (switch 1200, for example) connected via the port A 1112a. An OAM frame is not inserted by the OAM frame insertion section 1125a, 1125b, 1129a, or 1129b. On the basis of a control command sent from the terminal unit 30, the ring frame processing section 1111 requests the OAM management sections 1113a and 1113b to perform setting. By doing so, the above initial setting in the switch 1100 regarding OAM is performed.

Each of the port state processing sections 1124a, 1124b, 1128a, and 1128b is not set as a data frame blocking point. On the basis of a control command sent from the terminal unit 30, the ring frame processing section 1111 sets the port state processing sections 1124a, 1124b, 1128a, and 1128b to data frame transfer. By doing so, initial setting regarding data frame blocking in the switch 1100 is performed. The switches 1000 and 1200 which are set as MIPs based on E-OAM before the occurrence of the failure, that is to say, which are set as data frame relay nodes before the occurrence of the failure are the same as the switch 1100 before the occurrence of the failure. Therefore, descriptions of them will be omitted.

As illustrated in FIG. 32, the failure has occurred between the OAM frame insertion section 1125a and the OAM frame filtering section 1126b in the switch 1100 in the network system. Accordingly, the occurrence of the failure is detected from the fact that an OAM frame is not extracted by the OAM frame filtering section 1126b (for a certain period of time, for example), and the setting of the switch 1100 is changed from a MIP to a MEP. As a result, an OAM frame which is transferred from the switch 1200 and which is inputted from the port A 1112a is terminated by the OAM frame termination section 1123a. An OAM frame which is transferred from the switch 1000 and which is inputted from the port B 1112b is terminated by the OAM frame termination section 1123b. In addition, an OAM frame which is to be sent from the port A 1112a and which is to be transferred to the switch 1200 is inserted by the OAM frame insertion section 1129a. An OAM frame which is to be sent from the port B 1112b and which is to be transferred to the switch 1000 is inserted by the OAM frame insertion section 1129b. On the basis of the detection of the occurrence of the failure in the switch 1100, the ring frame processing section 1111 requests the OAM management sections 1113a and 1113b to make changes in the setting. By doing so, the above changes in the setting regarding OAM are made.

At this time the port state processing section 1124a is set as a data frame blocking point in the switch 1100. A change in the setting regarding a data frame blocking point is made in this way. As a result, on the basis of the detection of the occurrence of the failure in the switch 1100, the ring frame processing section 1111 exercises control so that the port state processing section 1124a will terminate a data frame.

As has been described in the foregoing, with the third embodiment an OAM frame sent to a communication channel, an OAM frame sent from one port to the other port in a switch and blocking point change notice which is a control frame are monitored. Switch termination setting is changed on the basis of monitoring results. By doing so, a data frame termination node can be changed according to the occurrence of a failure in a communication channel or between ports in a switch in the network system. Moreover, a maintenance management termination node, that is to say, a new MEP based on E-OAM can be set according to the change in data frame termination node and a new MEG can be formed. As a result, labor required for the maintenance and management of the network system can be reduced further.

In addition, by monitoring both an inward frame and an outward frame on the basis of E-OAM, the occurrence of a failure in a switch can also be detected at the time of the occurrence of a failure in the network system. Accordingly, a point at which a failure has occurred can be specified more precisely.

In addition, the setting of a MEP based on E-OAM can be changed automatically according to a change in data frame blocking point in the ring network. Accordingly, the reliability of the network system is improved. The possibility that the occurrence of a failure is not detected because of the occurrence of a double failure can be reduced. For example, the possibility that in spite of the occurrence of a failure in the ring network, the failure is not detected can be reduced.

The above functions can be realized with a computer. In this case, a program in which the contents of the functions the switches 100 through 1200 should have are described is provided. By executing this program on the computer, the above functions are realized on the computer.

This program can be recorded on a computer readable record medium. A computer readable record medium can be a magnetic recording device, an optical disk, a magneto-optical recording medium, a semiconductor memory, or the like. A magnetic recording device can be a hard disk drive (HDD), a flexible disk (FD), a magnetic tape (MT), or the like. An optical disk can be a digital versatile disk (DVD), a digital versatile disk-random access memory (DVD-RAM), a compact disk read only memory (CD-ROM), a compact disc-recordable/rewritable (CD-R/RW), or the like. A magneto-optical recording medium can be a magneto-optical disk (MO) or the like.

To place the program on the market, portable record media, such as DVDs or CD-ROMs, on which it is recorded are sold. Alternatively, the program is stored in advance in a server computer and is transferred from the server computer to another computer via a network.

When the computer executes this program, it will store the program, which is recorded on a portable record medium or which is transferred from the server computer, on, for example, its hard disk. Then the computer reads the program from its hard disk and performs processes in compliance with the program. The computer can also read the program directly from a portable record medium and perform processes in compliance with the program. Furthermore, each time the program is transferred from the server computer, the computer can perform processes in turn in compliance with the program it receives.

The communication apparatus, the communication system, the communication program, and the control method disclosed have been described on the basis of the embodiments illustrated by the drawings. However, the structure of each section can be replaced with any structure having the same function. In addition, any other section or process may be added to the disclosed art. Furthermore, a combination of any two or more of the above embodiments can be considered as the disclosed art.

According to the communication apparatus, the communication system, the communication program, or the control method disclosed, the setting of a communication device which is a termination node can be changed at the time of the occurrence of a failure in a network system which is maintained and managed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions, and alterations could be made hereto without departing from the spirit and scope of the invention.

What is claimed is:

1. A communication apparatus for monitoring a network system in which a frame is transferred by a maintenance frame for maintenance and management, the apparatus comprising:
   an input-output section which inputs or outputs a frame;
   a failure detection section which detects occurrence of a failure in the network system on the basis of the frame inputted from the input-output section;
   a setting section which sets the communication apparatus on the basis of detection of the occurrence of the failure by the failure detection section so as to terminate or transfer a data frame, wherein the terminate is MEP (Maintenance Entry Point) and the transfer is MIP (Maintenance Intermediate Point);
   a data frame control section which exercises control on the basis of setting regarding the data frame of the communication apparatus by the setting section so as to terminate or transfer the data frame inputted from the input-output section; and
   a maintenance frame control section which exercises control on the basis of the setting regarding the data frame by the setting section so as to terminate or transfer the maintenance frame inputted from the input-output section;
   wherein the setting section changes a frame transferring function of the communication apparatus from the MIP to the MEP and sets the communication apparatus to a monitoring termination node, when a blocking point of the frame is set in the communication apparatus;
   and wherein the setting section changes a frame transferring function of the communication apparatus from the MEP to the MIP and sets the communication apparatus to a monitoring intermediate node, when the blocking point of the communication apparatus is released.

2. The communication apparatus according to claim 1, further comprising a change notice sending section which sends, on the basis of setting regarding the data frame by the setting section, a setting change notice for informing another communication apparatus of setting the communication apparatus in the network system so as to terminate the data frame.

3. The communication apparatus according to claim 2, wherein the failure detection section detects the occurrence of the failure in the network system by receiving a setting change notice, which is sent on the basis of setting regarding the data frame by another setting section of another communication apparatus from another change notice sending section of the another communication apparatus, for informing the communication apparatus of setting the another communication apparatus in the network system so as to terminate the data frame.

4. The communication apparatus according to claim 1, wherein the failure detection section detects the occurrence of the failure in a communication channel adjacent to the communication apparatus in the network system on the basis of the frame inputted from the input-output section.

5. The communication apparatus according to claim 1, further comprising an insertion section which sends the maintenance frame, wherein the failure detection section detects the occurrence of the failure in the network system on the basis of the maintenance frame sent from the insertion section.

6. The communication apparatus according to claim 5, wherein:
   the insertion section sends the maintenance frame to an inside of the communication apparatus; and
   the failure detection section detects the occurrence of the failure in the communication apparatus on the basis of the maintenance frame sent from the insertion section.

7. The communication apparatus according to claim 1, wherein when the setting section sets the communication apparatus so as to terminate the maintenance frame, the maintenance frame control section terminates the maintenance frame according to a point at which the failure detected has occurred.

8. The communication apparatus according to claim 1, wherein the failure detection section monitors the maintenance frame and detects the occurrence of the failure.

9. The communication apparatus according to claim 8, wherein:
   Ethernet is used in the network system; and
   the maintenance frame is an OAM frame based on E-OAM.

10. The communication apparatus according to claim 1, wherein the failure detection section monitors a control frame for controlling the network system and detects the occurrence of the failure.

11. The communication apparatus according to claim 2, wherein:
   if the failure detection section detects the occurrence of the failure in a communication channel connected to the communication apparatus in the network system, the setting section sets the communication apparatus so as to terminate the data frame; and
   if the failure detection section detects the occurrence of the failure in the communication channel connected to the communication apparatus in the network system, the setting change notice is sent for informing that another communication apparatus connected by the communication channel in which the occurrence of the failure is detected is set on the basis of the setting regarding the data frame so as to terminate the data frame and that a communication apparatus which is set before the detection of the failure so as to terminate the data frame is set on the basis of the setting regarding the data frame so as to transfer the data frame.

12. The communication apparatus according to claim 4, wherein:
if the failure detection section detects the occurrence of the failure in the communication channel on the basis of the frame inputted from the input-output section, the setting section performs setting so that the data frame control section exercises control in order to terminate the data frame to be sent to the communication channel in which the occurrence of the failure is detected; and
the data frame control section exercises control on the basis of the setting regarding the data frame by the setting section so as to terminate the data frame to be sent to the communication channel in which the occurrence of the failure is detected.

13. The communication apparatus according to claim 5, wherein:
if the failure detection section detects the occurrence of the failure in the communication apparatus on the basis of the maintenance frame sent from the insertion section, the setting section performs setting so that the data frame control section exercises control in order to terminate the data frame to be sent to an inside of the communication apparatus in which the occurrence of the failure is detected; and
the data frame control section exercises control on the basis of the setting regarding the data frame by the setting section so as to terminate the data frame to be sent to the inside of the communication apparatus in which the occurrence of the failure is detected.

14. The communication apparatus according to claim 2, wherein:
if the failure detection section detects the occurrence of the failure in the communication apparatus, the setting section sets the communication apparatus so as to terminate the data frame; and
if the failure detection section detects the occurrence of the failure in the communication apparatus, the setting change notice is sent for informing that a communication apparatus which is set before the detection of the failure so as to terminate the data frame is set so as to transfer the data frame.

15. The communication apparatus according to claim 2, wherein the setting change notice is transferred in the network system as a control frame for controlling the network system.

16. The communication apparatus according to claim 4, wherein the failure detection section:
monitors the frame inputted from the input-output section; and
detects the occurrence of the failure in the communication channel adjacent to the communication apparatus in the network system from the fact that the frame is not extracted for a predetermined period of time.

17. A communication system including a communication apparatus which monitors a network system in which a frame is transferred by a maintenance frame for maintenance and management, the communication apparatus comprising:
an input-output section which inputs or outputs a frame;
a failure detection section which detects occurrence of a failure in the network system on the basis of the frame inputted from the input-output section;
a setting section which sets the communication apparatus on the basis of detection of the failure by the failure detection section so as to terminate or transfer a data frame, wherein the terminate is MEP (Maintenance Entry Point) and the transfer is MIP (Maintenance Intermediate Point);
a data frame control section which exercises control on the basis of setting regarding the data frame of the communication apparatus by the setting section so as to terminate or transfer the data frame inputted from the input-output section;
a maintenance frame control section which exercises control on the basis of the setting regarding the data frame by the setting section so as to terminate or transfer the maintenance frame inputted from the input-output section; and
a change notice sending section which sends setting change notice for informing another communication apparatus of setting the communication apparatus in the network system on the basis of the setting regarding the data frame by the setting section so as to terminate the data frame,
wherein the failure detection section detects the occurrence of the failure in the network system by receiving the setting change notice;
wherein the setting section changes a frame transferring function of the communication apparatus from the MIP to the MEP and sets the communication apparatus to a monitoring termination node, when a blocking point of the frame is set in the communication apparatus;
and wherein the setting section changes a frame transferring function of the communication apparatus from the MEP to the MIP and sets the communication apparatus to a monitoring intermediate node, when the blocking point of the communication apparatus is released.

18. A computer-readable non-transitory recording medium on which a communication program for monitoring a network system in which a frame is transferred by a maintenance frame for maintenance and management is recorded, the program making a communication apparatus function as:
an input-output section which inputs or outputs a frame;
a failure detection section which detects occurrence of a failure in the network system on the basis of the frame inputted from the input-output section;
a setting section which sets the communication apparatus on the basis of detection of the occurrence of the failure by the failure detection section so as to terminate or transfer a data frame, wherein the terminate is MEP (Maintenance Entry Point) and the transfer is MIP (Maintenance Intermediate Point);
a data frame control section which exercises control on the basis of setting regarding the data frame of the communication apparatus by the setting section so as to terminate or transfer the data frame inputted from the input-output section; and
a maintenance frame control section which exercises control on the basis of the setting regarding the data frame by the setting section so as to terminate or transfer the maintenance frame inputted from the input-output section;
wherein the setting section changes a frame transferring function of the communication apparatus from the MIP to the MEP and sets the communication apparatus to a monitoring termination node, when a blocking point of the frame is set in the communication apparatus;
and wherein the setting section changes a frame transferring function of the communication apparatus from the MEP to the MIP and sets the communication apparatus to a monitoring intermediate node, when the blocking point of the communication apparatus is released.

19. A control method for controlling a communication apparatus which monitors a network system in which a frame is transferred by a maintenance frame for maintenance and management, the method comprising:
- detecting, by a failure detection section, occurrence of a failure in the network system on the basis of a frame inputted from an input-output section;
- setting, by a setting section, the communication apparatus on the basis of detection of the occurrence of the failure by the failure detection section so as to terminate or transfer a data frame, wherein the terminate is MEP (Maintenance Entry Point) and the transfer is MIP (Maintenance Intermediate Point);
- exercising, by a data frame control section, control on the basis of setting regarding the data frame of the communication apparatus by the setting section so as to terminate or transfer the data frame inputted from the input-output section; and
- exercising, by a maintenance frame control section, control on the basis of the setting regarding the data frame by the setting section so as to terminate or transfer the maintenance frame inputted from the input-output section;
- wherein the setting section changes a frame transferring function of the communication apparatus from the MIP to the MEP and sets the communication apparatus to a monitoring termination node, when a blocking point of the frame is set in the communication apparatus;
- and wherein the setting section changes a frame transferring function of the communication apparatus from the MEP to the MIP and sets the communication apparatus to a monitoring intermediate node, when the blocking point of the communication apparatus is released.

* * * * *